(12) United States Patent
Park et al.

(10) Patent No.: US 10,619,648 B2
(45) Date of Patent: Apr. 14, 2020

(54) AIR CONDITIONER

(71) Applicant: SAMSUNG ELECTRONICS CO., LTD., Suwon-si, Gyeonggi-do (KR)

(72) Inventors: Hyun Uk Park, Suwon-si (KR); Chan Young Park, Suwon-si (KR); Tae-In Eom, Hwaseong-si (KR); Young Kyun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 15/887,530

(22) Filed: Feb. 2, 2018

(65) Prior Publication Data

US 2018/0231022 A1 Aug. 16, 2018

(30) Foreign Application Priority Data

Feb. 10, 2017 (KR) .......................... 10-2017-0018747
Dec. 18, 2017 (KR) .......................... 10-2017-0173985

(51) Int. Cl.
*F04D 29/46* (2006.01)
*F04D 29/28* (2006.01)
(Continued)

(52) U.S. Cl.
CPC ......... *F04D 29/462* (2013.01); *F04D 29/282* (2013.01); *F04D 29/5826* (2013.01);
(Continued)

(58) Field of Classification Search
CPC .. F04D 29/282; F04D 29/462; F04D 29/5826; F16H 19/001; F16H 21/40;
(Continued)

(56) References Cited

U.S. PATENT DOCUMENTS 4,188,862 A * 2/1980 Douglas, III ........... F16K 3/314
251/212
6,338,382 B1 * 1/2002 Takahashi ............. F24F 1/0007
165/96

(Continued)

FOREIGN PATENT DOCUMENTS

CN 201218565 Y 4/2009
CN 101755173 A 6/2010
(Continued)

OTHER PUBLICATIONS

Extended European Search Report dated Jun. 28, 2018 in corresponding European Patent Application No. 18155379.3, 7 pgs.
(Continued)

*Primary Examiner* — Igor Kershteyn
(74) *Attorney, Agent, or Firm* — Staas & Halsey LLP

(57) ABSTRACT

An air conditioner allowing a blade driving device to rotate the blade in the up-and-down direction around the respective rotation axis via the two rotation axis, thereby the blade driving device effectively guides the discharged air in the vertical direction. Further, the blade driving device may efficiently rotate the blades by including one or two driving motors for rotating the blades, minimizing the volume of the blade driving device, thereby the blade driving device reduce the size of the air conditioner or efficiently reducing the internal space of the air conditioner.

19 Claims, 43 Drawing Sheets

(51) Int. Cl.
*F04D 29/58* (2006.01)
*F16H 19/00* (2006.01)
*F16H 21/40* (2006.01)
*F24F 1/0011* (2019.01)
*F24F 13/14* (2006.01)

(52) U.S. Cl.
CPC ........... *F16H 19/001* (2013.01); *F16H 21/40* (2013.01); *F24F 1/0011* (2013.01); *F24F 13/14* (2013.01); *F24F 13/1486* (2013.01); *F24F 2013/1446* (2013.01); *F24F 2013/1473* (2013.01)

(58) Field of Classification Search
CPC ...... F24F 1/0011; F24F 13/14; F24F 13/1486; F24F 2013/1446; F24F 2013/1473
See application file for complete search history.

(56) References Cited

U.S. PATENT DOCUMENTS

| | | | |
|---|---|---|---|
| 7,326,108 B2* | 2/2008 | Matthews | F24F 7/065 454/259 |
| 8,056,351 B2 | 11/2011 | Marciano et al. | |
| 2002/0084058 A1* | 7/2002 | Ozeki | B60H 1/0005 165/42 |
| 2006/0032260 A1* | 2/2006 | Kang | F24F 1/0007 62/317 |
| 2007/0066215 A1* | 3/2007 | Song | B01D 46/0004 454/329 |
| 2010/0307717 A1* | 12/2010 | Yamashita | F24F 1/0011 165/96 |
| 2014/0097730 A1* | 4/2014 | Kim | F24F 1/0014 312/236 |
| 2015/0192323 A1* | 7/2015 | Lee | F24F 13/06 454/335 |
| 2017/0045260 A1* | 2/2017 | Luo | F24F 13/20 |

FOREIGN PATENT DOCUMENTS

| | | |
|---|---|---|
| CN | 104764183 A | 7/2015 |
| CN | 105020873 B | 8/2018 |
| EP | 2 226 581 A1 | 9/2010 |
| EP | 2 894 415 A1 | 7/2015 |
| JP | 2008-128589 | 6/2008 |
| JP | 2009-52834 | 3/2009 |
| JP | 2009-63261 | 3/2009 |
| JP | 2013-47580 | 3/2013 |
| KR | 10-2010-0051472 A | 5/2010 |
| KR | 10-2012-0088520 | 8/2012 |
| WO | WO 2011/036958 A1 | 3/2011 |
| WO | WO 2015/161738 A1 | 10/2015 |

OTHER PUBLICATIONS

European Office Action dated Sep. 4, 2019 in related European Application No. 18 155 379.3.
Chinese Office Action dated Nov. 15, 2019 in related Chinese Application No. 201810133215.9.

* cited by examiner

AIR CONDITIONER

CROSS-REFERENCE TO RELATED APPLICATION

This application claims the benefit of Korean Patent Application No. 10-2017-0018747 and 10-2017-0173985, filed on Feb. 10, 2017 and Dec. 18, 2017 in the Korean Intellectual Property Office, the disclosure of which is incorporated herein by reference.

BACKGROUND

1. Field

Embodiments of the present disclosure relate to an air conditioner, and more particularly, to an air conditioner having different air-discharging methods.

2. Description of the Related Art

In general, an air conditioner is an apparatus that adjusts appropriate temperature, humidity, air flow and distribution for a human activity using a refrigerating cycle. Main elements for the refrigerating cycle include a compressor, a condenser, an evaporator, a blower fan, etc.

The air conditioner can be classified into a separable air conditioner in which an indoor unit and an outdoor unit are separated from each other, and an integral air conditioner in which both the indoor unit and the outdoor unit are installed in one cabinet. Among them, the indoor unit of the separable air conditioner includes a heat exchanger that heat-exchanges air taken into a panel, and a blower fan that takes the indoor air into the panel and blows the taken air indoors.

The air introduced into the indoor unit by the blower fan is discharged to the outside of the indoor unit via a discharge port. The air conditioner includes a blade for controlling a discharge direction of the discharged air.

The conventional blade is rotated on the spot around one rotation axis so as to change the direction of air. In the related art, a range of a guide direction of the blade is narrow.

SUMMARY

Therefore, it is an aspect of the present disclosure to provide an air conditioner, whereby a blade is moved in a wide range by a link placed at both ends of the blade so that discharged air can be effectively guided.

It is another aspect of the present disclosure to provide an air conditioner, whereby one or two driving motors for moving a blade are used so that the blade can be efficiently moved.

Additional aspects of the present disclosure will be set forth in part in the description which follows and, in part, will be obvious from the description, or may be learned by practice of the disclosure.

In accordance with one aspect of the present disclosure, an air conditioner may includes a housing comprising a suction port to introduce air and a discharge port, a heat exchanger included the housing to heat-exchange the introduced air, a blower fan configured to guide the air heat-exchanged by the heat exchanger to the discharge port and comprising a first rotation axis at one end thereof and a second rotation axis at an other end thereof, a blade configured to adjust a direction of the air discharged from the discharge port, and a blade-driving device including a first driving motor connected to the first rotation axis and the second driving motor connected to the second rotation axis and configured to drive the blade by a rotational force of at least one of the first driving motor and the second driving motor, and when the first driving motor is rotated in one direction, the blade-driving device moves the second rotation axis around the first rotation axis.

And the blade-driving device includes a first link having one end connected to the first rotation axis, a second link having one end connected to the second rotation axis, a rotation member connected to the first link and the second link, respectively and configured to move the second link through rotation, and a guide member connected to the first link and the second link and configured to support the first link and to guide a movement of the second link.

And the first link includes a first coupling protrusion at the other end of the first link and coupled to the rotation member, and the second link comprises a second coupling protrusion at the other end of the second link and coupled to the rotation member, and the rotation member includes a first rotation rail comprising a penetration region that extends in a rotation direction of the rotation member so that the first coupling protrusion is inserted into the penetration region and the first coupling protrusion penetrates into the penetration region, when the rotation member is rotated in one direction, and a second rotation rail comprising a rotation region that extends in a direction of a rotation axis of the rotation member so that the second coupling protrusion is inserted into the rotation region and the rotation region is rotated together with the second coupling protrusion when the rotation member is rotated in the one direction.

And the first link includes a first support protrusion selectively supported by the guide member, and the guide member comprises a guide rail into which each of the first coupling protrusion and the second coupling protrusion is inserted and guides movement of the second coupling protrusion when the rotation member is rotated in the one direction, and a support part configured to support the first support protrusion when the rotation member is rotated in the one direction.

And the guide rail guides a movement of the second coupling protrusion so that the second coupling protrusion is moved from one end of the guide rail to an other end of the guide rail when the rotation member is rotated in the one direction.

And the first link further includes a first rotation protrusion placed at one end of the first link and rotatably coupled to one side of the blade on the first rotation axis, and the second link further comprises a second rotation protrusion placed at the one end of the second link and rotatably coupled to the other side of the blade on the second rotation axis, and the second link is moved to a direction of the other end of the guide rail from the one end of the guide rail in engagement with the movement of the second coupling protrusion, and the second rotation protrusion pressurizes the other side of the blade so that the blade is pivoted around the first rotation axis.

And the blade-driving device moves the first rotation axis around the second rotation axis when the second driving motor is rotated in an opposite direction.

And the first link includes a first coupling protrusion at the other end of the first link and coupled to the rotation member, and the second link comprises a second coupling protrusion at the other end of the second link and coupled to the rotation member, and the rotation member includes a first rotation rail including a first penetration region into which the first coupling protrusion is inserted and which passes through the first coupling protrusion when the rotation member is rotated in one direction, and a first rotation region which extends from the first penetration region and is rotated together with the first coupling protrusion when the rotation member is rotated in an opposite direction, and a second rotation rail including a second rotation region into which the second coupling protrusion is inserted and which is rotated together with the second coupling protrusion when the rotation member is rotated in the one direction, and a second penetration region which extends from the second rotation region and passes through the second coupling protrusion when the rotation member is rotated in the opposite direction.

The air conditioner according to claim 1, wherein the blade comprises a first rotation shaft and a first blade gear part, which are placed on the first rotation axis, and a second rotation shaft and a second blade gear part, which are placed on the second rotation axis, and the blade-driving device further includes a first rotation member coupled to the first blade gear part and configured to rotate the first blade gear part, a second rotation member coupled to the second blade gear part and configured to rotate the second blade gear part, and a first locking member configured to support the first rotation shaft when the second rotation axis is moved.

And the driving motor includes a first driving motor configured to rotate the first rotation member and a second driving motor configured to rotate the second rotation member, and the blade-driving device further includes a second locking member configured to support the second rotation shaft, and the first rotation member comprises a first gear part that engages with the first blade gear part and a first pressurizing protrusion configured to pressurize the first locking member and to rotate the first locking member, and the second rotation member includes a second gear part that engages with the second blade gear part and a second pressurizing protrusion configured to pressurize the second locking member and to rotate the second locking member, and the second locking member is rotated by the pressurizing protrusion and is rotated from a support position at which the second rotation shaft supports, to a deviation position at which the second rotation shaft deviates from the second locking member.

And rotation of the second rotation member is stopped when the second locking member is rotated to the deviation position, and the first rotation member rotates the first blade gear part when the second locking member is rotated to the deviation position.

And the blade-driving device moves the first rotation axis around the second rotation axis when the driving motor is rotated in an opposite direction, and further includes a second locking member configured to support the second rotation shaft.

And the air conditioner further includes sag prevention device spaced a predetermined distance apart from the blade-driving device and configured to prevent the blade from sagging, and the blade further comprises a first rotation part corresponding to the first rotation axis and a second rotation part corresponding to the second rotation axis, and the sag prevention device comprises a first support member configured to support the first rotation part, a second support member configured to support the second rotation part, and an elastic member configured to elastically pressurize the first support member and the second support member so that one of the first rotation part and the second rotation part does not sag.

And the elastic member includes a first elastic member configured to elastically pressurize the first support member and a second elastic member configured to elastically pressurize the second support member, and the first elastic member pressurizes the first support member in an opposite direction to a direction in which the blade is pivoted around the second rotation axis when the blade is in a closed state, and pressurizes the first support member in a direction in which the blade is pivoted around the second rotation axis when the blade is pivoted around the second rotation axis and is in an opened state.

And the sag prevention device further includes a main body in which the elastic member, the first support member and the second support member are accommodated, and the first elastic member comprises one end coupled to the first support member and the other end coupled to the main body, and when the first support member is pivoted around the second rotation axis in engagement with pivoting of the blade, the first elastic member is pivoted around the other end in engagement with the first support member.

In accordance with another aspect of the present disclosure, an air conditioner may include a housing comprising a suction port to introduce air and a discharge port, a heat exchanger included in the housing to heat-exchange the introduced air, a blower fan configured to guide the air heat-exchanged by the heat exchanger to the discharge port, a blade configured to adjust a direction of the air discharged from the discharge port, and a blade-driving device configured to drive the blade by a rotational force of the driving motor, and the blade-driving device may include a first link connected to one end of the blade, a second link connected to the other end of the blade, and a rotation member rotated by the rotational force of the driving motor so as to move one of the first link and the second link.

And when the driving motor rotates the rotation member in one direction, the rotation member is rotated in the one direction so as to move the first link, and when the driving motor rotates the rotation member in an opposite direction, the rotation member is rotated in the opposite direction so as to move the second link, and the blade-driving device further includes a guide member configured to move the first link to an outside of the discharge port when the driving motor rotates the rotation member in one direction.

And the air conditioner further includes a sag prevention device spaced a predetermined distance apart from the blade-driving device and configured to prevent the blade from sagging, and the blade further comprises a first rotation part corresponding to the first rotation axis and a second rotation part corresponding to the second rotation axis, and the sag prevention device comprises a first support member configured to support the first rotation part, a second support member configured to support the second rotation part, a first elastic member configured to elastically pressurize the first support member, and a second elastic member configured to elastically pressurize the second support member, and when the blade is in a closed state, the first elastic member pressurizes the first support member in an extension direction of the first rotation axis, and the second elastic member pressurizes the second support member in an extension direction of the second rotation axis, and when the blade is pivoted around the first rotation axis, the first elastic member pressurizes the first support member while the blade is pivoted.

And the air conditioner further includes a sag prevention device spaced a predetermined distance apart from the blade-driving device and configured to prevent the blade from sagging, and the blade further comprises a first rotation part placed to correspond to the first rotation axis and a second rotation part placed to correspond to the second rotation axis, and the sag prevention device includes a first support member configured to support the first rotation part and pivoted around the second rotation part when the blade is rotated around the second rotation axis, a second support member configured to support the second rotation part and pivoted around the first rotation part when the blade is rotated around the first rotation axis, a first elastic member configured to elastically pressurize the first support member in a rotation direction of the blade so that sagging of the first rotation part is prevented when the blade is rotated around the first rotation axis, and a second elastic member configured to elastically pressurize the second support member in a rotation direction of the blade so that sagging of the second rotation part is prevented when the blade is rotated around the second rotation axis.

In accordance with another aspect of the present disclosure, an air conditioner may include a housing comprising a suction port and a discharge port, a heat exchanger included in the housing to heat-exchange air introduced through the suction port, a blower fan configured to guide the air heat-exchanged by the heat exchanger to the discharge port, a blade configured to adjust a direction of the air discharged from the discharge port, and a blade-driving device connected to one end and the other end of the blade, respectively, and configured to drive the blade, and the blade-driving device comprises one driving motor configured to drive the blade, and when the driving motor is rotated in one direction, the blade-driving device rotates one end of the blade using an other end of the blade as a rotation axis, and when the driving motor is rotated in an opposite direction, the blade-driving device rotates the other end of the blade using one end of the blade as a rotation axis.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 16b is a view in a state in which the blade is removed in FIG. 16a.

FIG. 17b is a view showing the state in which the blades are removed in FIG. 17a.

FIG. 18b is a view in a state in which the blade is removed in FIG. 18a.

FIG. 20b is a view in a state in which the blade is removed in FIG. 20a.

DETAILED DESCRIPTION

Figure 1:
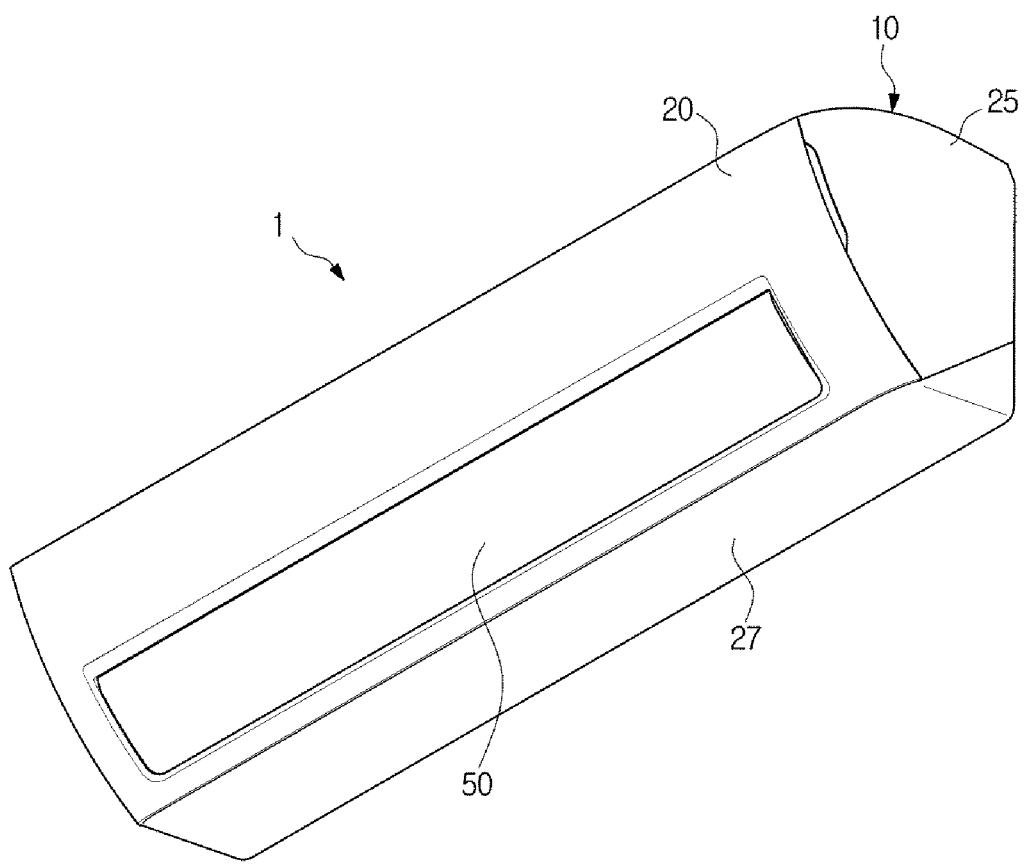
FIG. 1 is a perspective view of an air conditioner according to an embodiment of the present disclosure.

Embodiments described in the present specification and configuration shown in the drawings are just exemplary embodiments of the present disclosure, and there may be various modifications that may replace the embodiments of the present specification and the drawings at the time of filing the present application.

Like reference numerals or symbols in each of the drawings of the present specification represent components or elements that perform materially the same functions.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that although the terms first and second are used herein to describe various elements, these elements should not be limited by these terms. These terms are only used to distinguish one element from another element. For example, a first element discussed below could be termed a second element, and similarly, a second element may be termed a first element without departing from the scope of this disclosure. As used herein, the term "and/or" includes any and all combinations of one or more of the associated listed items.

Hereinafter, embodiments of the present disclosure will be described in more detail with reference to the accompanying drawings.

A refrigerating cycle that constitutes an air conditioner includes a compressor, a condenser, an expansion valve, and an evaporator. In the refrigerating cycle, a series of procedures including compression-condensation-expansion-evaporation are performed, and high-temperature air is heat-exchanged with a low-temperature refrigerant and then, low-temperature air is supplied indoors.

The compressor compresses a refrigerant gas in a high-temperature and high-pressure state and discharges the compressed refrigerant gas, and the discharged refrigerant gas is introduced into the condenser. The condenser condenses the compressed refrigerant into a liquefied state and dissipates heat around the condenser through a condensation procedure. The expansion valve expands the liquefied refrigerant in the high-temperature and high-pressure state condensed by the condenser into a low-pressure liquefied refrigerant. The evaporator evaporates the refrigerant expanded by the expansion valve. The evaporator achieves refrigeration effects through heat-exchanging with an object to be cooled, using latent heat of vaporization of the refrigerant, and returns the refrigerant gas in the low-temperature and low-pressure state to the compressor. Through this cycle, the air temperature in an indoor space may be adjusted.

An outdoor unit of the air conditioner refers to a unit including a compressor and an outdoor heat exchanger of the refrigerating cycle. The expansion valve may be placed in one of an indoor unit and the outdoor unit, and an indoor heat exchanger is placed in the indoor unit of the air conditioner.

The present disclosure is directed to an air conditioner that cools the indoor space, and an outdoor heat exchanger functions as a condenser, and an indoor heat exchanger functions as an evaporator. Hereinafter, for convenience, an indoor unit including the indoor heat exchanger is referred to as an air conditioner, and the indoor heat exchanger is referred to as a heat exchanger.

Also, the terms used herein, such as a "forward direction", a "backward direction", an "upper portion", and a "lower portion", are defined based on the drawings, and the shape and position of each element are not limited by the terms. In detail, an upper side based on the air conditioner illustrated in FIG. 1 may be defined as an upward direction, a lower side based on the air conditioner of FIG. 1 may be defined as a downward direction, a direction toward a front surface of the air conditioner may be defined as a forward direction, and an opposite direction thereto may be defined as a backward direction.

Figure 2:
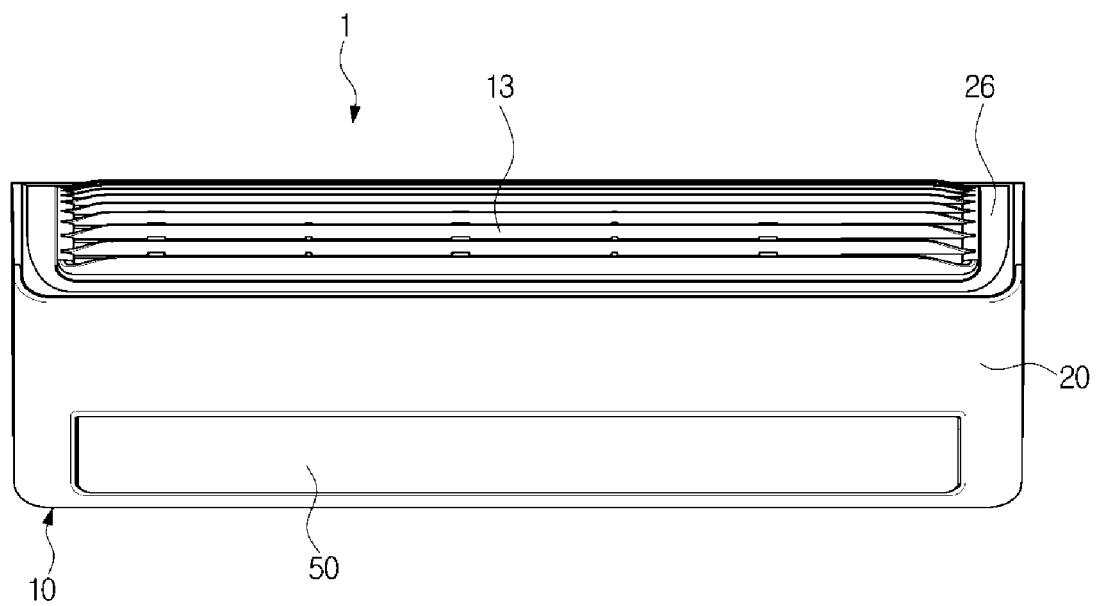
FIG. 2 is a front view of an air conditioner according to an embodiment of the present disclosure.
Figure 3:
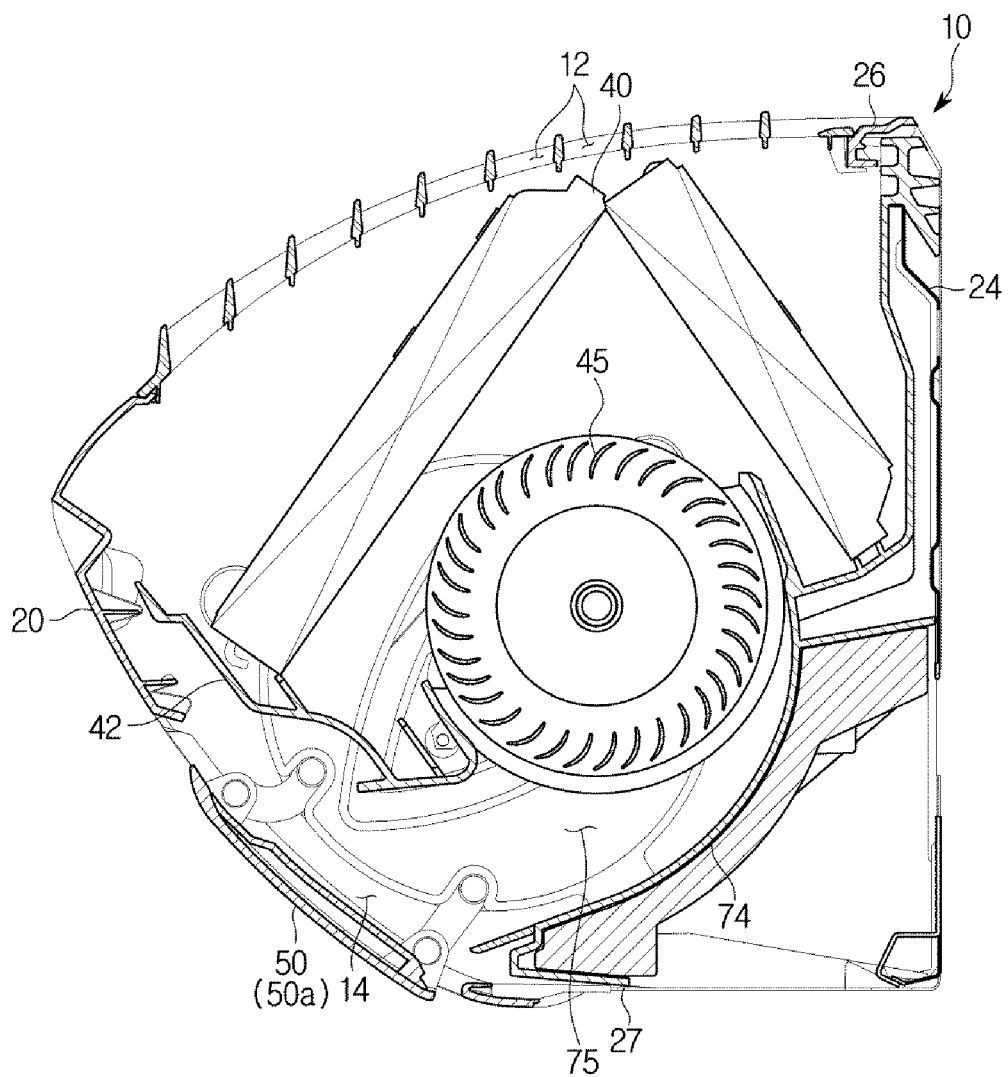
FIG. 3 is a sectional view of an air conditioner according to an embodiment of the present disclosure.

FIG. 1 is a perspective view of an air conditioner according to an embodiment of the present disclosure, FIG. 2 is a front view of the air conditioner according to an embodiment of the present disclosure, and FIG. 3 is a cross-sectional view of the air conditioner according to an embodiment of the present disclosure.

The air conditioner 1 includes a housing 10 having a suction port 12 and a discharge port 14, a heat exchanger 40 that performs heat-exchanging with air introduced into the housing 10, and a blower fan 45 that circulates air toward an inside or outside of the housing 10.

The air conditioner 1 exemplified in the present embodiment is a wall-mounted air conditioner 1 installed at a wall surface, but embodiments of the present disclosure are not limited thereto.

The housing 10 may include a front panel 20 having the discharge port 14, a rear panel 24 placed in a backward direction of the front panel 20, a pair of side panels 25 placed between the front panel 20 and the rear panel 24, an upper panel 26 having the suction port 12 and placed on the pair of side panels 25, and a lower panel 27 placed under the pair of side panels 25. The discharge port 14 and the suction port 12 are placed on the front panel 20 and the upper panel 26. However, embodiments of the present disclosure are not limited thereto. Also, the respective panels 20, 24, 25, 26, and 27 may be integrally formed, or at least two or more thereof may be of an integral type.

A suction guide 13 that guides air into the suction port 12, may be placed on the upper panel 26. A plurality of suction guides 13 may be placed parallel to each other along a longitudinal direction of the housing 10.

The air conditioner 1 may include a blade 50 that opens or closes the discharge port 14. The blade 50 is rotatably placed on the housing 10. In detail, the blade 50 may have two rotation axes and may be pivoted by a device for driving the blade 50 that will be described later, around the two rotation axes.

The blade 50 may be placed to be selectively moved to a closing position 50$a$ at which the discharge port 14 is closed, and a downward guide position (see 50$b$ of FIG. 9) or an upward guide position (see 50$c$ of FIG. 11) at which the blade 50 opens the discharge port 14 and controls a direction in which air blown from the blower fan 45 is discharged toward the discharge port 14. The upward and downward guide positions 50$c$ and 50$b$ that are positions at which the blade 50 opens the discharge port 14 and guides the air discharged through the discharge port 14, are positions in the range of a predetermined angle at which the blade 50 controls the direction of the discharged air. This will now be described in detail.

The heat exchanger 40 may be placed inside the housing 10 and may be located on an air movement path from the suction port 12 to the discharge port 14. The heat exchanger 40 is configured to absorb heat from the air introduced into the suction port 12 or to transfer heat to the air. A drain panel 42 may be provided under the heat exchanger 40 so that condensed moisture may stagnate in the heat exchanger 40. Although not shown, the drain panel 42 may be connected to a drain hose connected to the outside of the housing 10 and may discharge condensed moisture to the outside of the housing 10.

The blower fan 45 is placed inside the housing 10. The blower fan 45 is configured to blow the air so that the air flows from the suction port 12 to the discharge port 14. The blower fan 45 may be a cross flow fan having the same longitudinal direction as the length direction of the housing 10.

The air conditioner 1 may include a flow path guide 74. The flow path guide 74 is configured to guide the air blown from the blower fan 45.

The flow path guide 74 is provided to form an air flow path 75 on which the air flows from the blower fan 45 to the discharge port 14. The air flow path 75 may be connected to the discharge port 14. The discharge port 14 may be placed at an end of the flow path guide 74. The discharge port 14 may be placed in an extension line of the movement path of the air guided by the flow path guide 74.

Hereinafter, the blade 50 configured to guide the direction of the discharged air and a blade-driving device 100 configured to drive the blade 50 will be described in detail.

Figure 4:
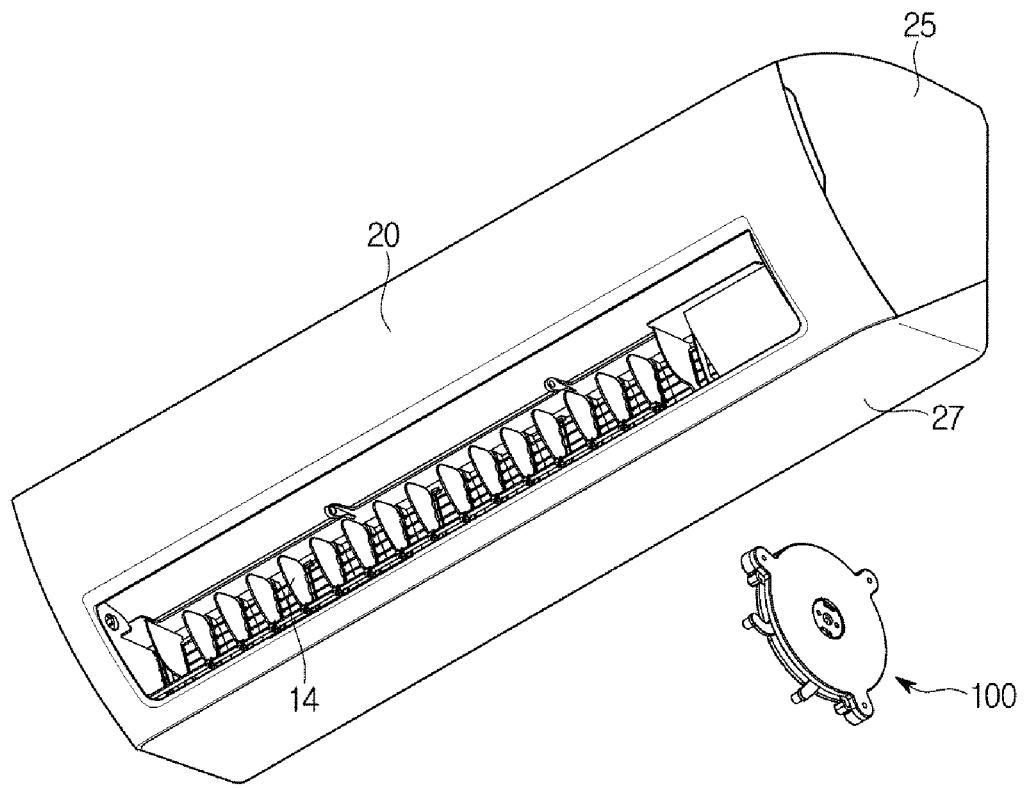
FIG. 4 is an exploded perspective view of a part of an air conditioner according to an embodiment of the present disclosure.
Figure 4:
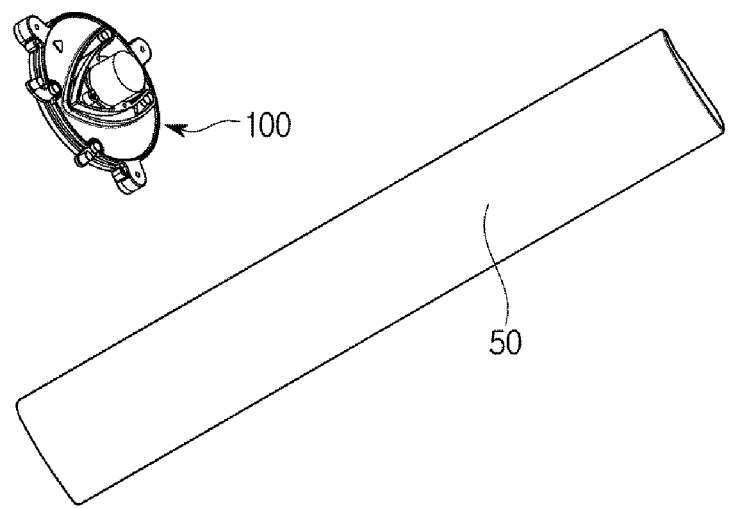
Figure 5:
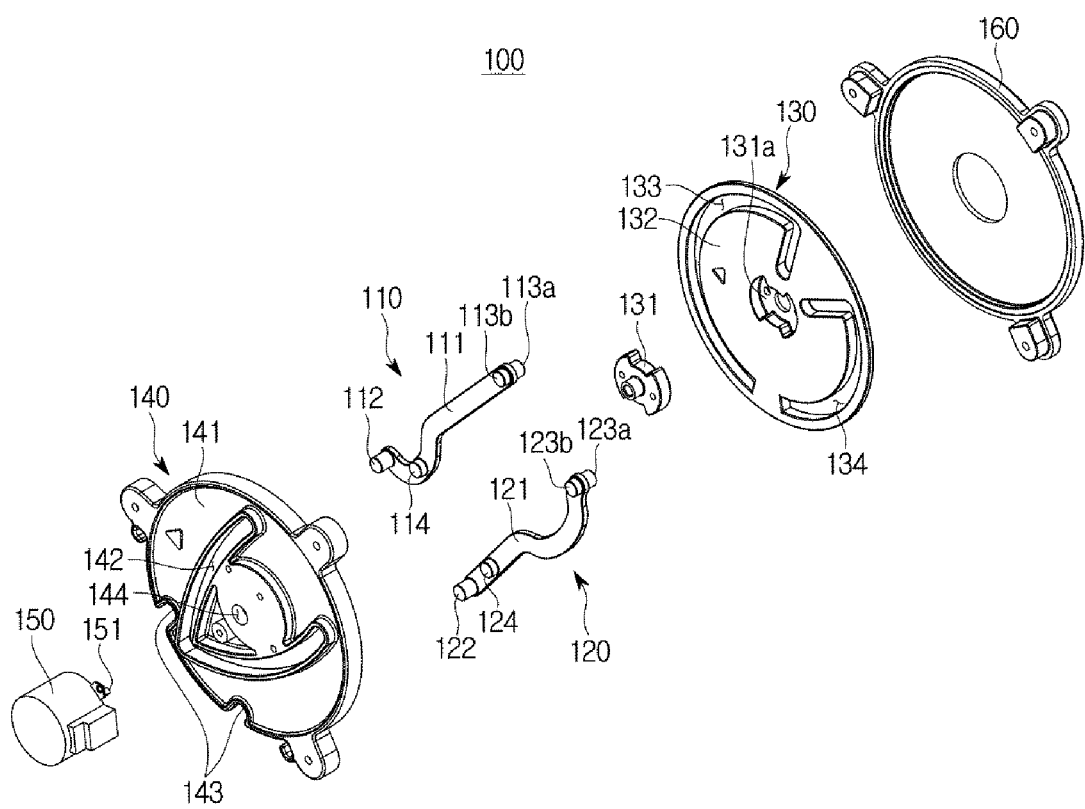
FIG. 5 is an exploded perspective view of a blade driving apparatus of an air conditioner according to an embodiment of the present disclosure.
Figure 6:
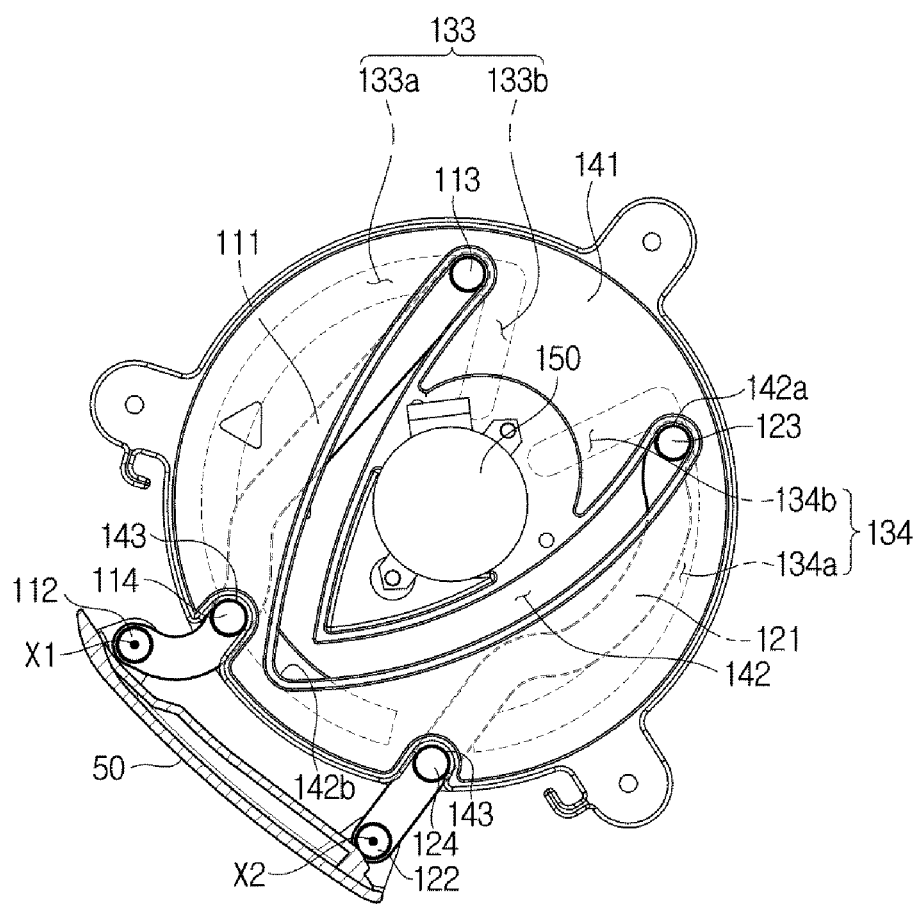
FIG. 6 is a side view of a blade driving apparatus of an air conditioner according to an embodiment of the present disclosure.
Figure 7:
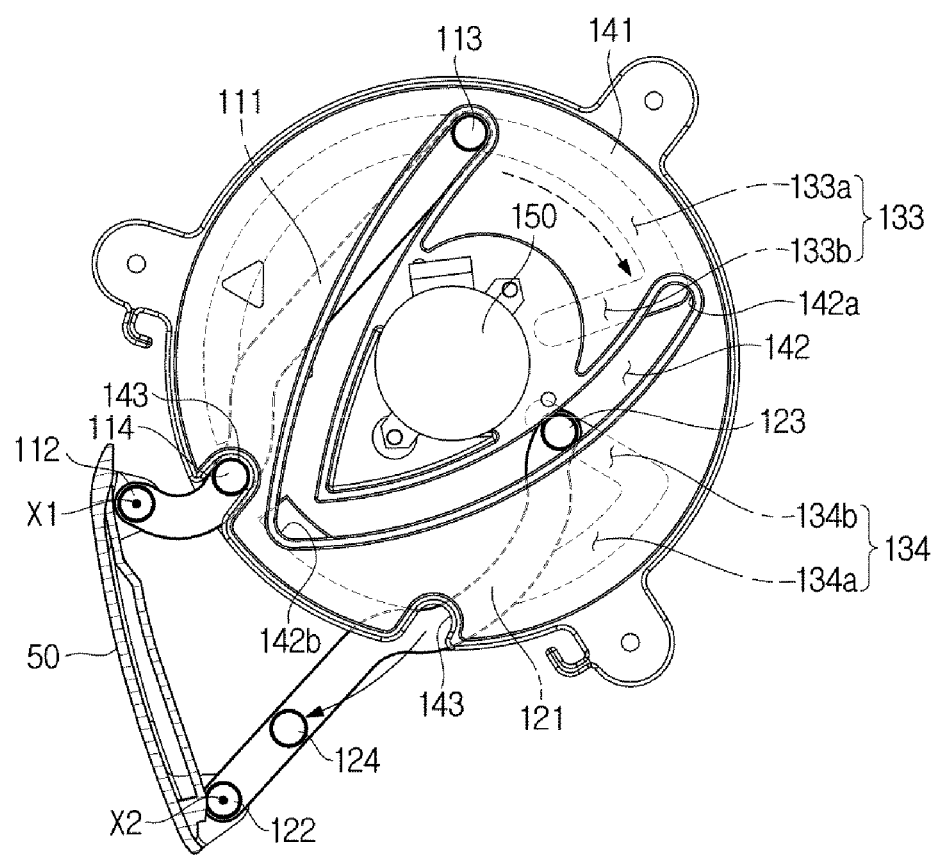
FIGS. 7 and 8 are side views of a blade driving apparatus in a state in which a second link of a blade driving apparatus of an air conditioner moves according to an embodiment of the present disclosure.
Figure 8:
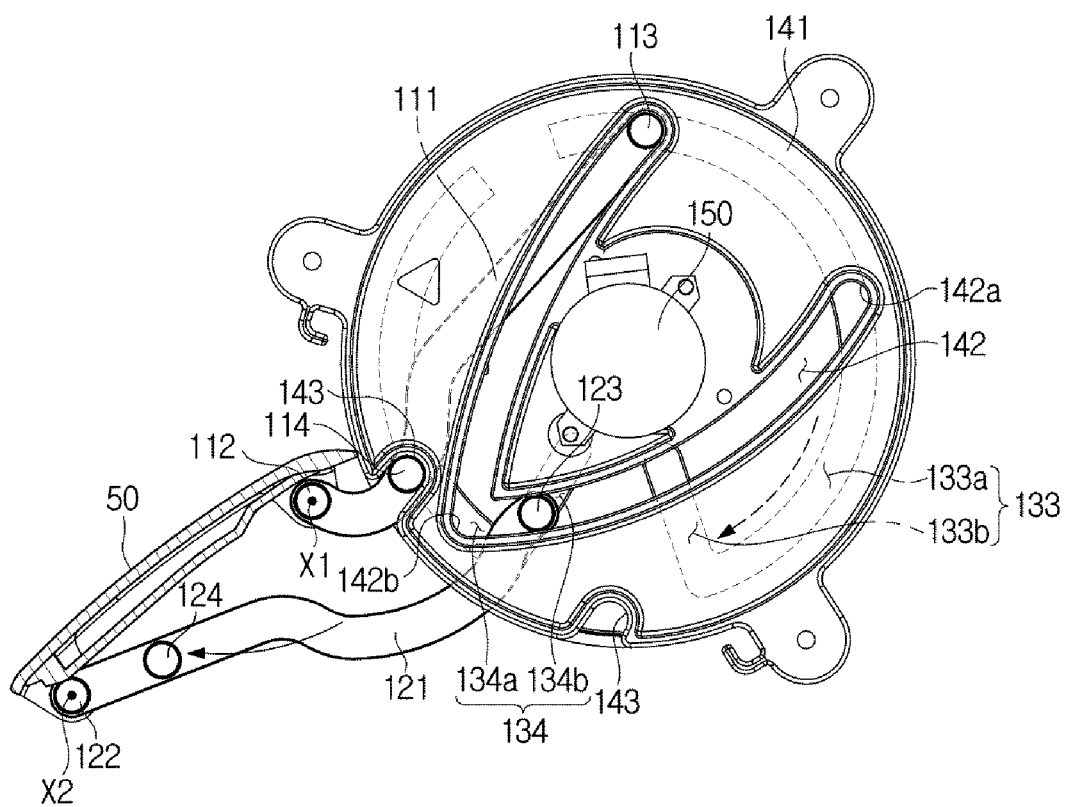
Figure 9:
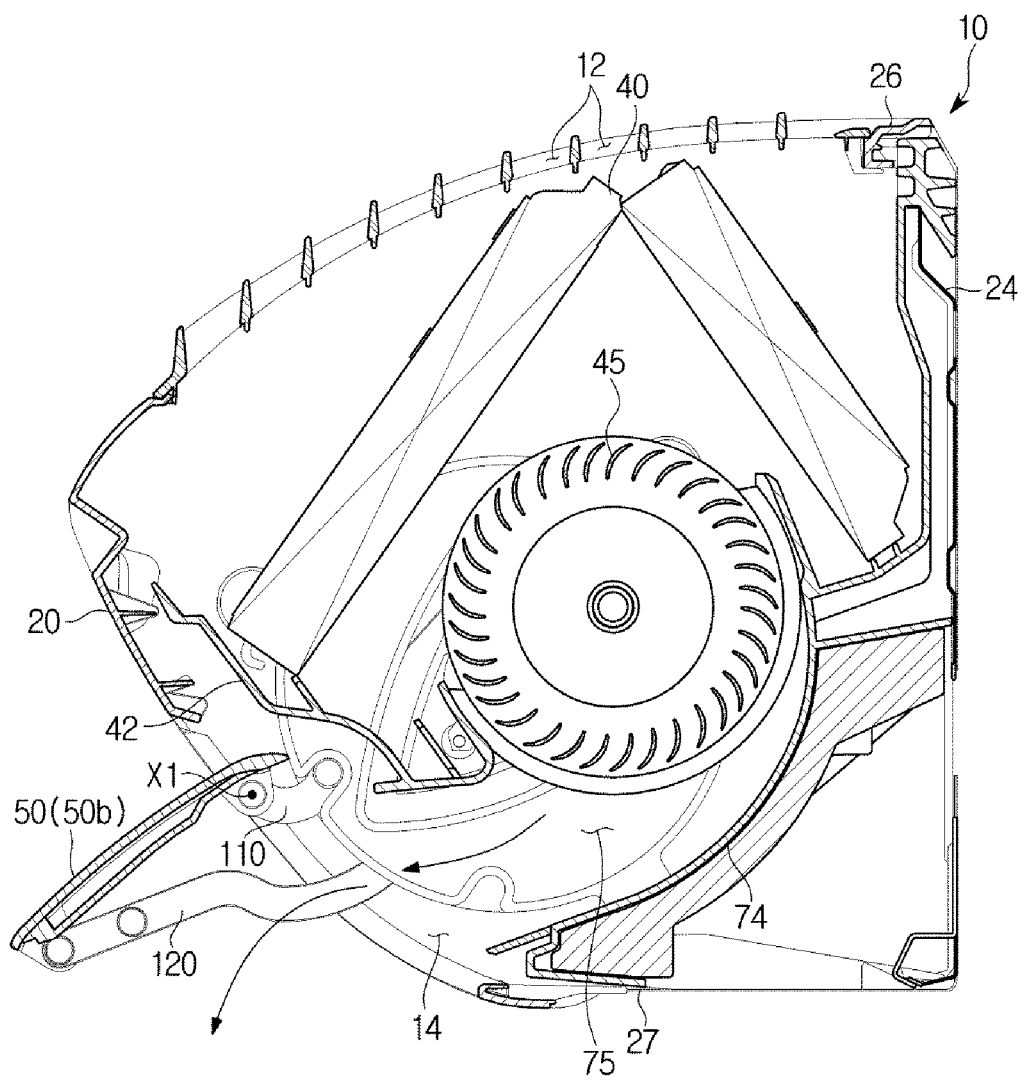
FIG. 9 is a side sectional view of the air conditioner in a state in which the second link of the blade driving apparatus of the air conditioner is moved according to the embodiment of the present disclosure.
Figure 10:
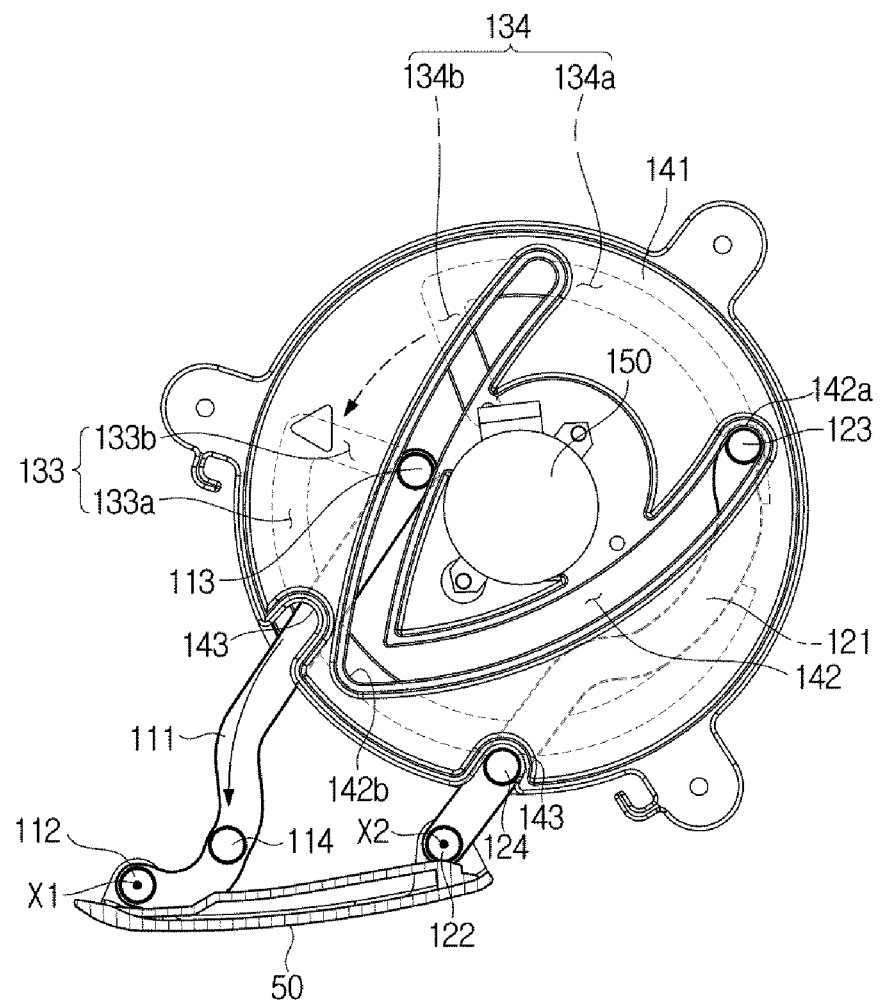
FIG. 10 is a side view of a blade driving apparatus in a state in which a first link of a blade driving apparatus of an air conditioner is moved according to an embodiment of the present disclosure.
Figure 11:
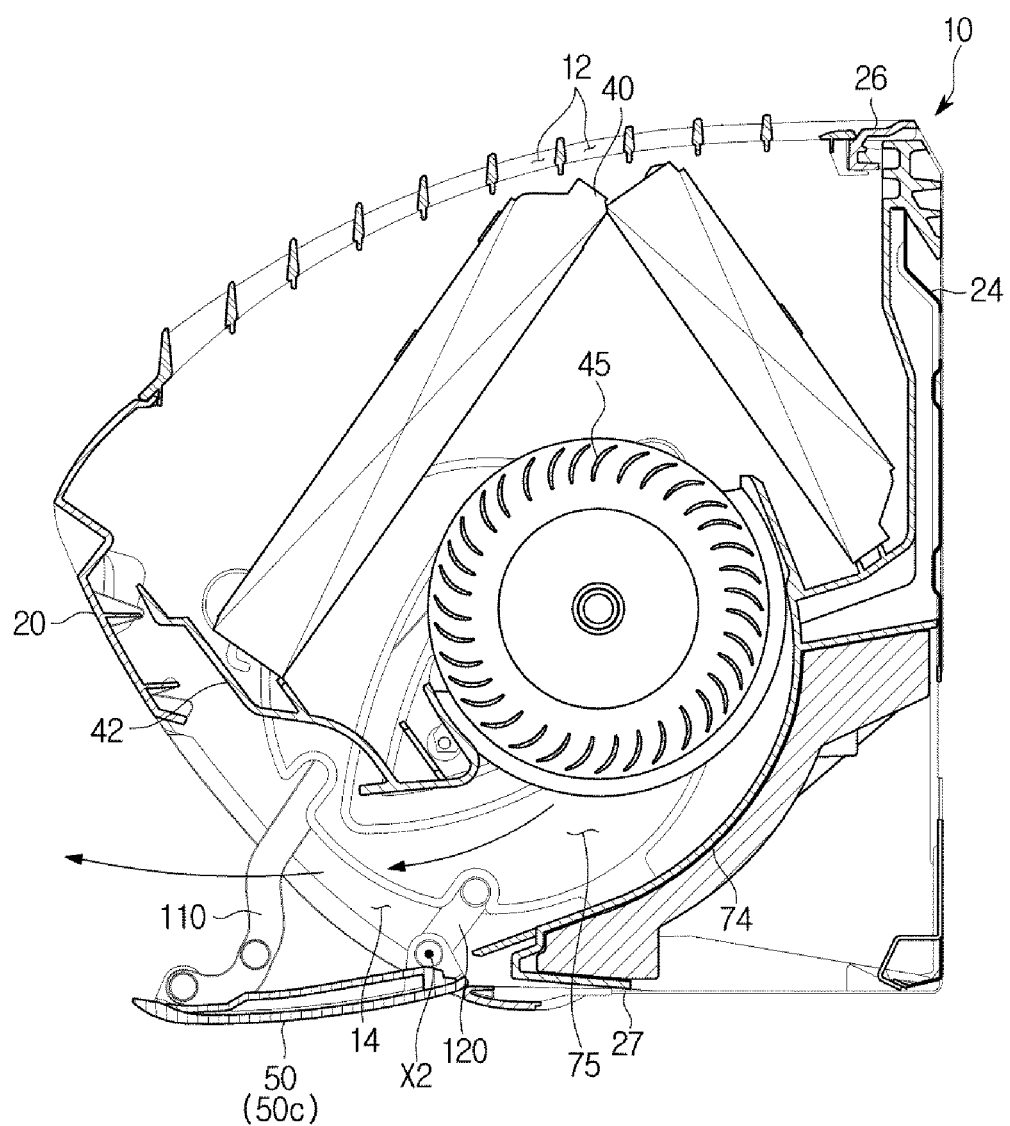
FIG. 11 is a side sectional view of the air conditioner in a state in which the first link of the blade driving apparatus of the air conditioner is moved according to the embodiment of the present disclosure.

FIG. 4 is an exploded perspective view of a portion of the configuration of the air conditioner 1 according to an embodiment of the present disclosure, FIG. 5 is an exploded perspective view of a blade-driving device 100 of the air conditioner 1 according to an embodiment of the present disclosure, FIG. 6 is a side view of the blade-driving device 100 of the air conditioner 1 according to an embodiment of the present disclosure, FIGS. 7 and 8 are side views of the blade-driving device 100 in a state in which a second link of the blade-driving device 100 of the air conditioner 1 according to an embodiment of the present disclosure is moved, FIG. 9 is a side cross-sectional view of the air conditioner 1 in a state in which the second link of the blade-driving device 100 of the air conditioner 1 according to an embodiment of the present disclosure is moved, FIG. 10 is a side view of the blade-driving device 100 in a state in which a first link of the blade-driving device 100 of the air conditioner 1 according to an embodiment of the present disclosure is moved, and FIG. 11 is a side cross-sectional view of the air conditioner 1 in a state in which the first link of the blade-driving device 100 of the air conditioner 1 according to an embodiment of the present disclosure is moved.

Because, in a conventional blade, a rotation axis is placed at a central side of the blade, the conventional blade is rotated on the spot around the rotation axis to control the direction of a discharged air current. In this case, the blade is rotated on the spot so that the range of an angle at which the discharged air current is controlled, is limited.

However, in the blade 50 of the air conditioner 1 according to an embodiment of the present disclosure, one end or the other end of the blade 50 is moved at the closing position 50$a$ at which the blade 50 closes the discharge port 14 using the blade-driving device 100, so that the discharged air current may be efficiently guided in the upward or downward direction.

As illustrated in FIG. 4, the blade-driving device 100 may be placed inside the discharge port 14 and may be combined with the blade 50 in the backward direction of the blade 50 configured to close the discharge port 14.

The blade-driving device 100 may be placed at least one end of the blade 50. The blade 50 may include a first rotation axis X1 and a second rotation axis X2 and may be rotated in one direction around the first rotation axis X1 or in an opposite direction around the second rotation axis X2. This will now be described in detail.

As described above, the blade 50 may be placed at the closing position 50$a$ at which the discharge port 14 is closed, may be moved by the blade-driving device 100, may open the discharge port 14, and may guide a direction of the air discharged from the discharge port 14.

The blade-driving device 100 may be placed at both ends of the blade 50 and may drive the blade 50. However, embodiments of the present disclosure are not limited thereto, and the blade-driving device 100 may be placed at one of both ends of the blade 50 to drive the blade 50. Hereinafter, a pair of blade-driving devices 100 disposed at both ends of the blade 50 have the same driving methods and the same configurations. Thus, only one of the pair of blade-driving devices 100 will be described, and a redundant description of the other one thereof will be omitted.

As illustrated in FIGS. 5 through 6, the blade-driving device 100 may include a first link 110 connected to one side of the blade 50, a second link 120 connected to the other side of the blade 50, a rotation member 130 configured to move the first link 110 or the second link 120 through rotation, a guide member 140 configured to guide movement of the first link 110 or the second link 120, a driving motor 150 configured to rotate the rotation member 130, and a driving device housing 160 that is combined with the guide member 140 and forms a space for accommodating the first link 110, the second link 120, and the rotation member 130.

The blade-driving device 100 may fix the first rotation axis X1 placed at one side of the blade 50 and may move the other side of the blade 50 to rotate the blade 50 in the upward direction based on the first rotation axis X1 and may fix the second rotation axis X2 placed at the other side of the blade 50 and may move one side of the blade 50 to rotate the blade 50 in the downward direction based on the second rotation axis X2.

In detail, the first link 110 may be coupled to one side of the blade 50 on the first rotation axis X1 of the blade 50, and the second link 120 may be coupled to the other side of the blade 50 on the second rotation axis X2 of the blade 50. In this case, when the first link 110 is stopped and the second link 120 is moved, the first rotation axis X1 of the blade 50 is not moved because the first link 110 is maintained in a stoppage state, and the second rotation axis X2 of the blade 50 may be moved together with the blade 50 in a direction in which the second link 120 pressurizes the blade 50, by the second link 120 connected to the other side of the blade 50 on the second rotation axis X2. Movement characteristics of the blade 50 will be described later in more detail.

The first link 110 may include a first link body 111, one end of the first link body 111 connected to one side of the blade 50, and the other end of the first link body 111 coupled to the rotation member 130 and the guide member 140. The first link 110 may include a first rotation protrusion 112 placed at one end of the first link body 111 and rotatably coupled to one side of the blade 50, and a first coupling protrusion 113 placed at the other end of the first link body 111 and coupled to the rotation member 130 and the guide member 140.

The first coupling protrusion 113 may include one end 113a of the first coupling protrusion 113 coupled to the guide member 140, and the other end 113b of the first coupling protrusion 113 coupled to the rotation member 130. However, embodiments of the present disclosure are not limited thereto, and the first coupling protrusion 113 may be simultaneously coupled to the rotation member 130 and the guide member 140 at one side of the first coupling protrusion 113.

Also, the first link 110 may include a first support protrusion 114 supported by the guide member 140 so that, when the second link 120 is moved, movement of the second link 120 is limited by the guide member 140.

The second link 120 may include a second link body 121, one end of the second link body 121 connected to one side of the blade 50, and the other end of the second link body 121 coupled to the rotation member 130 and the guide member 140. The second link 120 may include a second rotation protrusion 122 placed at one end of the second link body 121 and rotatably coupled to the other side of the blade 50, and a second coupling protrusion 123 placed at the other end of the second link body 121 and coupled to the rotation member 130 and the guide member 140.

The second coupling protrusion 123 may include one end 123a of the second coupling protrusion 123 coupled to the guide member 140, and the other end 123b of the second coupling protrusion 123 coupled to the rotation member 130. However, embodiments of the present disclosure are not limited thereto, and the second coupling protrusion 123 may be simultaneously coupled to the rotation member 130 and the guide member 140 at one side of the second coupling protrusion 123.

Also, the second link 120 may include a second support protrusion 124 supported by the guide member 140 so that, when the first link 110 is moved, movement of the first link 110 is limited by the guide member 140.

The rotation member 130 may include a transfer member 131 connected to a motor shaft 151 of the driving motor 150 and configured to transfer a rotational force to the rotation member 130, a rotation body 132 into which the transfer member 131 is inserted and which is rotated in one direction or an opposite direction together with the motor shaft 151, a first rotation rail 133 into which the other end 113b of the first coupling protrusion 113 is inserted and which is moved together with the other end 113b of the first coupling protrusion 113 in engagement with rotation of the rotation body 132 or passes through the other end 113b of the first coupling protrusion 113, and a second rotation rail 134 into which the other end 123b of the second coupling protrusion 123 is inserted and which is moved together with the other end 123b of the second coupling protrusion 123 in engagement with rotation of the rotation body 132 or passes through the other end 123b of the second coupling protrusion 123.

The rotation body 132 may have a circular disk shape and may include an insertion part 131a, which is placed at a central side of the rotation body 132 and into which the transfer member 131 is inserted.

The first rotation rail 133 may include a first penetration region 133a, which, when the rotation body 132 is rotated in one direction, penetrates into the other end 113b of the first coupling protrusion 113 and does not move the other end 113b of the first coupling protrusion 113, and a first rotation region 133b, which, when the rotation body 132 is rotated in an opposite direction, is moved in an opposite direction together with the other end 113b of the first coupling protrusion 113.

The first penetration region 133a may be placed at an edge of the rotation body 132 and may extend in a direction corresponding to a rotation direction of the rotation body 132. The first rotation region 133b may extend from one end of the first penetration region 133a toward the center side of the rotation body 132.

The second rotation rail 134 may include a second penetration region 134a, which, when the rotation body 132 is rotated in an opposite direction, penetrates into the other end 123b of the second coupling protrusion 123 and does not move the other end 123b of the second coupling protrusion 123, and a second rotation region 134b, which, when the rotation body 132 is rotated in one direction, is moved in one direction together with the other end 123b of the second coupling protrusion 123.

The second penetration region 134a may be placed at an edge of the rotation body 132 and may extend in a direction corresponding to a rotation direction of the rotation body 132. The second rotation region 134b may extend from one end of the second penetration region 134a toward the center side of the rotation body 132.

The guide member 140 may include a guide body 141 coupled to the driving device housing 160 and provided not to be rotated regardless of rotation of the driving motor 150, a guide rail 142 into which one end 113a of the first coupling protrusion 113 and one end 123a of the second coupling protrusion 123 are inserted and which guides movement of one end 113a of the first coupling protrusion 113 or one end 123a of the second coupling protrusion 123, a support part 143 provided to support the first support protrusion 114 and the second support protrusion 124, respectively, and a penetration hole 144 into which the motor shaft 151 penetrates.

The guide rail 142 may include a stoppage part 142a, in which, when the blade 50 is placed at the closing position 50a, the other end 113b of the first coupling protrusion 113 and the other end 123b of the second coupling protrusion 123 are respectively arranged and which is placed at both ends of the guide rail 142, and a movement part 142b, in which, when the blade 50 is placed at the guide positions 50b and 50c, one end 113a of the first coupling protrusion 113 or one end 123a of the second coupling protrusion 123 is placed.

Hereinafter, driving of the blade-driving device 100 will be described in more detail.

As illustrated in FIG. 6, when the blade 50 is placed at the closing position (see 50a of FIG. 3), the driving motor 150 is stopped, and the first link 110, the second link 120, and the rotation member 130 may also be placed in a stoppage state.

Thus, each of one end 113a of the first coupling protrusion 113 and one end 123a of the second coupling protrusion 123 may be placed at the stoppage part 142a of the guide rail 142, and each of the first support protrusion 114 and the second support protrusion 124 may be placed at the support part 143. Also, the other end 113b of the first coupling protrusion 113 may be placed in the first penetration region 133a of the first rotation rail 133, and the other end 123b of the second coupling protrusion 123 may be placed in the second penetration region 134a of the second rotation rail 134. However, embodiments of the present disclosure are not limited thereto, and the other end 113b of the first coupling protrusion 113 and the other end 123b of the second coupling protrusion 123 may also be placed in the first rotation region 133b of the first rotation rail 133 and the second rotation region 134b of the second rotation rail 134 when the blade 50 is placed at the closing position 50a.

Subsequently, as illustrated in FIG. 7, when the driving motor 150 rotates the rotation member 130 in one direction, the rotation member 130 may be rotated in one direction due to the rotational force of the driving motor 150.

As the rotation member 130 is rotated, the second rotation rail 134 may be rotated in one direction in engagement with the rotation member 130. In this case, as the second rotation rail 134 is rotated, the other end 123b of the second coupling protrusion 123 inserted into the second rotation rail 134 may be in contact with the second rotation rail 134 inside the second rotation rail 134 and may be moved in the rotation direction of the second rotation rail 134 together with the second rotation rail 134.

In detail, the second rotation rail 134 includes the second penetration region 134a that extends in a rotation direction of the rotation member 130 that is one direction, and the second rotation region 134b that extends from one end at an opposite side of one direction of the rotation member 130 of both ends of the second penetration region 134a.

As described above, the other end 123b of the second coupling protrusion 123 may not be moved together with the second rotation rail 134 but may be placed at its original position even when the second penetration region 134a of the second rotation rail 134 is primarily rotated when the blade 50 is placed at the closing position 50a in the second penetration region 134a of the second rotation rail 134 and the rotation member 130 is rotated in one direction.

That is, even when the second rotation rail 134 is rotated, the second penetration region 134a of the second rotation rail 134 may extend to correspond to a rotation direction of the second rotation rail 134, may be in contact with the other end 123b of the second coupling protrusion 123, may not be rotated together with the other end 123b of the second coupling protrusion 123 in one direction, and may penetrate into the other end 123b of the second coupling protrusion 123 so that only the second penetration region 134a may be rotated together with the rotation member 130.

However, the second penetration region 134a of the second rotation rail 134 penetrates into the other end 123b of the second coupling protrusion 123 and is moved in one direction, and the second rotation region 134b that extends from one end of the second penetration region 134a is close to the other end 123b of the second coupling protrusion 123. Thus, the other end 123b of the second coupling protrusion 123 may be secondarily in contact with the second rotation region 134b of the second rotation rail 134.

When the other end 123b of the second coupling protrusion 123 is in contact with the second rotation region 134b of the second rotation rail 134, the second rotation region 134b of the second rotation rail 134 extends in a direction toward a central side of the rotation member 130 that is different from the rotation direction of the rotation member 130, unlike in the second penetration region 134a. Thus, the second rotation region 134b of the second rotation rail 134 may not penetrate into the other end 123b of the second coupling protrusion 123 and may be rotated together with the other end 123b of the second coupling protrusion 123 in one direction.

The second rotation region 134b of the second rotation rail 134 is rotated in one direction. Thus, the other end 123b of the second coupling protrusion 123 may be pressurized in one direction so that the second coupling protrusion 123 may be moved.

In this case, the second coupling protrusion 123 may be moved to the movement part 142b from the stoppage part 142a of the guide rail 142 due to one end 123a of the second coupling protrusion 123 placed on the guide rail 142.

That is, the second coupling protrusion 123 may be pressurized by rotation of the second rotation rail 134 of the rotation member 130 and moved, and movement of the second coupling protrusion 123 may be guided by the guide rail 142. Thus, the second link 120 may be placed in the internal space formed by the guide member 140 and the driving device housing 160 when the blade 50 is placed at the closing position 50a, and when the driving motor 150 rotates the rotation member 130 in one direction, the second link 120 may be moved to the outside from the internal space formed by the guide member 140 and the driving device housing 160 due to the rotation member 130 and the guide member 140. Thus, the blade 50 coupled to the second link 120 may be moved from the closing position 50a.

When the rotation member 130 is rotated in one direction, the other end 113b of the first coupling protrusion 113 inserted into the first rotation rail 133 is placed in the first penetration region 133a of the first rotation rail 133. Thus, even when the first rotation rail 133 is rotated, the first rotation rail 133 may penetrate into the other end 113b of the first coupling protrusion 113 and may be rotated.

The first rotation region 133b of the first rotation rail 133 extends from one end of the rotation direction of the rotation member 130 of both ends of the first penetration region 133a of the first rotation rail 133 toward the central side of the rotation member 130. Thus, when the first rotation rail 133 is rotated in one direction, the first rotation rail 133 may not meet the other end 113b of the first coupling protrusion 113. Thus, when the rotation member 130 is rotated in one direction, the first rotation rail 133 may penetrate into the other end 113b of the first coupling protrusion 113 and may be rotated, and the other end 113b of the first coupling protrusion 113 may be continuously maintained at its original position.

Also, even when the second link 120 is moved, as the support protrusion 114 of the first link 110 is maintained at its original position, the first link 110 may be continuously maintained at its original position while being supported by the support part 143. Thus, while the second link 120 is moved to the outside of the internal space formed by the guide member 140 and the driving device housing 160 due to the rotation member 130 and the guide member 140, the first link 110 may not be moved to the outside of the internal space formed by the guide member 140 and the driving device housing 160 but may be maintained at its original position, because the first coupling protrusion 113 is not moved by the rotation member 130 and the first support protrusion 114 is supported by the support part 143.

While one end 123a of the second coupling protrusion 123 is guided to the movement part 142b from the stoppage part 142a, the other side of the blade 50 may be moved by the second link 120. In this case, the blade 50 may be rotated in one direction corresponding to the rotation direction of the driving motor 150 based on the first rotation axis X1. This is because the blade 50 is rotated with respect to the first rotation protrusion 112 placed on the first rotation axis X1 while the first link 110 is not moved but is maintained at its original position.

In this case, the second rotation axis X2 of the blade 50 may be moved by pressurization of the second link 120. That is, the second rotation protrusion 122 placed on the second rotation axis X2 may be moved together with movement of the second link 120, and the second rotation axis X2 may also be moved in engagement with movement of the second rotation protrusion 122.

As the blade 50 is rotated based on the first rotation axis X1, vibration may be transferred to the first rotation protrusion 112 so that the first link 110 may deviate from its original position. However, even when the first support protrusion 114 is supported by the support part 143 and vibration is transferred to the first link 110 due to movement of the blade 50, the first link 110 may be easily maintained at its original position.

As illustrated in FIG. 8, the blade 50 may be rotated in one direction based on the first rotation axis X1 and moved in engagement with movement of the second link 120. As described above, when the rotation member 130 moves the second coupling protrusion 123, the guide rail 142 may guide the second coupling protrusion 123 from the stoppage part 142a to the movement part 142b.

As the second coupling protrusion 123 is moved to the movement part 142b, the second link 120 may be gradually farther from the internal space formed by the guide member 140 and the driving device housing 160. Thus, the other side of the blade 50 connected to the second link 120 may be moved in a direction corresponding to a rotation direction of the driving motor 150.

When the second coupling protrusion 123 is placed at the movement part 142b and is finally moved, as illustrated in FIG. 9, the blade 50 may be placed at the downward guide position 50b at which the upper side of the discharge port 14 is covered and a discharged air current may be guided in the downward direction.

The air current having the nature of moving upward of the air discharged from the discharge port 14 may be moved in the downward direction due to the blade 50 placed at the downward guide position 50b and may form a downward air current. In an example, an air current having the nature of high temperature may have the nature of a rising air current and may be easily guided in the downward direction by the blade 50 placed at the downward guide position 50b.

Contrary to this, as illustrated in FIG. 10, when the driving motor 150 is rotated in an opposite direction, the second link 120 may be placed in the second penetration region 134a of the second rotation rail 134 and may be maintained at its original position. The first link 110 may be moved together with the first rotation region 133b of the first rotation rail 133 and may be moved to the outside from the internal space formed by the guide member 140 and the driving device housing 160.

Thus, one side of the blade 50 may be rotated around the second rotation axis X2 due to movement of the first link 110. A configuration in which the blade 50 is moved in the opposite direction, is symmetric with respect to a configuration in which the above-described blade 50 is rotated around the first rotation axis X1 and thus, a redundant description thereof will be omitted.

As illustrated in FIG. 11, the blade 50 may be rotated around the second rotation axis X2 and may be placed at the upward guide position 50c at which the lower side of the discharge port 14 is covered and the discharged air current may be guided in the upward direction.

The air current having the nature of moving downward of the air discharged from the discharge port 14 may be moved in the upward direction due to the blade 50 placed at the upward guide position 50c and may form an upward air current. In an example, an air current having the nature of low temperature may have the nature of a falling air current and may be easily guided in the upward direction by the blade 50 placed at the upward guide position 50c.

The above-described blade-driving device 100 may move the blade 50 to the upward guide position 50c and the downward guide position 50b only in the rotation direction of the driving motor 150 using one driving motor 150. That is, when the driving motor 150 is rotated in one direction, the blade 50 may be moved to the downward guide position 50b using the rotation member 130 and the guide member 140, and when the driving motor 150 is rotated in an opposite direction, the blade 50 may be moved to the upward guide position 50c.

Thus, the blade 50 may be efficiently moved using one driving motor 150 so that the volume of the blade-driving device 100 may be minimized. Reliability of driving of the blade-driving device 100 may be guaranteed through a simple mechanism.

Hereinafter, a blade 80 and a blade-driving device 200 of the air conditioner 1, according to another embodiment of the present disclosure will be described. The configuration other than the blade 80 and the blade-driving device 200 that will be described later is the same as that of the air conditioner 1 according to an embodiment of the present disclosure and thus, a redundant description thereof will be omitted.

Figure 12:
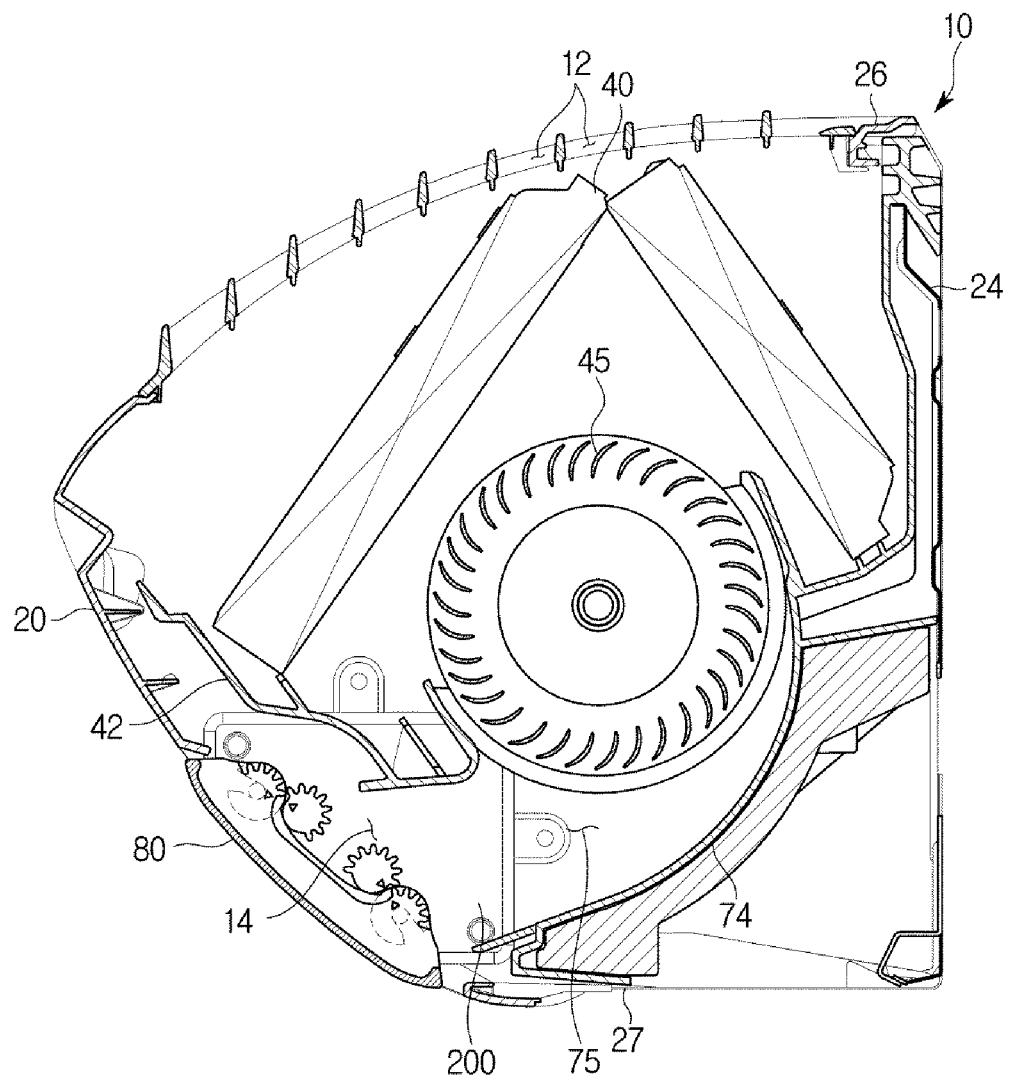
FIG. 12 is a side cross-sectional view of an air conditioner according to another embodiment of the present disclosure.
Figure 13:
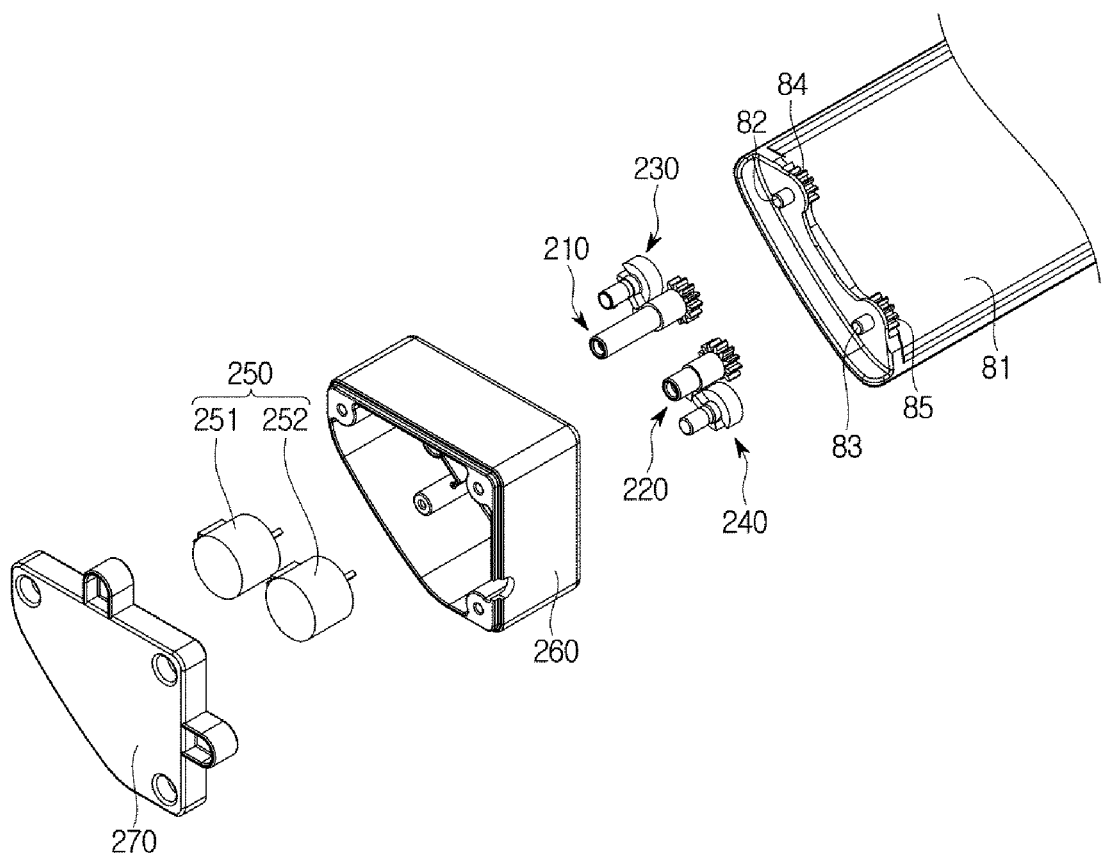
FIG. 13 is an exploded perspective view of a blade driving apparatus of an air conditioner according to another embodiment of the present disclosure.
Figure 14:
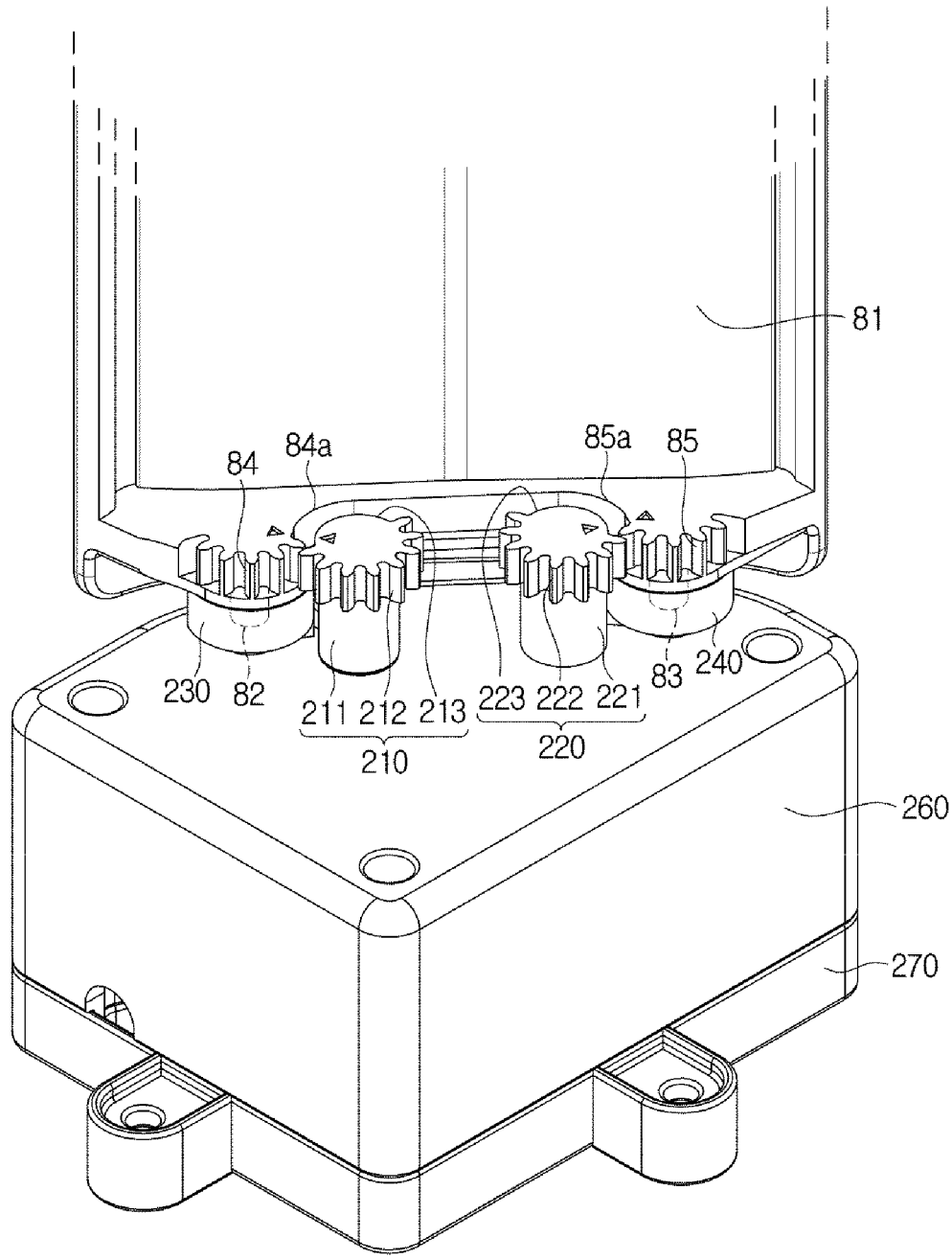
FIG. 14 is a rear side perspective view of a blade and a blade driving apparatus of an air conditioner according to another embodiment of the present disclosure.
Figure 15:
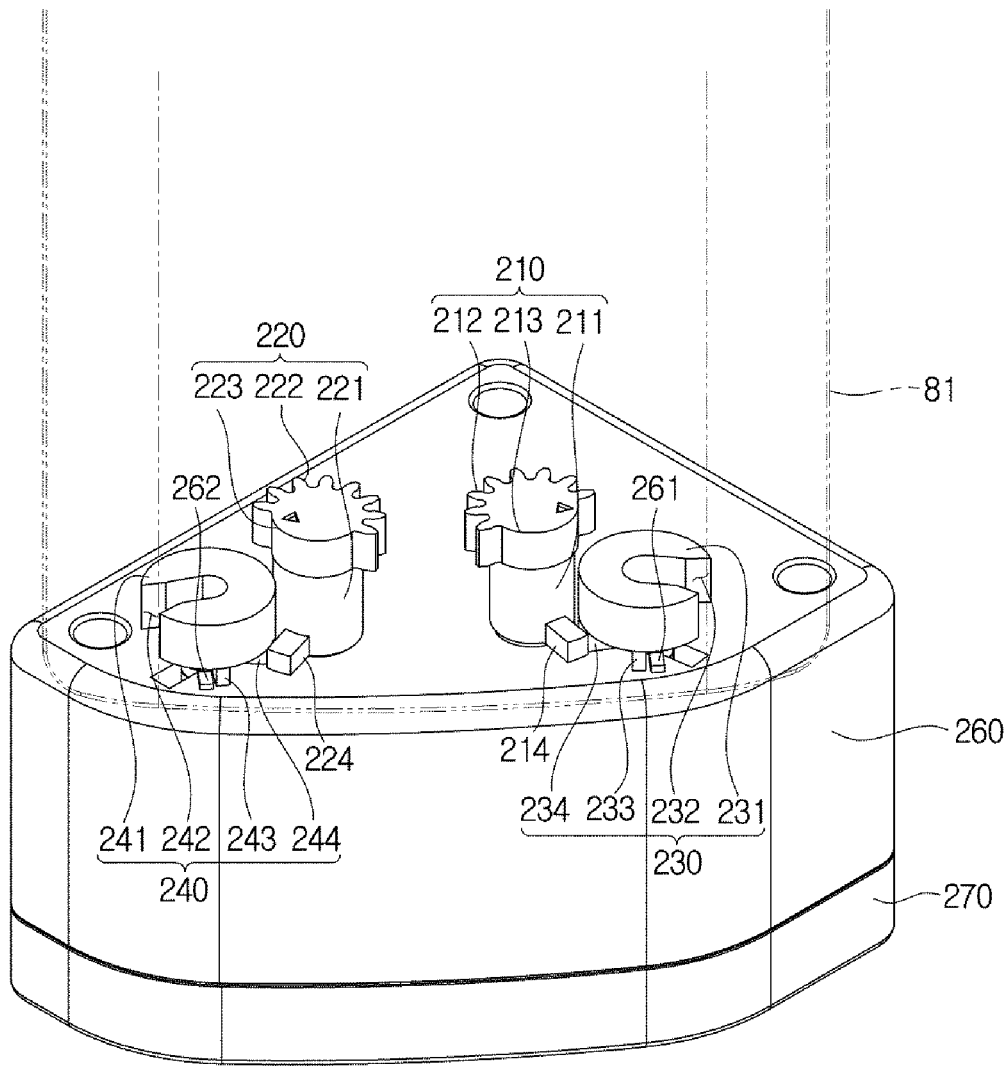
FIG. 15 is a front side perspective view of a blade driving apparatus of an air conditioner according to another embodiment of the present disclosure.

FIG. 12 is a side cross-sectional view of an air conditioner according to another embodiment of the present disclosure, FIG. 13 is an exploded perspective view of a blade-driving device of the air conditioner according to another embodiment of the present disclosure, FIG. 14 is a rear perspective view of a blade and the blade-driving device of the air conditioner according to another embodiment of the present disclosure, and FIG. 15 is a front perspective view of the blade-driving device of the air conditioner according to another embodiment of the present disclosure.

Although not shown, the blade-driving device 200 may be placed at both ends of the blade 80 to drive the blade 80. However, embodiments of the present disclosure are not limited thereto, and the blade-driving device 200 may be placed at one of both ends of the blade 80 to drive the blade 80. Hereinafter, a pair of blade-driving devices 200 placed at both ends of the blade 80 have the same driving method and configuration. Thus, only one of the pair of blade-driving devices 200 will be described, and a redundant description of the other one thereof will be omitted.

However, for convenience of description, the blade-driving device 200 illustrated in FIG. 12 and FIGS. 16a through 20b that will be described later will be described by exemplifying the blade-driving device 200 placed at the left end of the blade 80, and the blade-driving device 200 illustrated in FIGS. 13 through 15 will be described by exemplifying the blade-driving device 200 placed at the right end of the blade 80.

As illustrated in FIG. 12, the blade-driving device 200 may be placed at least one end of the blade 80, like the blade-driving device 100 of the air conditioner 1 according to an embodiment of the present disclosure. The blade 80 may include a first rotation axis X1 and a second rotation axis X2 and may be rotated in one direction based on the first rotation axis X1 or may be moved in an opposite direction based on the second rotation axis X2. This will be described later in more detail.

As illustrated in FIGS. 13 through 15, the blade 80 may include a first rotation shaft 82 and a first blade gear part 84, which are placed on the first rotation axis X1, and a second rotation shaft 83 and a second blade gear part 85, which are placed on the second rotation axis X2.

The blade-driving device 200 may include a first rotation member 210 coupled to the first blade gear part 84 and configured to rotate the first blade gear part 84, a second rotation member 220 coupled to the second blade gear part 85 and configured to rotate the second blade gear part 85, a first locking member 230 configured to support the first rotation shaft 82, a second locking member 240 configured to support the second rotation shaft 83, a driving motor 250 configured to transfer a rotational force to the first rotation member 210 and the second rotation member 220, and a driving device housing 260 to accommodate the driving motor 250 therein and a driving device housing cover 270, which cover the driving device housing 260.

The first rotation member 210 may include a first body part 211 connected to a first driving motor 251 and rotated by the first driving motor 251 when the first driving motor 251 operates, a first gear teeth part 212 placed at one end of the first body part 211, extending along a circumferential direction of the first body part 211 and engaged with the first blade gear part 84, and a first gear non-teeth part 213 placed at one end of the first body part 211 and extending from both ends of the first gear teeth part 212 along the circumferential direction of the first body part 211.

Also, the first rotation member 210 may further include a first pressurizing protrusion 214 that protrudes from one side of the first body part 211 in a radial direction of the first body part 211 to pressurize one side of the first locking member 230 and to rotate the first locking member 230.

The second rotation member 220 may include a second body part 221 connected to a second driving motor 252 and rotated by the second driving motor 252 when the second driving motor 252 operates, a second gear teeth part 222 placed at one end of the second body part 221, extending along a circumferential direction of the second body part 221 and engaged with the second blade gear part 85, and a second gear non-teeth part 223 placed at one end of the second body part 221 and extending from both ends of the second gear teeth part 222 along the circumferential direction of the second body part 221.

Also, the second rotation member 220 may further include a second pressurizing protrusion 224 that protrudes from one side of the second body part 221 in a radial direction of the second body part 221 to pressurize one side of the second locking member 240 and to rotate the second locking member 240.

The first locking member 230 may include a first cover part 231 configured to support the first rotation shaft 82 by covering the first rotation shaft 82, a first cut part 232, which is cut at one side of the first cover part 231 and through which the first rotation shaft 82 may be deviated from the first cover part 231, a first pressurizing part 234 pressurized by the first pressurizing protrusion 214 and configured to rotate the first locking member 230, a first elastic member (not shown), which, although not shown in the drawings, when the first locking member 230 is rotated in one direction due to the first pressurizing protrusion 214, elastically supports the first locking member 230 in an opposite direction, and a first limiting part 233 that limits movement of the first locking member 230 by supporting the first locking member 230 from an elastic force generated by the first elastic member (not shown). Also, the first locking member 230 may further include a first stopper 261 placed at one side of the first driving device housing 260 and configured to limit movement of the first limiting part 233.

The second locking member 240 may include a second cover part 241 configured to support the second rotation shaft 83 by covering the second rotation shaft 83, a second cut part 242, which is cut at one side of the second cover part 241 and through which the second rotation shaft 83 may deviate from the second cover part 241, a second pressurizing part 244 pressurized by the second pressurizing protrusion 224 and configured to rotate the second locking member 240, a second elastic member (not shown), which, although not shown in the drawings, when the second locking member 240 is rotated in one direction due to the second pressurizing protrusion 224, elastically supports the second locking member 240 in an opposite direction, and a second limiting part 243 that limits movement of the second locking member 240 by supporting the second locking member 240 from an elastic force generated by the second elastic member (not shown). Also, the second locking member 240 may further include a second stopper 262 placed at the other side of the first driving device housing 260 and configured to limit movement of the second limiting part 243.

Based on a left/right direction that is an extension direction of the body part 81 of the blade 80, the first blade gear part 84 of the blade 80, the first gear teeth part 212 and the first gear non-teeth part 213 of the first rotation member 210, the second blade gear part 85 of the blade 80, and the second gear teeth part 222 and the second gear non-teeth part 223 of the second rotation member 220 may be arranged in the same positions in the forward/backward or the upward/downward direction.

Also, based on the left/right direction of the body part 81 of the blade 80, the first rotation shaft 82 of the blade 80, the first cover part 231 and the first cut part 232 of the first locking member 230, the second rotation shaft 83 of the blade 80, and the second cover part 241 and the second cut part 242 of the second locking member 240 may be arranged at the same position in the forward/backward or the upward/downward direction.

Also, based on the left/right direction of the body part 81 of the blade 80, the first pressurizing protrusion 214 of the first rotation member 210, the first pressurizing part 234, the first limiting part 233, and the first stopper 261 of the first locking member 230, the second pressurizing protrusion 224 of the second rotation member 220, the second pressurizing part 244, the second limiting part 243, and the second stopper 262 of the second locking member 240 may be arranged at the same position in the forward/backward or the upward/downward direction.

That is, the first gear teeth part 212 and the first gear non-teeth part 213 of the first rotation member 210 may be arranged on the first body part 211 of the first rotation member 210 at different positions in the left/right direction of the first pressurizing protrusion 214 and the blade 80 and may be rotated in engagement with the first rotation member 210 without any confinement. (This also applies to the second rotation member 220.)

Hereinafter, driving features of the blade-driving device 200 will be described in more detail.

Figure 16A:
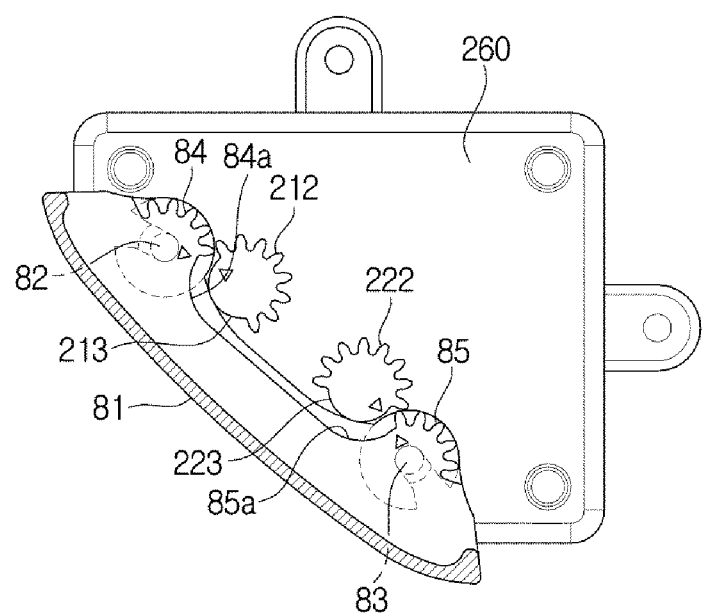
FIG. 16a is a side view of a blade of an air conditioner and a side view of a blade driving apparatus according to another embodiment of the present disclosure.
Figure 16B:
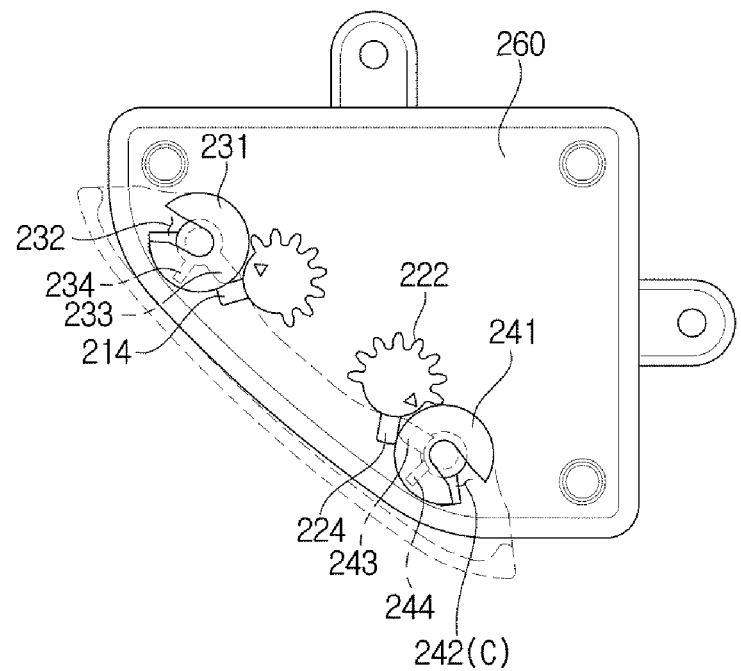
Figure 17A:
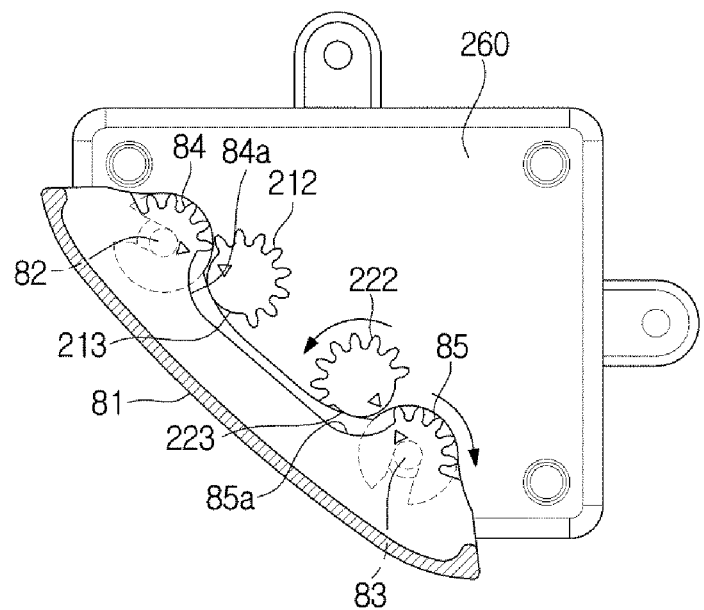
FIG. 17a is a side view of a blade and a side view of a blade driving apparatus in a state in which a second rotating member of a blade driving apparatus of an air conditioner is driven according to another embodiment of the present disclosure.
Figure 17B:
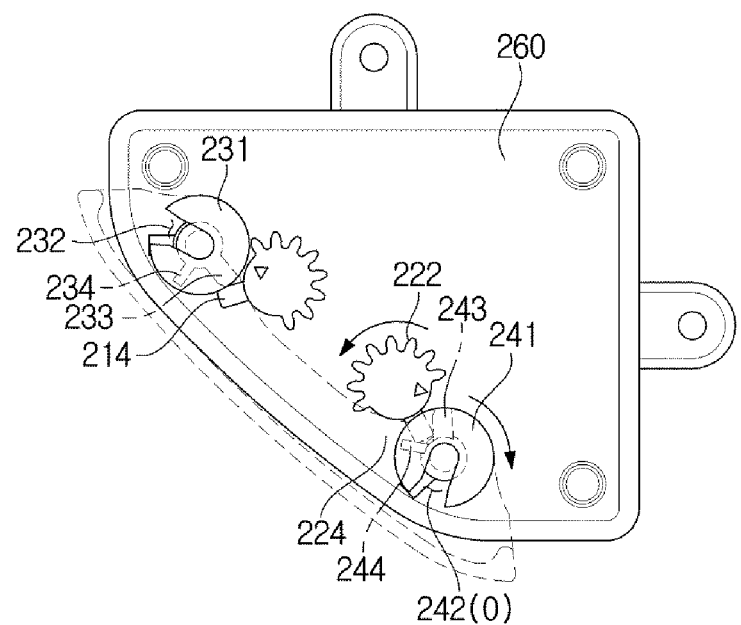
Figure 18A:
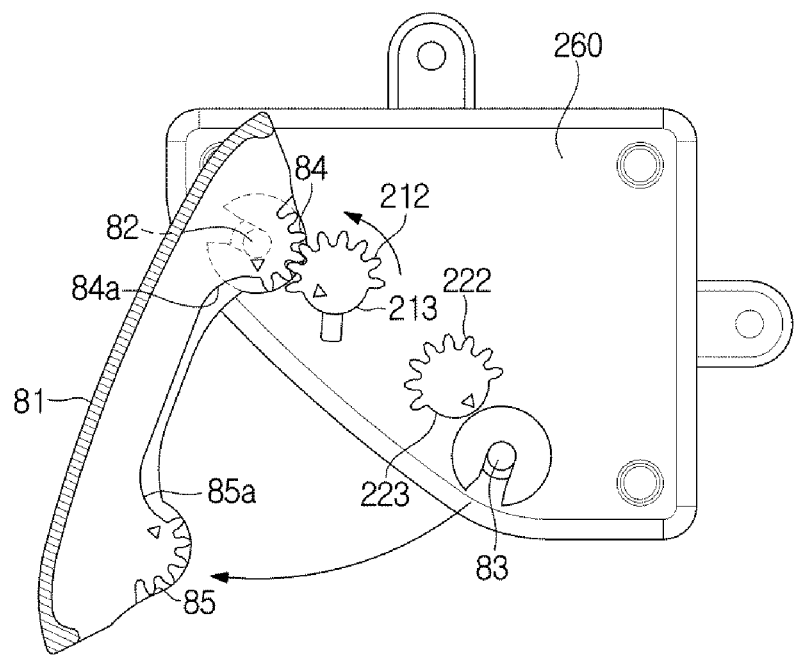
FIG. 18a is a side view of a blade and a side view of the blade driving apparatus in a state in which the first rotating member of the blade driving apparatus of the air conditioner is driven according to another embodiment of the present disclosure.
Figure 18B:
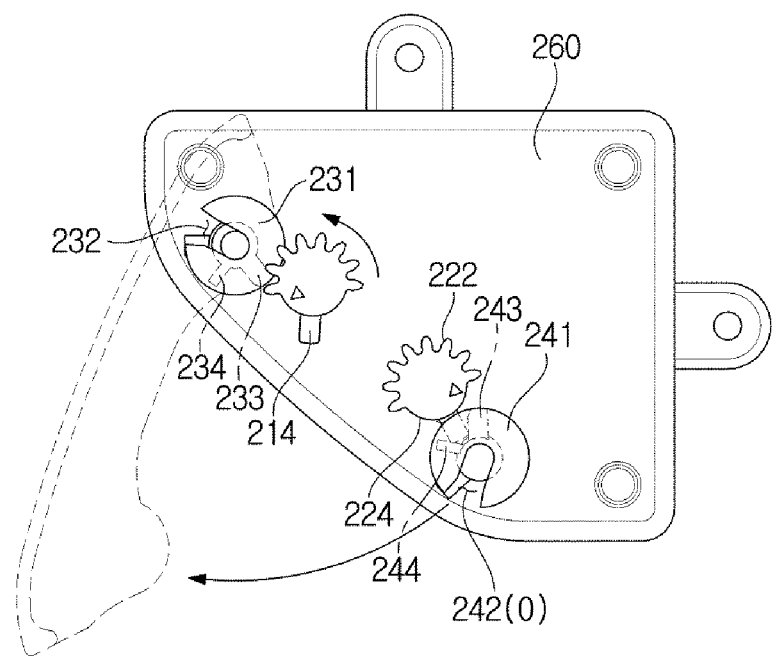
Figure 19:
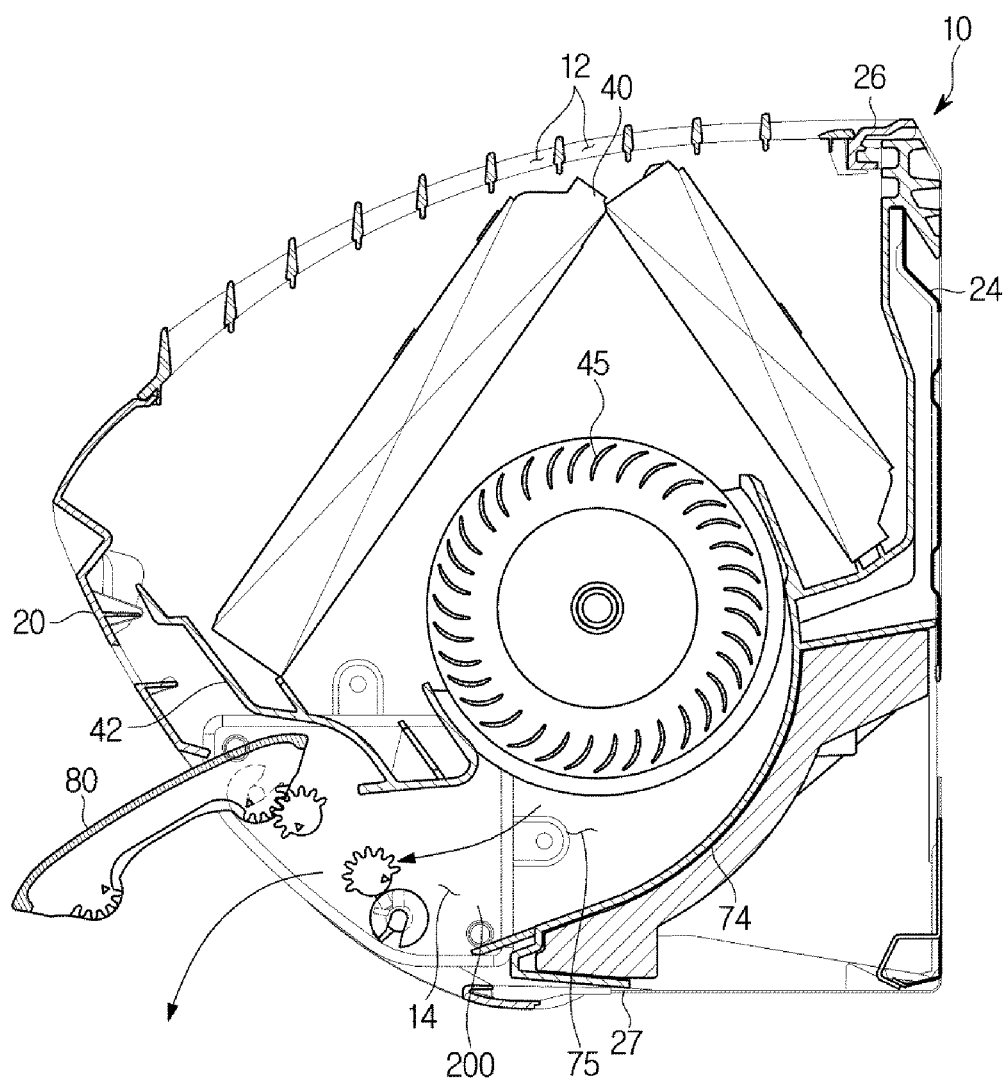
FIG. 19 is a side cross-sectional view of the air conditioner with the blades moved by the blade driving device of the air conditioner according to another embodiment of the present disclosure.
Figure 20A:
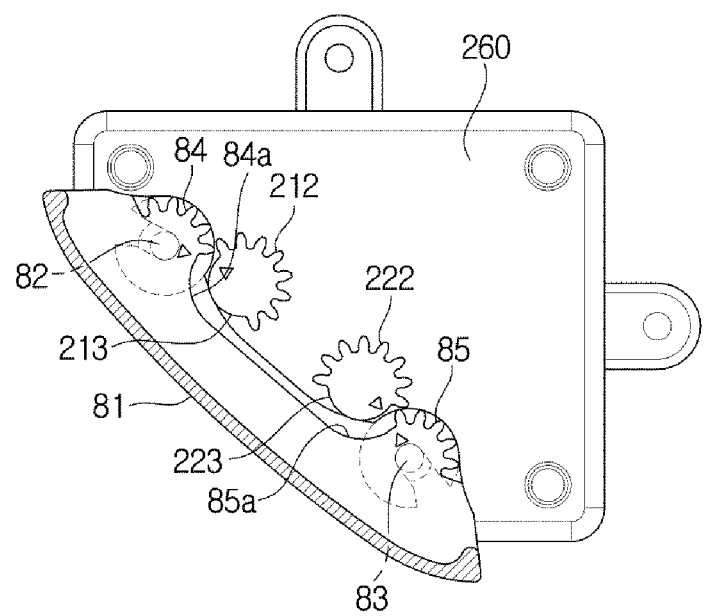
FIG. 20a is a side view of the blade in a state in which the second locking member is returned to the supporting position by the second rotating member of the blade driving apparatus of the air conditioner according to another embodiment of the present disclosure.
Figure 20B:
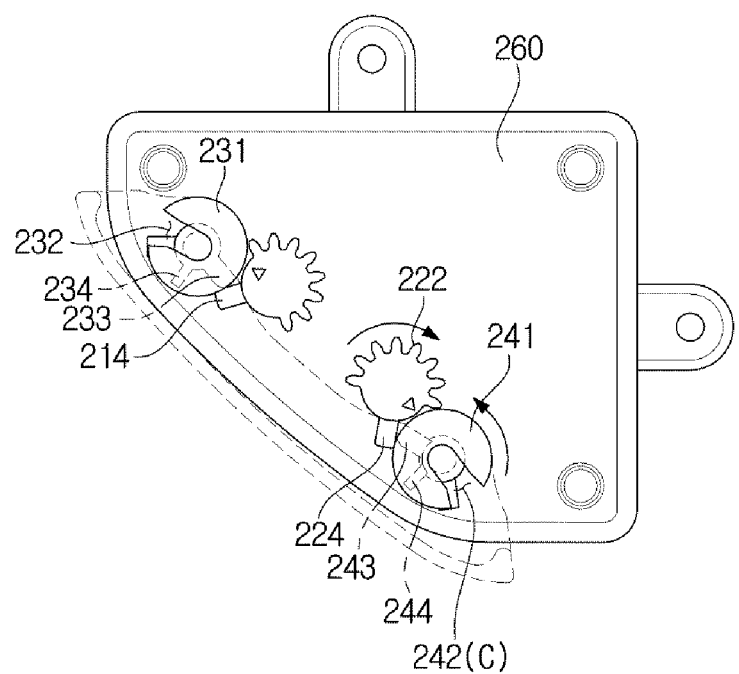

FIG. 16a is a view of side cross-sections of a blade and sides of a blade-driving device of an air conditioner according to another embodiment of the present disclosure, FIG. 16b is a view of a state in which the blade is removed from FIG. 16a, FIG. 17a is a view of side cross-sections of the blade in a state in which a second rotation member of the blade-driving device of the air conditioner according to another embodiment of the present disclosure is driven, and sides of the blade-driving device, FIG. 17b is a view of a state in which the blade is removed from FIG. 17a, FIG. 18a is a view of side cross-sections of the blade in a state in which a first rotation member of the blade-driving device of the air conditioner according to another embodiment of the present disclosure is driven, and sides of the blade-driving device, FIG. 18b is a view of a state in which the blade is removed from FIG. 18a, FIG. 19 is a side cross-sectional view of the air conditioner in a state in which the blade is moved by the blade-driving device of the air conditioner according to another embodiment of the present disclosure, FIG. 20a is a view of side cross-sections of the blade in a state in which a second locking member returns to a support position due to the second rotation member of the blade-driving device of the air conditioner according to another embodiment of the present disclosure, and sides of the blade-driving device, and FIG. 20b is a view of a state in which the blade is removed from FIG. 20a.

As illustrated in FIGS. 16a and 16b, when the blade 80 is placed at a closing position at which the blade 80 closes the discharge port 14, the first rotation shaft 82 and the second rotation shaft 83 may be supported by the first cover part 231 of the first locking member 230 and the second cover part 241 of the second locking member 240, respectively, and the blade 80 may be maintained at the closing position. That is, the first cut part 232 and the second cut part 242 are placed in a direction that does not correspond to a direction of gravity, so that the first rotation shaft 82 and the second rotation shaft 83 of the blade 80 may not deviate from the first locking member 230 and the second locking member 240 and may be supported.

As illustrated in FIGS. 17a and 17b, when the second rotation member 220 is rotated in one direction due to the second driving motor 252, the second pressurizing protrusion 224 may be rotated in one direction in engagement with the second rotation member 220, and the second pressurizing protrusion 224 may pressurize the second pressurizing part 244 to rotate the second locking member 240 in an opposite direction to the second rotation member 220.

The second cut part 242 of the second locking member 240 may be rotated and moved from a support position (see 242(C) of FIG. 16b) to an opening position (see 242(0) of FIG. 17b). Accordingly, the second rotation shaft 83 may deviate from the second locking member 240.

When the second locking member 240 is rotated, the second gear non-teeth part 223 of the second rotation member 220 and a non-teeth part 85a of the second blade gear part 85 face each other so that the blade 80 may not be moved and the second blade gear part 85 and the second rotation member 220 may not limit rotation of the second pressurizing protrusion 224.

When the second cut part 242 is placed at the opening position 242(0), rotation of the second driving motor 252 in one direction may be stopped, and the first driving motor 251 may be rotated in one direction, as illustrated in FIGS. 18a and 18b.

The first rotation member 210 may be rotated in one direction in engagement with the first driving motor 251. That is, while the first rotation member 210 is rotated, the first blade gear part 84 of the blade 80 and the first gear teeth part 212 may engage with each other so that the blade 80 may be rotated in an opposite direction to the first driving motor 251.

In this case, the second rotation shaft 83 may deviate from the blade-driving device 200 via the second cut part 242, and the other side of the blade 80 may be rotated around the first rotation axis X1 placed on the first rotation shaft 82.

While the first blade gear part 84 and the first gear teeth part 212 engage with each other and are rotated, the first pressurizing protrusion 214 is rotated in an opposite direction to a direction in which the first limiting part 233 is pressurized. Thus, only the blade 80 may be rotated while the first locking member 230 is not rotated. Thus, the first cover part 231 of the first locking member 230 may not be rotated, and the first rotation shaft 82 may be supported. Thus, while the second rotation axis X2 of the blade 80 is moved, the first locking member 230 may stably support the first rotation shaft 82 placed on the first rotation axis X1.

As illustrated in FIG. 19, when the blade 80 is moved to a position in which the upper side of the discharge port 14 is covered, due to engagement of the first blade gear part 84 and the first gear teeth part 212, driving of the first driving motor 251 may be stopped, and rotation of the blade 80 may be stopped. Thus, the blade 80 may be placed at the downward guide position at which the air current discharged from the discharge port 14 is guided in the downward direction.

The blade 80 may be placed at the downward guide position to effectively control the air current so that the direction of the upwardly-discharged air current may be changed into the downward direction.

When an operation of the air conditioner 1 is terminated, as illustrated in FIGS. 20a and 20b, the first driving motor 251 may be moved in an opposite direction, and the blade 80 may be moved to the closing position of the blade 80 again as the first rotation member 210 is rotated in the opposite direction.

When the blade 80 returns to its original position, rotation of the first driving motor 251 in the opposite direction may be stopped. Thus, movement of the blade 80 may be stopped. Subsequently, the second driving motor 252 may be rotated in the opposite direction, and the second pressurizing protrusion 224 may be rotated in the opposite direction in engagement with the second rotation member 220.

Thus, the second pressurizing part 244 rotated by the second pressurizing protrusion 224 may be rotated in the opposite direction. The second elastic member (not shown) may be provided to elastically support the second pressurizing part 244 to be rotated in the opposite direction.

Thus, the second elastic member (not shown) may assist with the second pressurizing part 244 moved in the opposite direction and the second locking member 240 that returns to its original position. As the second locking member 240 returns to its original position, the second cut part 242 may be moved again from the opening position 242(0) to the support position 242(C) to stably support the second rotation shaft 83.

Also, the second locking member 240 may be further rotated at its original position in the opposite direction due to the second elastic member (not shown). In this case, the second limiting part 243 may be in contact with the second stopper 262 so that the second cut part 242 may be prevented from being moved to the opening position 242(0) again due to additional rotation of the second locking member 240 at the closing position.

When the above-described structure operates contrariwise, the first rotation axis X1 may be moved based on the second rotation axis X2, and the blade 80 may be placed at the upward guide position at which the discharged air current is guided in the upward direction. A structure in which the blade 80 is moved to the upward guide position may be implemented by operating the above-described structure contrariwise. Thus, a description thereof will be omitted.

Hereinafter, a discharge blade 50' of an air conditioner according to another embodiment of the present disclosure will be described. The configuration other than the discharge blade 50' that will be described later, is similar to that of the air conditioner 1 according to an embodiment of the present disclosure and thus, a redundant description thereof will be omitted.

Figure 21:
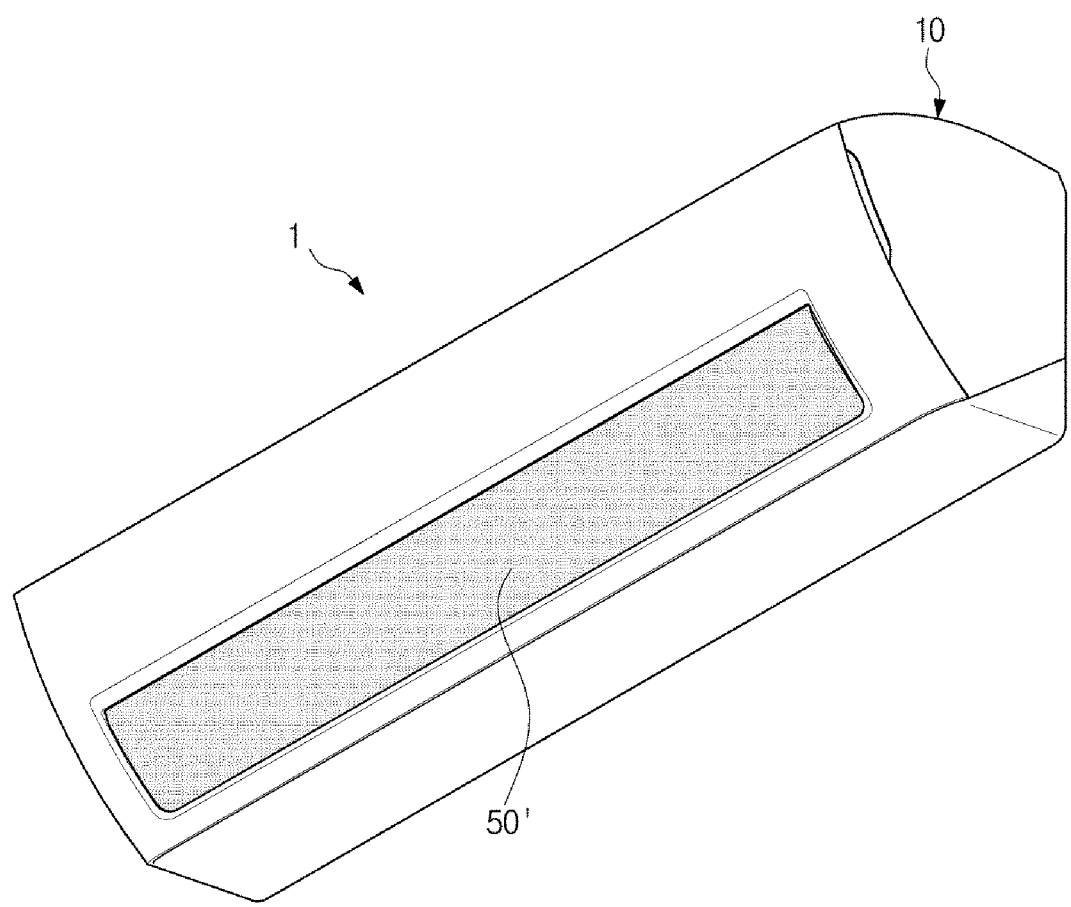
FIG. 21 is a perspective view of an air conditioner according to another embodiment of the present disclosure.

FIG. 21 is a perspective view of an air conditioner according to another embodiment of the present disclosure.

As illustrated in FIG. 21, an air conditioner 1 according to another embodiment of the present disclosure may include a discharge blade 50'. Even when the discharge blade 50' is not driven by a blade-driving device 100 but is placed at a closing position 50a, the discharge blade 50' may discharge the air heat-exchanged by a heat exchanger 40 to the outside of a housing 10 through a plurality of discharge holes formed in the discharge blade 50'.

In detail, the plurality of discharge holes may be formed in the discharge blade 50' to have minute sizes and may be uniformly distributed to the entire region of the discharge blade 50'. The air heat-exchanged by the heat exchanger 40 may be uniformly discharged at a low speed through the plurality of discharge holes.

Hereinafter, a sag prevention device 300 of the air conditioner 1 according to another embodiment of the present disclosure will be described. Hereinafter, the configuration other than the sag prevention device 300 that will be described later, is similar to that of the air conditioner 1 according to an embodiment of the present disclosure and thus, a redundant description thereof will be omitted.

Figure 22:
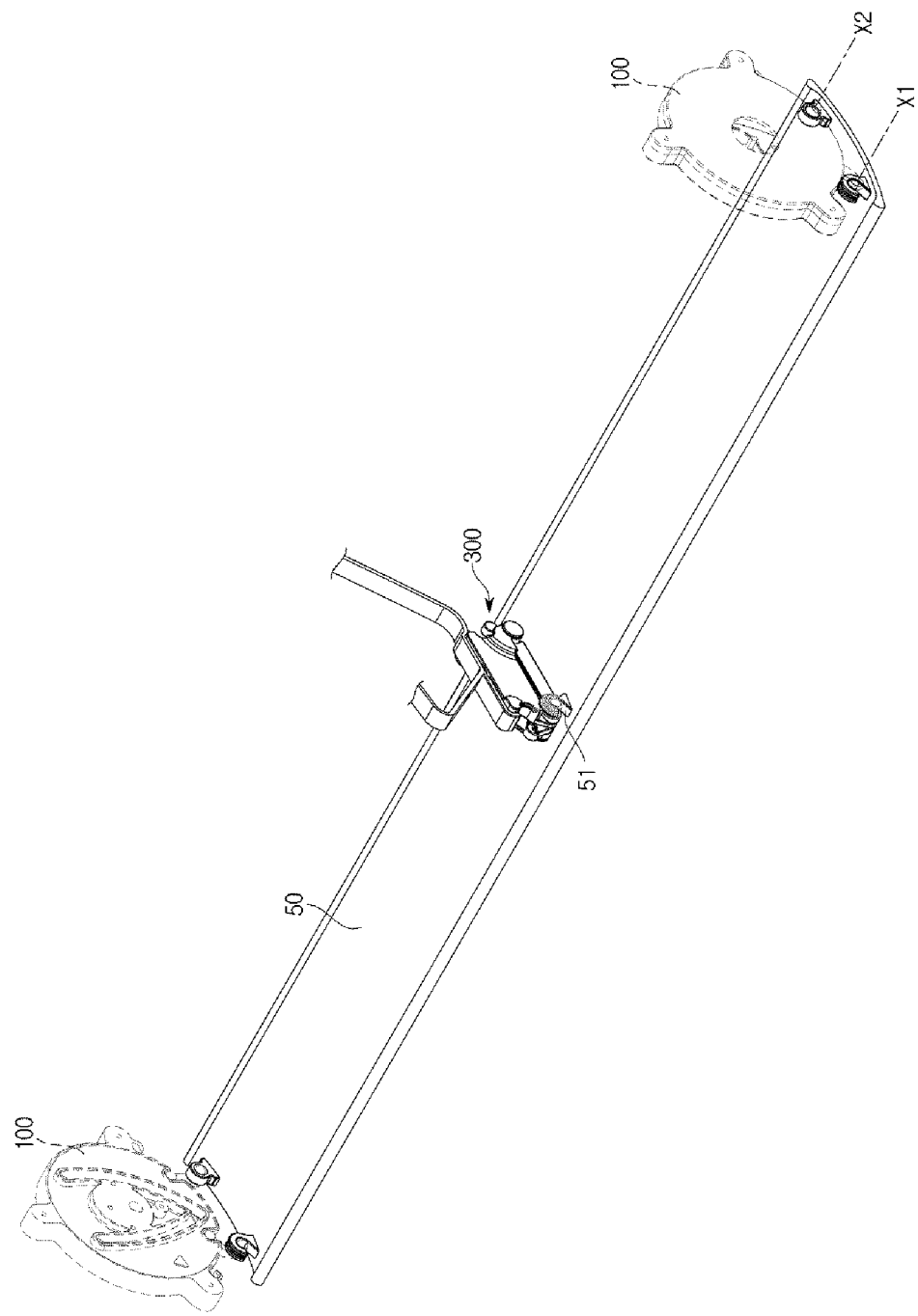
FIG. 22 is a perspective view of a blade and an sag prevention device of an air conditioner according to another embodiment of the present disclosure.
Figure 23:
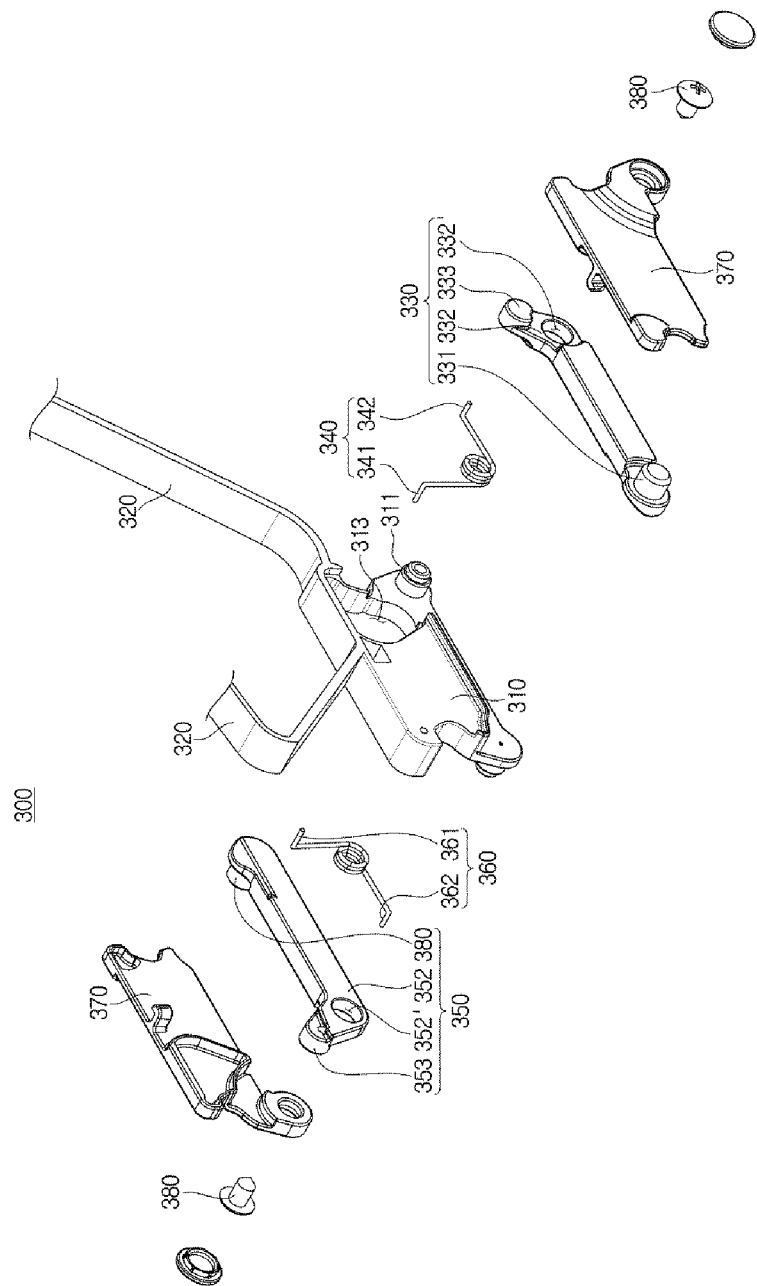
FIG. 23 is an exploded perspective view of a sag prevention device of an air conditioner according to another embodiment of the present disclosure.
Figure 24A:
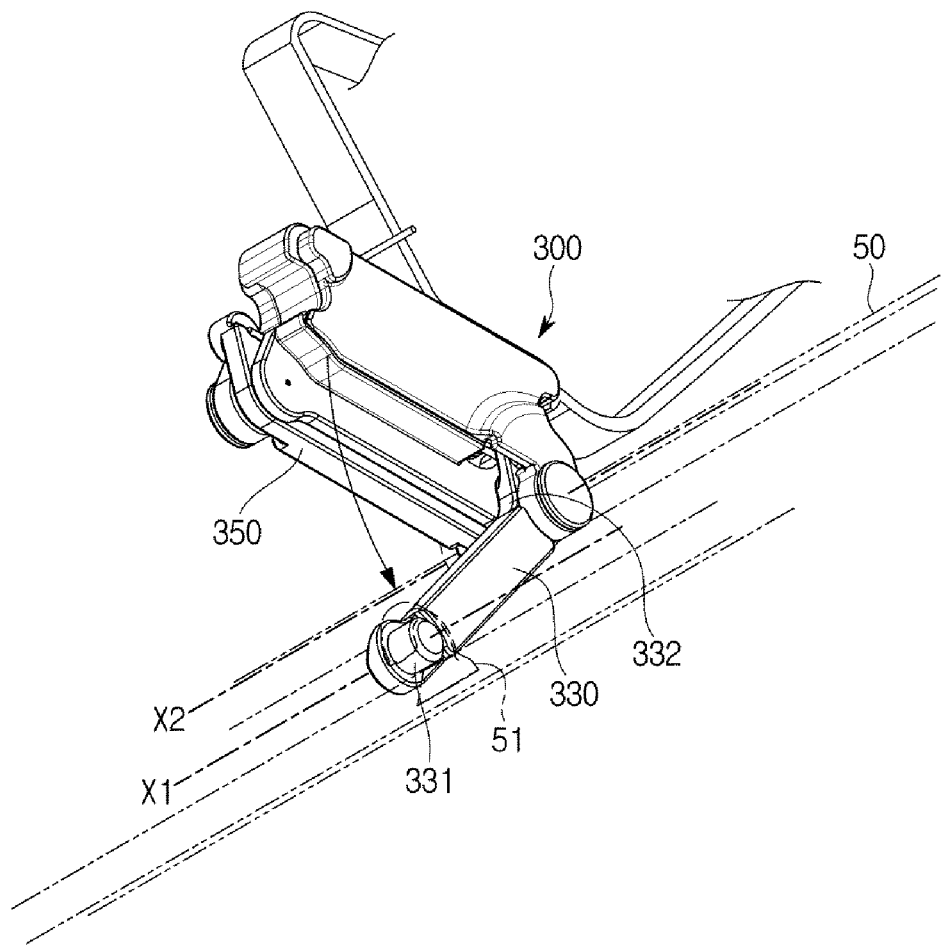
FIGS. 24a and 24b are views showing a state in which the sag prevention device of the air conditioner is driven according to another embodiment of the present disclosure.
Figure 24B:
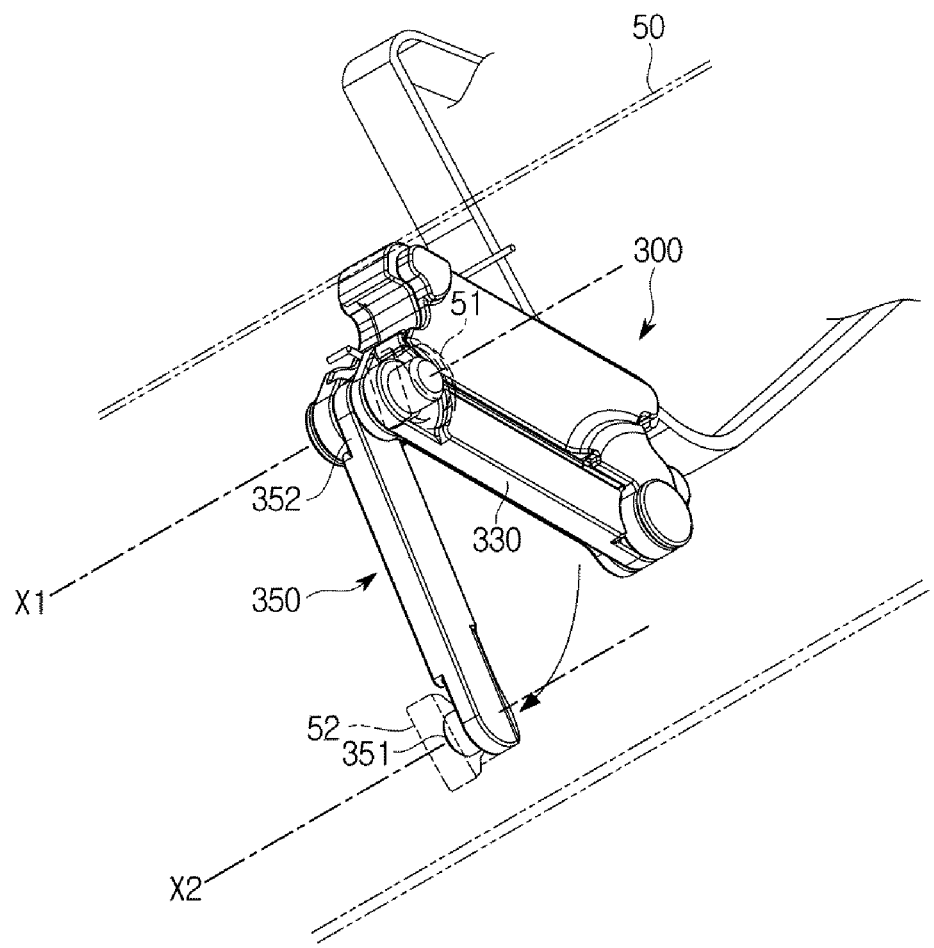
Figure 25A:
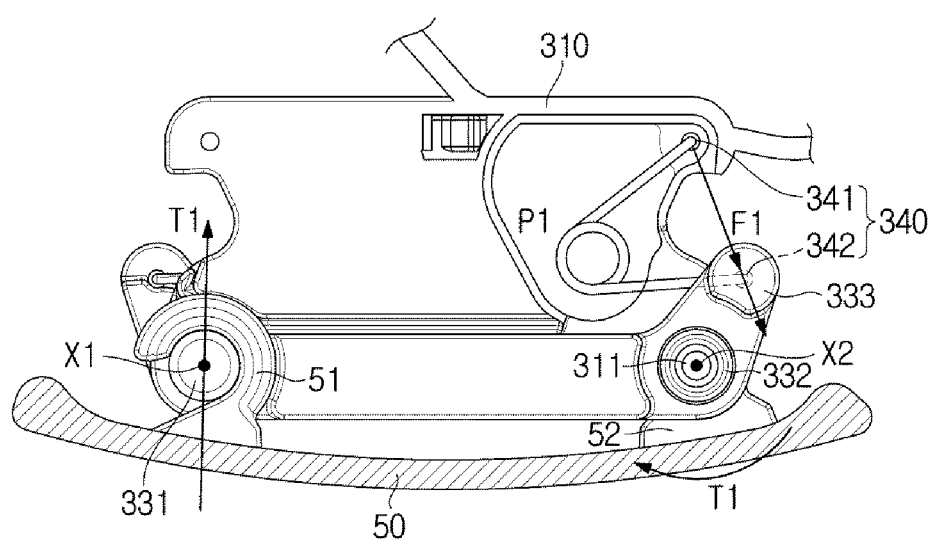
FIGS. 25a, 25b and 25c are sectional views of a sag prevention device of an air conditioner according to another embodiment of the present disclosure in a driven state.
Figure 25B:
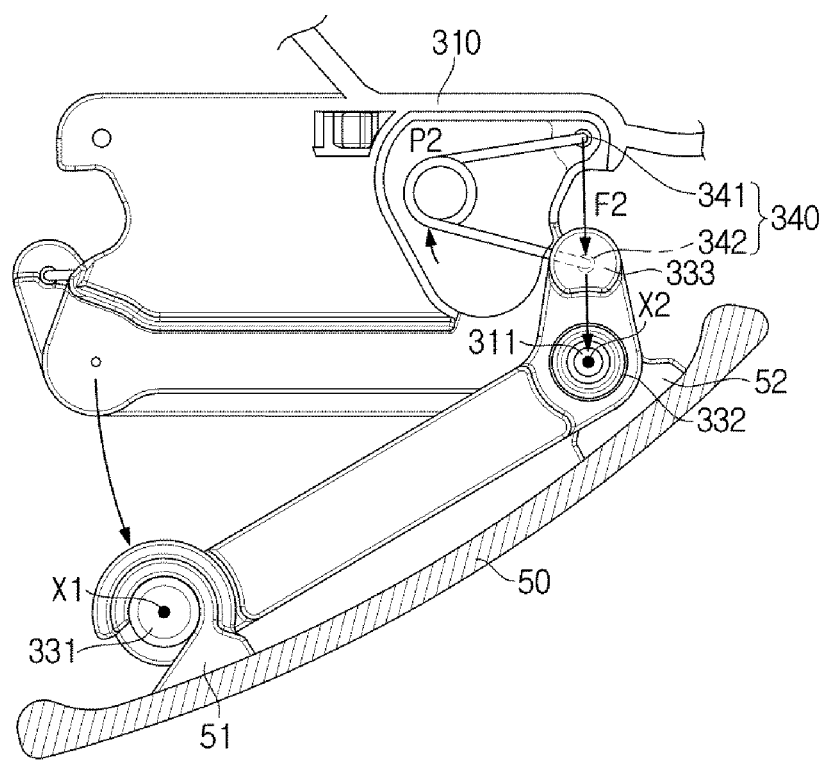
Figure 25C:
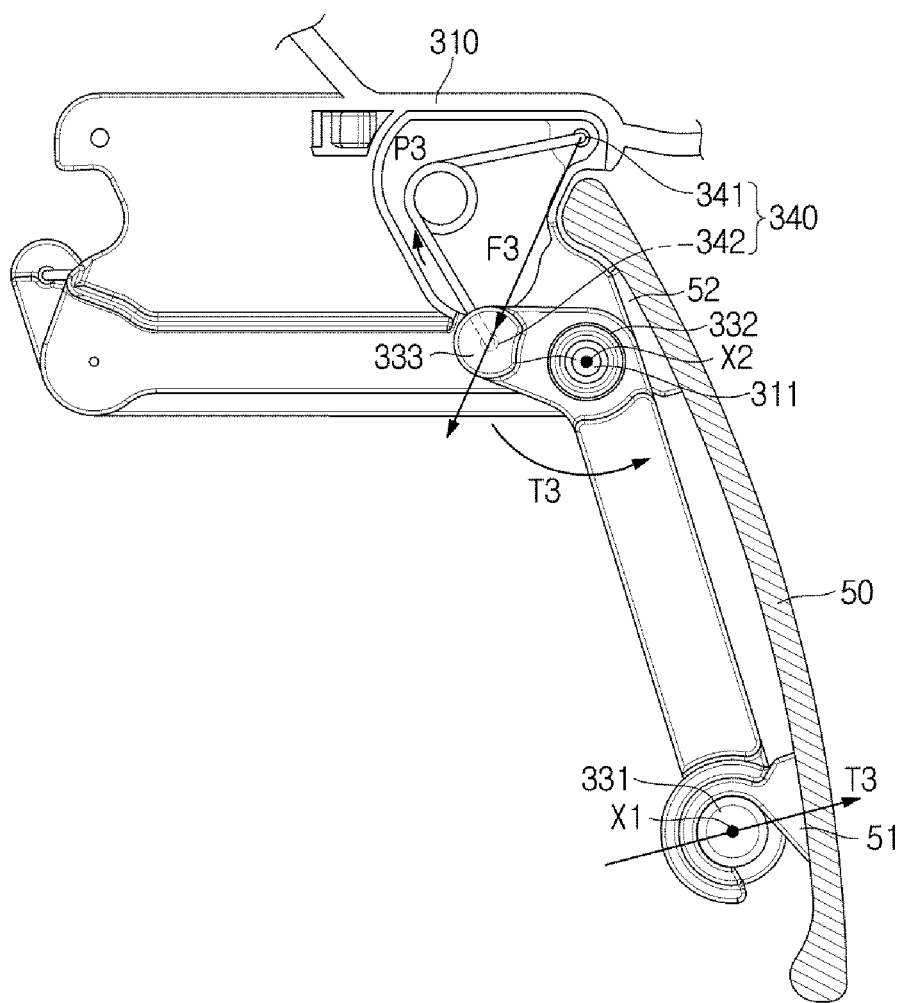

FIG. 22 is a perspective view of a blade and a sag prevention device of an air conditioner according to another embodiment of the present disclosure, FIG. 23 is an exploded perspective view of the sag prevention device of the air conditioner according to another embodiment of the present disclosure, FIGS. 24a and 24b are views of a state in which the sag prevention device of the air conditioner according to another embodiment of the present disclosure is driven, and FIGS. 25a through 25c are cross-sectional views of the driven state of the sag prevention device of the air conditioner according to another embodiment of the present disclosure.

As illustrated in FIGS. 22 and 23, the air conditioner 1 may include the sag prevention device 300 placed at a central side of the blade 50.

The sag prevention device 300 may be spaced a predetermined distance apart from the blade-driving device 100 and may prevent the blade 50 from sagging downwards due to the weight of the blade 50. In detail, the blade-driving device 100 may be placed at both ends or one end of the blade 50, as described above. Thus, a central part of the blade 50 may sag downwards due to the weight of the blade 50.

Thus, when there is no additional element for supporting the blade 50, in particular, the central part of the blade 50 may sag downwards due to the weight of the blade 50 so that bending may occur in the blade 50.

To prevent this phenomenon, the air conditioner according to another embodiment of the present disclosure may include the sag prevention device 300 placed at the central side of the blade 50. The sag prevention device 300 may be applied to both the blade 50 according to an embodiment of the present disclosure and the discharge blade 50' according to another embodiment of the present disclosure.

In the related art, a blade-driving device is additionally placed at a central part of the blade, or the thickness of the blade is increased, or a rib is formed in the blade to prevent bending of the blade.

However, in the air conditioner 1 according to the present disclosure, the blade 50 may be rotated around two rotation axes X1 and X2 upwards or downwards so that, when the blade-driving device 100 is additionally placed at the central part of the blade 50, the flow of air may be deteriorated.

Also, in the air conditioner 1 according to another embodiment of the present disclosure, when the thickness of the discharge blade 50' is increased or an additional rib is provided to ensure rigidity of the discharge blade 50' having a plurality of discharge holes in the discharge blade 50', the flow of the air discharged through the plurality of discharge holes may be deteriorated.

To solve this problem, the air conditioner according to another embodiment of the present disclosure may include the sag prevention device 300 to effectively prevent bending of the blade 50.

The sag prevention device 300 may include a main body 310, and a connection part 320 that extends from the main body 310 and is connected to the housing 10 of the air conditioner 1 so that the sag prevention device 300 may be coupled to the housing 10.

The main body 310 may include a first support axis 311 and a second support axis (not shown), which are placed at one side of the main body 310, the first support axis 311 inserted into a first support member 330 that will be described later, being a rotation axis of the first support member 330 and formed to correspond to the second rotation axis X2, and the second support axis (not shown) inserted into a second support member 350, being a rotation axis of the second support member 350 and formed to correspond to the first rotation axis X1.

The sag prevention device 300 may be placed at the central part of the blade 50. The blade 50 may include a first rotation part 51 and a second rotation part 52, which are supported by the sag prevention device 300.

The first rotation part 51 may be placed in the same line as an extension direction of the first rotation axis X1. Thus, when the blade 50 is rotated around the first rotation axis X1, the first rotation part 51 may be a rotation axis of the blade 50 together with the first rotation axis X1.

The second rotation part 52 may be placed in the same line as an extension direction of the second rotation axis X2. Thus, when the blade 50 is rotated around the second rotation axis X2, the second rotation part 52 may be a rotation axis of the blade 50 together with the second rotation axis X2.

Also, the above-described first support axis 311 may be placed in the same line as an extension direction of the second rotation part 52 and the second rotation axis X2, and the second support axis (not shown) may be placed in the same line as an extension direction of the first rotation part 51 and the first rotation axis X1.

The sag prevention device 300 may include the first support member 330 rotatably coupled to the first rotation part 51 and pivoted around the second rotation axis X2 in engagement with the first rotation part 51 when the blade is rotated around the second rotation axis X2, and a first elastic member 340 configured to elastically pressurize the first support member 330.

One end 342 of the first elastic member 340 may be connected to the first support member 330, and the other end 341 of the first elastic member 340 may be connected to the main body 310.

The first elastic member 340 may pressurize the first support member 330 so that a torque may be generated in an opposite direction to a direction of gravity around the second rotation axis X2. Thus, the first support member 330 may support the first rotation part 51 in the opposite direction to gravity to prevent the blade 50 from sagging downwards. This will be described in more detail.

The first support member 330 may include a first coupling part 331 placed at one side of the first support member 330 and rotatably coupled to the first rotation part 51, a first axis part 332 placed at the other side of the first support member 330, having a first rotation hole 332' into which the first support axis 311 is inserted, and being able to rotate with respect to the first support axis 311, and a first support hole part 333 that further extends to the other side of the first support member 330 from the first axis part 332, has a first support hole into which one end 342 of the first elastic member 340 is inserted, and is supported by the first elastic member 340.

Also, the sag prevention device 300 may include the second support member 350 rotatably coupled to the second rotation part 52 and pivoted around the first rotation axis X1 in engagement with the second rotation part 52 when the blade 50 is rotated around the first rotation axis X1, and a second elastic member 360 that elastically pressurizes the second support member 350.

One end 362 of the second elastic member 360 may be connected to the second support member 350, and the other end 361 of the second elastic member 360 may be connected to the main body 310.

The second elastic member 360 may pressurize the second support member 350 so that a torque may be generated in an opposite direction to a direction of gravity around the first rotation axis X1. Thus, the second support member 350 may support the second rotation part 52 in the opposite direction to gravity to prevent the blade 50 from sagging downwards.

The second support member 350 may include a second coupling part 351 placed at one side of the second support member 350 and rotatably coupled to the second rotation part 52, a second axis part 352 including a second rotation hole 352' into which the second support axis (not shown) is inserted and extending to the other side of the second support member 350 so that the second support member 350 is able to rotate with respect to the second support axis (not shown), and a second support hole part 353 that further extends to the other side of the second support member 350 from the second axis part 352, has a second support hole into which one end 362 of the second elastic member 360 is inserted, and is supported by the second elastic member 360.

The first support member 330 and the second support member 350 may be fixed to the first support axis 311 and the second support axis (not shown), respectively, using a fixing member 380. The first support axis 311 and the second support axis (not shown) may be inserted into the first support member 330 and the second support member 350, respectively, and the first support member 330 and the second support member 350 may be prevented from deviating from the first support axis 311 and the second support axis (not shown), respectively, using the fixing member 380. However, embodiments of the present disclosure are not limited thereto, and the first support member 330 and the second support member 350 may be fixed to the first support axis 311 and the second support axis (not shown) using various methods.

The first elastic member 340 and the second elastic member 360 may be placed at one side and the other side of the main body 310, respectively. Each of the first elastic member 340 and the second elastic member 360 may be accommodated in an accommodation space 313 (a space in which the second elastic member 360 is accommodated, is not shown) formed inside the main body 310 and may be pivotably placed in the accommodation space 313.

A cover 370 that covers a space in which the first elastic member 340 and the second elastic member 360 are accommodated, may be placed at one side and the other side of the main body 310.

Hereinafter, pivoting of the first support member 330 and the second support member 350 in engagement with the blade 50 will be described.

As illustrated in FIGS. 24a and 24b, one side of the first support member 330 may be rotatably coupled to the first rotation part 51 of the blade 50, and the other side of the first support member 330 may be rotatably coupled to the main body 310. Thus, when the blade 50 is rotated around the second rotation axis X2, the first support member 330 may be pivoted around the second rotation axis X2 in engagement with the blade 50.

As illustrated in FIG. 24a, when the blade 50 is rotated around the second rotation axis X2, the first rotation part 51 may be pivoted in the downward direction, and the first coupling part 331 coupled to the first rotation part 51 may be pivoted in the downward direction.

Also, the first axis part 332 of the first support member 330 may be rotated around the first support axis 311, as described above, and the first coupling part 331 may be rotated in the downward direction, like in the first rotation part 51, and the first axis part 332 may be pivoted on the spot around the first support axis 311. The first support axis 311 may be formed to correspond to the second rotation axis X2. Thus, the first axis part 332 may be rotated around the second rotation axis X2.

Thus, the first support member 330 may be pivoted in the downward direction together with the blade 50 in a state in which the second rotation axis X2 is used as a rotation axis.

In this case, the second rotation part 52 may be placed in the center of rotation of the blade 50. Thus, the second rotation part 52 may not be moved in the upward/downward direction but may be rotated in a direction in which the blade 50 is rotated, from a position at which the second rotation part 52 is placed, when the blade 50 is in a closed state.

Because the second rotation part 52 is not moved, the second support member 350 configured to support the second rotation part 52 may not be pivoted in engagement with the blade 50 even when the blade 50 is rotated. Because the second support member 350 is rotatably coupled to the second rotation part 52, even when the second rotation part 52 is rotated, the second support member 350 may support the second rotation part 52 while not being moved.

Contrary to this, as illustrated in FIG. 24b, when the blade 50 is rotated around the first rotation axis X1, the second rotation part 52 may be pivoted in the downward direction, and the second coupling part 351 coupled to the second rotation part 52 may be pivoted in the downward direction.

Also, the second axis part 352 of the second support member 350 may be rotated around the second support axis (not shown), as described above. The second coupling part 351 may be rotated to move in the downward direction, like in the second rotation part 52, and the second axis part 352 may be pivoted on the spot around the second support axis (not shown). Because the second support axis (not shown) may be formed to correspond to the first rotation axis X1, the second axis part 352 may be rotated around the second rotation axis X2.

Thus, the second support member 350 may be pivoted in the downward direction together with the blade 50 in a state in which the first rotation axis X1 is used as a rotation axis.

In this case, because the first rotation part 51 is placed at the center of rotation of the blade 50, the first rotation part 51 may not be moved in the upward/downward direction but may be rotated in a direction in which the blade 50 is rotated, from a position at which the first rotation part 51 is placed, when the blade 50 is in a closed state.

Because the first rotation part 51 is not moved, the first support member 330 configured to support the first rotation part 51 is not pivoted in engagement with the blade 50 even when the blade 50 is rotated. Because the first support member 330 is rotatably coupled to the first rotation part 51, even when the first rotation part 51 is rotated, the first support member 330 may support the first rotation part 51 while not being moved.

Even when the blade 50 is rotated in the upward/downward direction around the first rotation axis X1 and the second rotation axis X2, when the blade 50 is rotated around the first rotation axis X1, the first support member 330 may support the first rotation part 51 while not being pivoted, and when the blade 50 is rotated around the second rotation axis X2, the second support member 350 may support the second rotation part 52 while not being pivoted so that, even when the blade 50 is rotated in any direction, the sag prevention device 300 may prevent the blade 50 from sagging due to the weight of the blade 50.

That is, when the blade 50 is in the closed state, the first rotation part 51 and the second rotation part 52 may be supported by the first support member 330 and the second support member 350, respectively, and even when the first rotation part 51 and the second rotation part 52 are rotated around one of the first rotation axis X1 and the second rotation axis X2, the first rotation part 51 or the second rotation part 52 may be continuously supported by the first support member 330 or the second support member 350 so that, under any circumstances, the blade 50 may not sag since the center part of the blade 50 is supported by the sag prevention device 300.

Hereinafter, features of the first support member 330 and the second support member 350 configured to support the first rotation part 51 and the second rotation part 52, respectively, due to the first elastic member 340 and the second elastic member 360, will be described.

As described above, the first support member 330 and the second support member 350 are coupled to each other to be rotatable with respect to the main body 310. Thus, even when the first support member 330 and the second support member 350 are coupled to the first rotation part 51 and the second rotation part 52, respectively, the blade 50 may not be pressurized in the upward direction.

That is, when the first elastic member 340 and the second elastic member 360 do not elastically support the first support member 330 and the second support member 350, due to the weight of the blade 50, the first support member 330 and the second support member 350 may be rotated in the downward direction together with the blade 50 so that bending of the blade 50 may not be prevented from occurring.

The first elastic member 340 may pressurize the other side of the first support member 330 to prevent the other side of the first support member 330 from sagging. Thus, the first rotation part 51 coupled to one side of the first support member 330 may be prevented from sagging in the downward direction.

Likewise, the second elastic member 360 may pressurize the other side of the second support member 350 to prevent the other side of the second support member 350 from sagging. Thus, the second rotation part 52 coupled to one side of the second support member 350 may be prevented from sagging in the downward direction.

In detail, as illustrated in FIG. 25a, one end 342 of the first elastic member 340 may elastically pressurize the first support hole part 333 of the first support member 330 in the downward direction. That is, when the blade 50 is in the closed state, the first elastic member 340 may generate a pressurizing force F1 for pressurizing the first support member 330 at a first position P1.

In this case, the first support member 330 may be pivoted around the second rotation axis X2, and a torque T1 in a direction of the pressurizing force F1 may be generated in the first axis part 332 due to the pressurizing force F1 transferred to the first support hole part 333.

Referring to FIG. 25a, as the pressurizing force F1 pressurizes the first support member 330 in a right and downward direction based on the second rotation axis X2, the torque T1 is formed in the first axis part 332 clockwise.

Thus, the first support member 330 may be supported in the upward direction due to the torque T1. In particular, the first rotation part 51 connected to the first coupling part 331 of the first support member 330 may not sag in the downward direction due to the first coupling part 331 but may be supported in the upward direction. Thus, the first rotation part 51 may be prevented from sagging due to the first support member 330 and the first elastic member 340.

In the same way, a support force may be formed in the second rotation part 52 in the upward direction due to the second support member 350 and the second elastic member 360 so that the second rotation part 52 may be prevented from sagging in the downward direction. A description thereof is the same as the above description of the first rotation part 51 and thus, a redundant description thereof will be omitted.

Subsequently, as illustrated in FIG. 25b, when the blade 50 is rotated around the second rotation axis X2, the first support member 330 may be pivoted around the second rotation axis X2 in engagement with the blade 50, as described above.

In this case, when the first elastic member 340 is continuously placed at the first position P1, the torque T1 in an opposite direction to the rotation direction of the blade 50 is generated in the first support member 330 so that reliability of rotation of the blade 50 may be deteriorated.

To prevent this phenomenon, the first elastic member 340 may be pivoted at a predetermined distance in engagement with the first support member 330 while the blade 50 is pivoted.

In detail, one end 342 of the first elastic member 340 is coupled to the first support hole part 333 of the first support member 330. One end 342 of the first elastic member 340 may be rotatably coupled to the first support hole part 333. Also, the other end 341 of the first elastic member 340 may be rotatably coupled to the main body 310.

When the first support member 330 is pivoted, one end 342 of the first elastic member 340 may also be pivoted together with the first support hole part 333. The first elastic member 340 may be pivoted to a second position P2 in engagement with pivoting of the first support hole part 333. The second position P2 may be predetermined.

When the first elastic member 340 is placed at the second position P2, one end 342 of the first elastic member 340 may pressurize the first support hole part 333 in a direction of the second rotation axis X2. In this case, because the first elastic member 340 generates a pressurizing force F2 in the direction of the second rotation axis X2 that is a rotation axis of the first support member 330, no torque or a very small torque may be formed in the first axis part 332.

Thus, when the first support member 330 is pivoted at a predetermined distance, no torque or a fine torque may be formed in an opposite direction to pivoting so that pivoting of the first support member 330 may not be limited. Thus, the blade 50 may be easily rotated without being influenced.

Subsequently, as illustrated in FIG. 25c, the first elastic member 340 may be pivoted to a third position P3 farther moved than the second position P2 based on the first position P1 in engagement with pivoting of the first support hole part 33.

One end 342 and the other end 341 of the first elastic member 340 are rotatably coupled to the first support hole part 333 and the main body 310, respectively. Thus, even when the first support hole part 333 is farther pivoted, the first elastic member 340 may not be further pivoted when reaching the third position P3 and may be placed at the third position P3. That is, even when the blade 50 is fully opened around the second rotation axis X2, the first elastic member 340 may be continuously placed at the third position P3.

When the first elastic member 340 is placed at the third position P3, one end 342 of the first elastic member 340 may elastically pressurize the first support hole part 333 of the first support member 330 in the downward direction. When the blade 50 is fully opened, the first elastic member 340 may generate a pressurizing force F3 for pressurizing the first support member 330 at the second position P2.

In this case, the first support member 330 may be pivoted around the second rotation axis X2, and a torque T3 may be generated in the first axis part 332 in a direction of the pressurizing force F3 due to the pressurizing force F3 transferred to the first support hole part 333.

Referring to FIG. 25c, as the pressurizing force F3 pressurizes the first support member 330 in a left and downward direction based on the second rotation axis X2, the torque T3 is formed in the first axis part 332 counter-clockwise.

Thus, the first support member 330 may be supported in the upward direction due to the torque T3. In particular, the first rotation part 51 connected to the first coupling part 331 of the first support member 330 may not sag in the downward direction due to the first coupling part 331 but may be supported in the upward direction. Thus, the first rotation part 51 may be prevented from sagging due to the first support member 330 and the first elastic member 340.

That is, as the position of the first elastic member 340 is changed even in the opened state of the blade 50, the torque T2 in the opposite direction to the torque T1 generated in the closed state may be formed in the first axis part 332, and when the blade 50 is in the closed state, the first support member 330 may be supported in an opposite rotation direction.

Also, when the first elastic member 340 is farther pivoted than the second position P2 even before the blade 50 is fully opened, the torque T3 may be formed in the first support member 330 in the same direction as the rotation direction of the blade 50. Thus, even when the first support member 330 is opened, the first rotation part 51 may be supported by the first elastic member 340 in the upward direction and the blade 50 may be prevented from sagging in the downward direction even when an opening operation is generated. Because the support force of the first elastic member 340 is formed in the opening direction of the blade 50, reliability of opening of the blade 50 may be ensured.

As illustrated in FIGS. 25b and 25c, when the first support member 330 is pivoted, the first elastic member 340 may continuously support the first rotation part 51 in the upward direction. In this case, the second support member 350 that is not pivoted may also support the second rotation part 52 that is not pivoted, in the upward direction. That is, the second support member 350 may support the second rotation part 52 on the same condition as the closed state of the blade 50. Thus, the first rotation part 51 and the second rotation part 52 may be prevented from sagging due to the first support member 330 and the second support member 350, the first elastic member 340 configured to elastically pressurize the first support member 330, and the second elastic member 360 configured to elastically pressurize the second support member 350, while the blade 50 is pivoted around the second rotation axis X2.

Even when the blade 50 is rotated around the first rotation axis X1, operations of the first support member 330 and the second support member 350 are just symmetrically converted, and the first support member 330 and the second support member 350 support the first rotation part 51 and the second rotation part 52, respectively, in the same way. Thus, a redundant description thereof will be omitted.

Hereinafter, a sag prevention device 400 of an air conditioner according to another embodiment of the present disclosure will be described. The configuration other than the sag prevention device 400 that will be described later is similar to that of the air conditioner 1 according to another embodiment of the present disclosure and thus, a redundant description thereof will be omitted.

Figure 26:
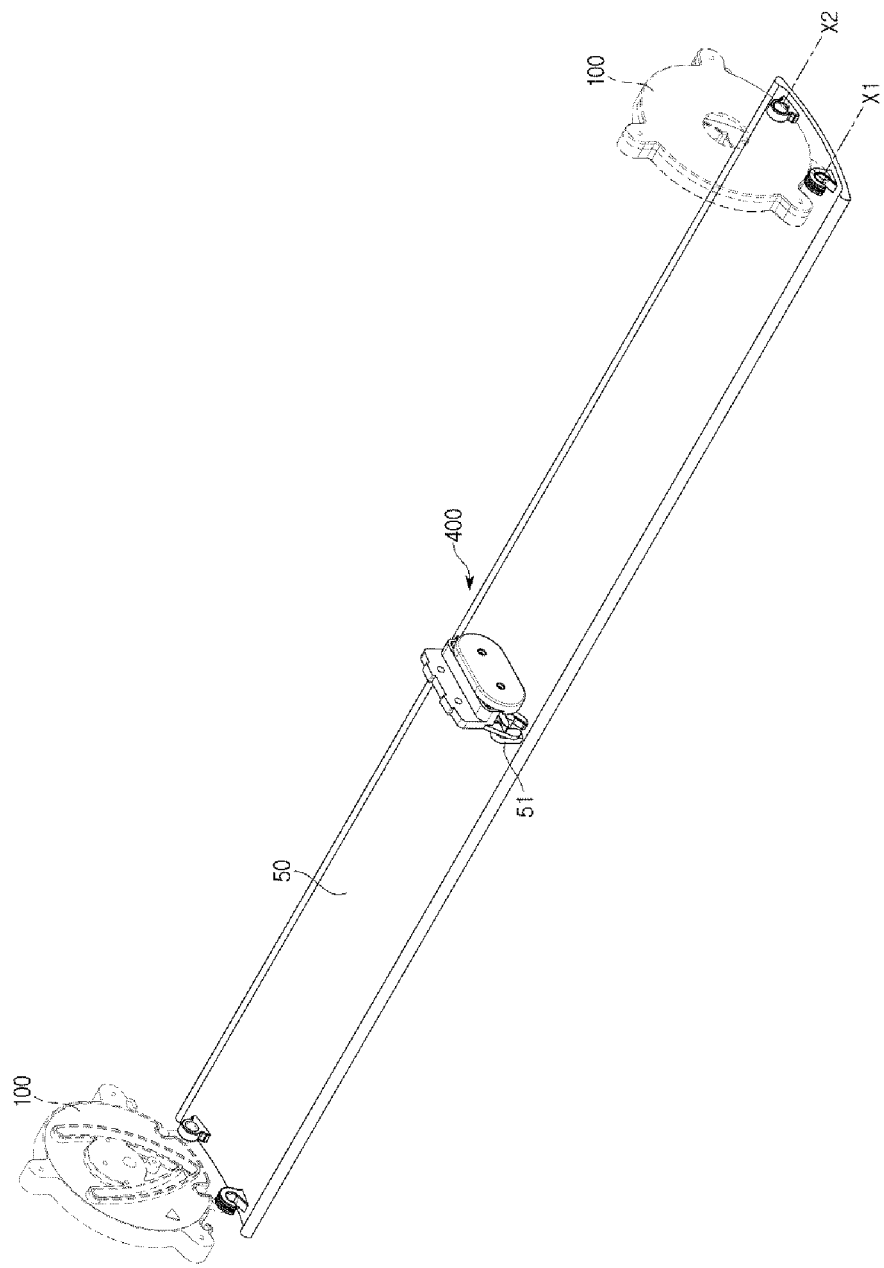
FIG. 26 is a perspective view of a blade and sag prevention device of an air conditioner according to another embodiment of the present disclosure.
Figure 27:
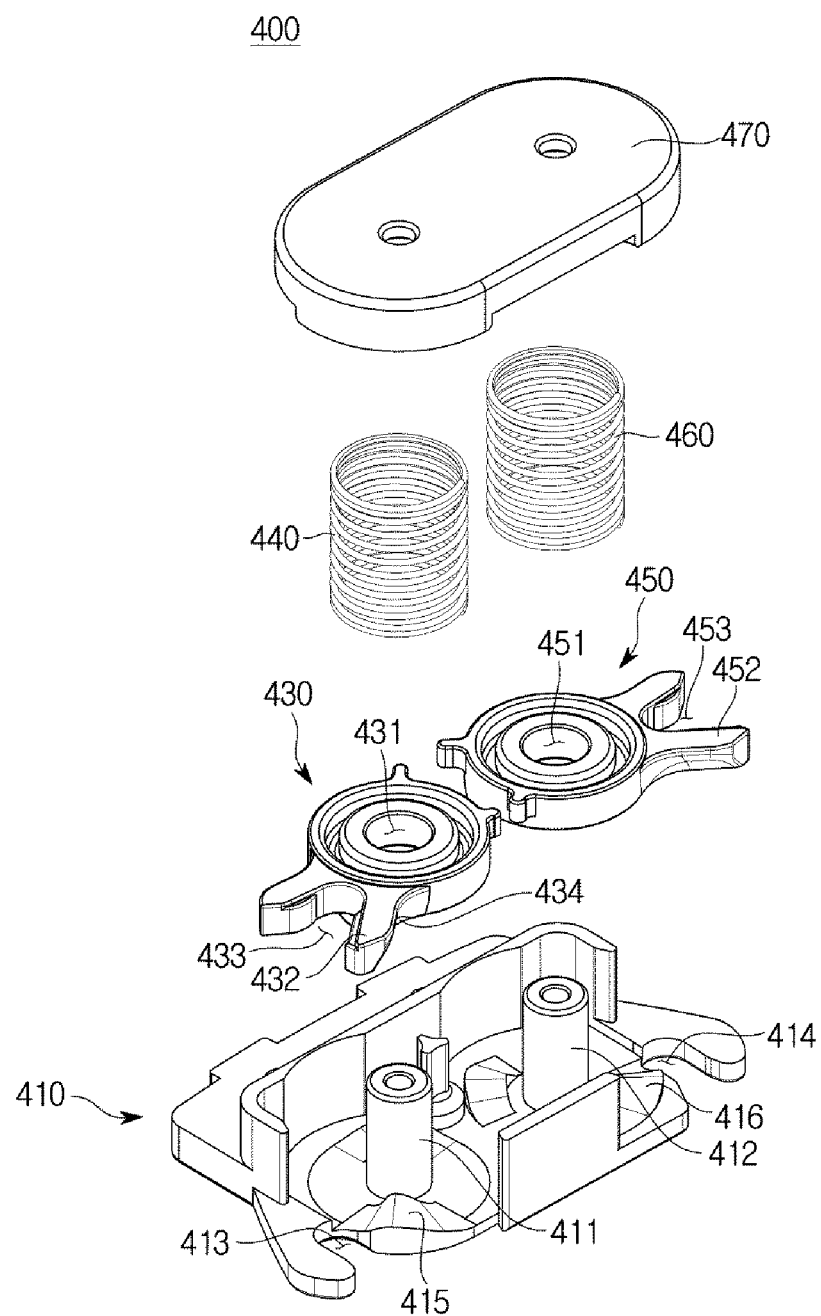
FIG. 27 is an exploded perspective view of a sag prevention device of an air conditioner according to another embodiment of the present disclosure.
Figure 28:
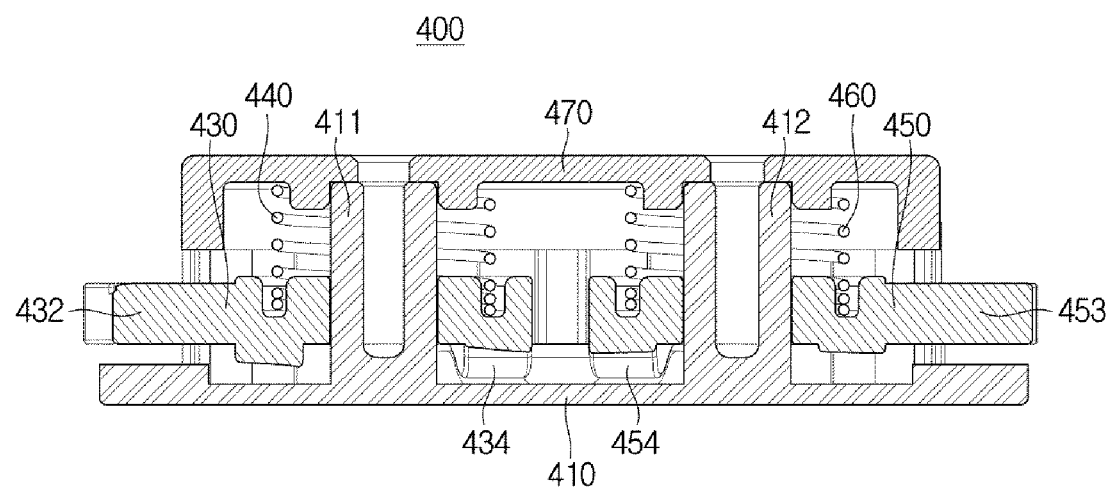
FIG. 28 is a sectional view of a sag prevention device of an air conditioner according to another embodiment of the present disclosure.

FIG. 26 is a perspective view of a blade and a sag prevention device of an air conditioner according to another embodiment of the present disclosure, FIG. 27 is an exploded perspective view of the sag prevention device of the air conditioner according to another embodiment of the present disclosure, FIG. 28 is a cross-sectional view of the sag prevention device of the air conditioner according to another embodiment of the present disclosure, and FIGS. 29a through 30b are cross-sectional views of a driven state of the sag prevention device of the air conditioner according to another embodiment of the present disclosure.

The sag prevention device 400 may be spaced a predetermined distance apart from the blade-driving device 100 and may prevent the blade 50 from sagging in the downward direction due to the weight of the blade 50. In detail, the blade-driving device 100 may be placed at both ends or one end of the blade 50, as described above. Thus, the central part of the blade 50 may sag in the downward direction due to the weight of the blade 50.

Thus, when there is no element for additionally supporting the blade 50, the central part of the blade 50 sags in the downward direction due to the weight of the blade 50 so that bending may occur in the blade 50.

To prevent this phenomenon, as illustrated in FIG. 26, the air conditioner according to another embodiment of the present disclosure may include the sag prevention device 400 placed at the center side of the blade 50. The sag prevention device 400 may be applied to both the blade 50 according to an embodiment of the present disclosure and the discharge blade 50' according to another embodiment of the present disclosure.

The sag prevention device 400 may be placed at the central part of the blade 50. The blade 50 may include a first rotation part 51 and a second rotation part (see 52 of FIG. 29*a*), which are supported by the sag prevention device 400.

The first rotation part 51 may be placed in the same line as an extension direction of a first rotation axis X1. Thus, when the blade 50 is rotated around the first rotation axis X1, the first rotation part 51 may be a rotation axis of the blade 50 together with the first rotation axis X1.

The second rotation part 52 may be placed in the same line as an extension direction of the second rotation axis X2. Thus, when the blade 50 is rotated around the second rotation axis X2, the second rotation part 52 may be a rotation axis of the blade 50 together with the second rotation axis X2.

As illustrated in FIGS. 27 and 28, the sag prevention device 400 may include a main body 410, a first support member 430 configured to support the first rotation part 51, a first elastic member 440 configured to elastically pressurize the first support member 430, a second support member 450 configured to support the second rotation part 52, a second elastic member 460 configured to elastically pressurize the second support member 450, and a cover 470 configured to cover the first elastic member 440 and the second elastic member 460.

The respective elements 430, 440, 450, and 460 may be accommodated in the main body 410, and the main body 410 may be coupled to a housing 10. Thus, the blade 50 may be prevented from sagging in the downward direction due to the first support member 430 and the second support member 450 accommodated in the main body 410.

The main body 410 may include a first insertion axis 411 into which the first support member 430 is rotatably inserted and which is a rotation axis of the first support member 430, a first accommodation groove 413 in which the first rotation part 51 is accommodated when the blade 50 is in the closed state, and a first cam part 415 configured to cam-support the first support member 430.

Also, the main body 410 may include a second insertion axis 412 into which the second support member 450 is rotatably inserted and which is a rotation axis of the first support member 430, a second accommodation groove 414 in which the second rotation part 52 is accommodated when the blade 50 is in the closed state, and a second cam part 416 configured to cam-support the second support member 450.

The first support member 430 may include a first insertion groove 431 through which the first insertion axis 411 is penetrated, a first contact part 432 configured to selectively support the first rotation part 51 and being in contact with the first rotation part 51 when the first rotation part 51 is supported, a first accommodation part 433 in which the first rotation part 51 is accommodated when the first rotation part 51 is supported by the first support member 430, and a third cam part 434 cam-supported with the first cam part 415.

Also, the second support member 450 may include a first insertion groove 451 through which the second insertion axis 412 is penetrated, a second contact part 452 configured to selectively support the second rotation part 52 and being in contact with the second rotation part 52 when the first rotation part 52 is supported, a second accommodation part 453 in which the second rotation part 52 is accommodated when the second rotation part 52 is supported by the second support member 450, and a fourth cam part 454 cam-supported with the second cam part 416.

The first support member 430 and the second support member 450 may be rotatably coupled to the main body 410, as described above, and the first support member 430 and the second support member 450 may support the first rotation part 51 and the second rotation part 52, respectively.

In this case, when rotation of the first support member 430 and the second support member 450 is not limited, the first support member 430 and the second support member 450 may be pivoted in the downward direction due to the weight of the first rotation part 51 and the second rotation part 52. Thus, the blade 50 may not be prevented from sagging.

To prevent this phenomenon, the first elastic member 440 and the second elastic member 460 may pressurize the first support member 430 and the second support member 450, respectively, to limit pivoting thereof.

In detail, the first elastic member 440 and the second elastic member 460 may pressurize the first support member 430 and the second support member 450 in an extension direction of the first insertion axis 411 and the second insertion axis 422.

That is, the first elastic member 440 and the second elastic member 460 may elastically pressurize the first support member 430 and the second support member 450, respectively, in an extension direction of each rotation axis so that the first support member 430 and the second support member 450 may be prevented from being pivoted in the downward direction due to the weight of the first rotation part 51 and the second rotation part 52.

Although the first insertion axis 411 and the second insertion axis 422 are not placed in the same line as the first rotation axis X1 and the second rotation axis X2, respectively, the first insertion axis 411 and the second insertion axis 422 extend in the same direction as the extension direction of the first rotation axis X1 and the second rotation axis X2. Thus, the first elastic member 440 and the second elastic member 460 may pressurize the first support member 430 and the second support member 450, respectively, in a direction in which the first rotation axis X1 and the second rotation axis X2 extend.

Figure 29A:
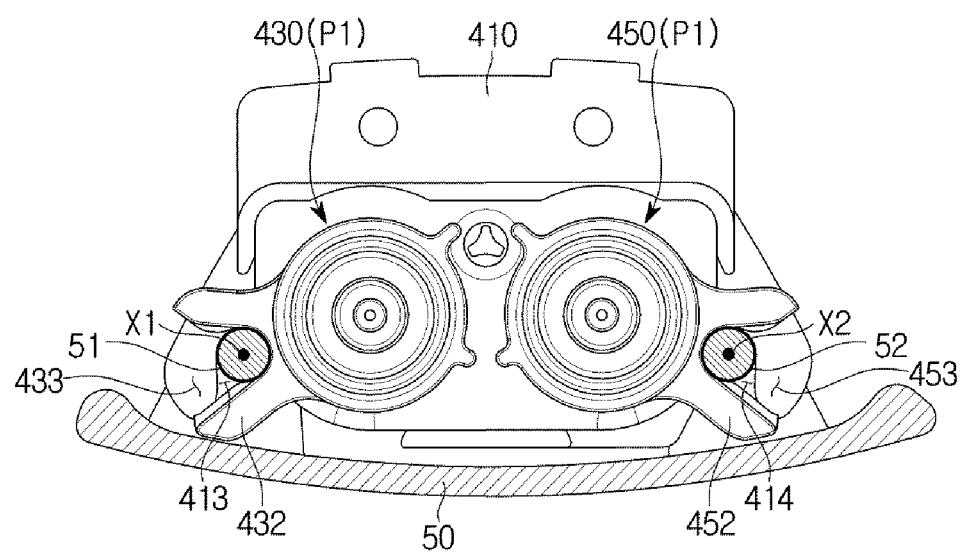
FIGS. 29a, 29b, 30a and 30b are sectional views of a sag prevention device of an air conditioner in a driven state according to another embodiment of the present disclosure.

In detail, as illustrated in FIG. 29*a*, when the blade 50 is in the closed state, each of the first support member 430 and the second support member 450 may be placed at a support position P1. The first rotation part 51 and the second rotation part 52 may be accommodated in the first accommodation part 433 and the second accommodation part 453, may be in contact with the first contact part 432 and the second contact part 452, respectively, and may be supported by the first support member 430 and the second support member 450.

Also, the first rotation part 51 and the second rotation part 52 may be accommodated in the first accommodation groove 413 and the second accommodation groove 414 of the main body 410, respectively. The first contact part 432 and the second contact part 452 close downward openings of the first accommodation groove 413 and the second accommodation groove 414, respectively, so that the first rotation part 51 and the second rotation part 52 may be prevented from sagging in the downward direction.

In this case, force may be generated in the first contact part 432 and the second contact part 452, respectively, in the downward direction due to the weight of the first rotation part 51 and the second rotation part 52. The first support member 430 and the second support member 450 may not be rotated in the downward direction due to the pressurizing force F1 of the first elastic member 440 and the second elastic member 460 and may be maintained at the support position P1.

Figure 29B:
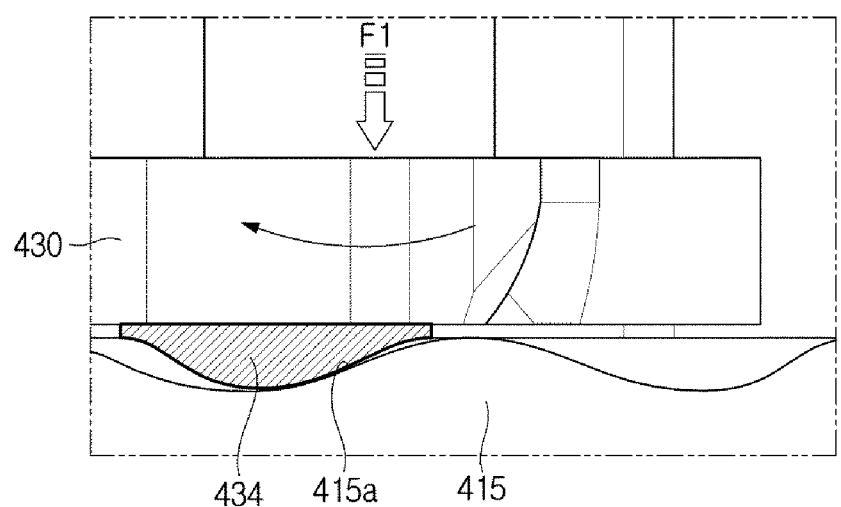

As shown in FIG. 29*b*, when the first support member 430 is additionally placed at the support position P1, each of the first cam part 415 and the third cam part 434 may be cam-supported. Thus, the first support member 430 may be prevented from being pivoted in the downward direction only due to the weight of the blade 50. That is, the third cam part 434 may be supported on an inclined surface 415a of the first cam part 415 so that pivoting of the first support member 430 may be limited. A description of the second support member 450 is the same and thus will be omitted.

Figure 30A:
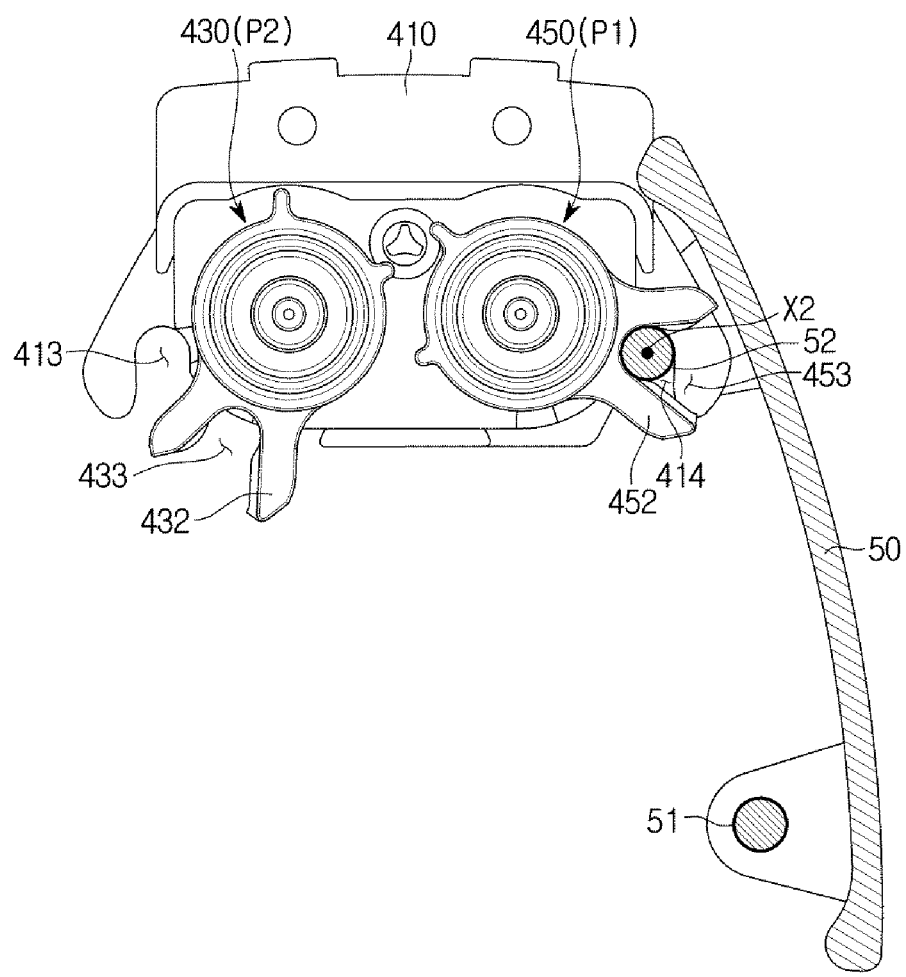
Figure 30B:
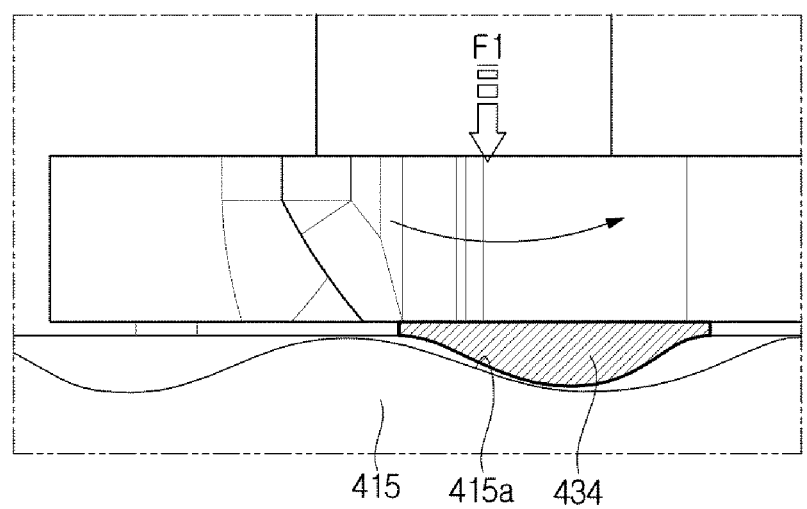

Subsequently, as illustrated in FIG. 30a, when the blade 50 is rotated around the second rotation axis X2, the blade 50 may be pivoted in the downward direction due to the weight of the blade 50 and a force generated in the blade-driving device 100.

In this case, the force generated due to the weight of the blade 50 and the blade-driving device 100 is larger than the pressurizing force F1 of the first elastic member 440 used to pressurize the first support member 430 so that the first support member 430 may be pivoted in the downward direction.

In detail, the first rotation part 51 supported by the first contact part 432 pressurizes the first contact part 432 in the downward direction in engagement with pivoting of the blade 50. Thus, the first support member 430 may receive a rotational force in the downward direction. While the third cam part 434 rides along the inclined surface 415a of the first cam part 415, the first support member 430 may start being pivoted in the downward direction.

As the first support member 430 is pivoted in the downward direction, the opening of the first accommodation part 433 is in the downward direction and the first contact part 432 is in the downward direction, and thus the first rotation part 51 is not supported any more. Also, as the first contact part 432 is in the downward direction, the downward opening of the first accommodation groove 413 is opened so that the first rotation part 51 may deviate from the first accommodation groove 413.

Thus, the first support member 430 does not confine rotation of the blade 50, and when the blade 50 is in the closed state, the first support member 430 may support the first rotation part 51 so that the first rotation part 51 may be prevented from sagging in the downward direction.

While the blade 50 is rotated around the second rotation axis X2, the second rotation part 52 is pivoted on the spot. Thus, the second rotation part 52 may rotate within the second accommodation groove 414 and the second accommodation part 453. Thus, due to no additional external force other than the weight of the second rotation part 52, the second support member 450 may support the second rotation part 52 not to sag in the downward direction.

When the blade 50 is rotated around the first rotation axis X1 as a rotation axis, the sag prevention device 400 supports the first rotation part 51 in a symmetric structure with respect to the above-described features. Thus, a redundant description thereof will be omitted.

Hereinafter, a sag prevention device 500 of an air conditioner according to another embodiment of the present disclosure will be omitted. The configuration other than the sag prevention device 500 that will be descried later is similar to that of the air conditioner 1 according to another embodiment of the present disclosure. Thus, a redundant description thereof will be omitted.

Figure 31:
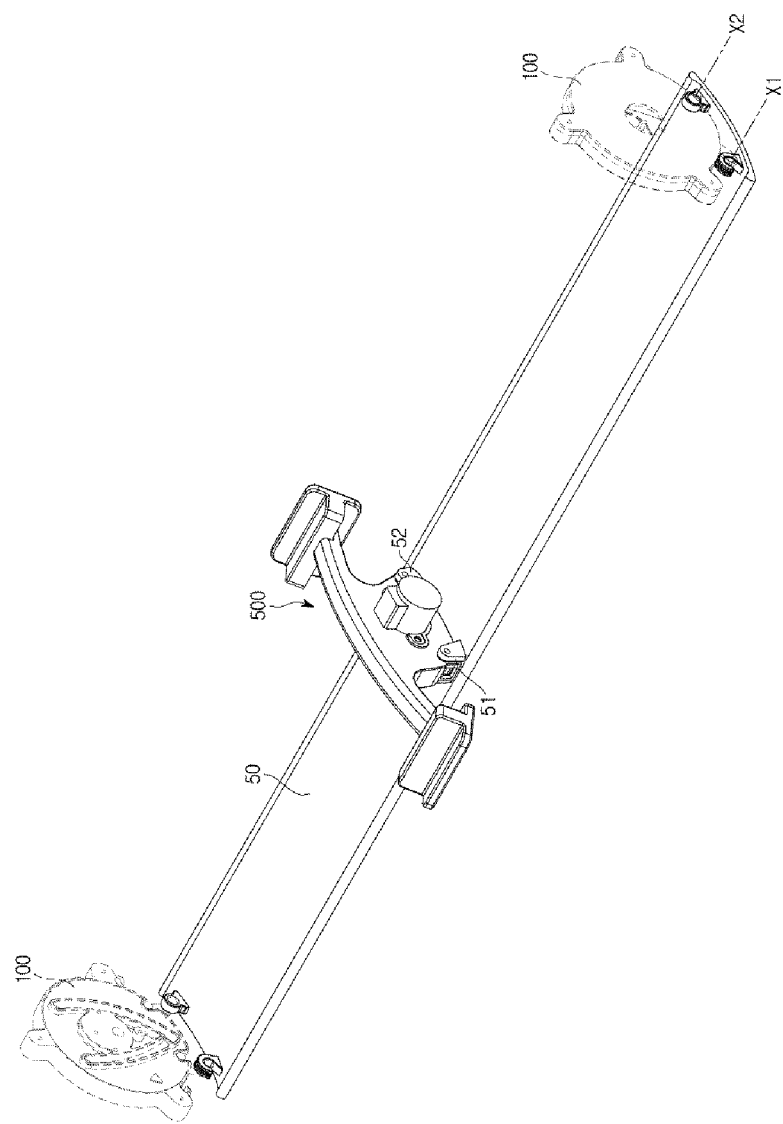
FIG. 31 is a perspective view of a blade and sag prevention device of an air conditioner according to another embodiment of the present disclosure.
Figure 32:
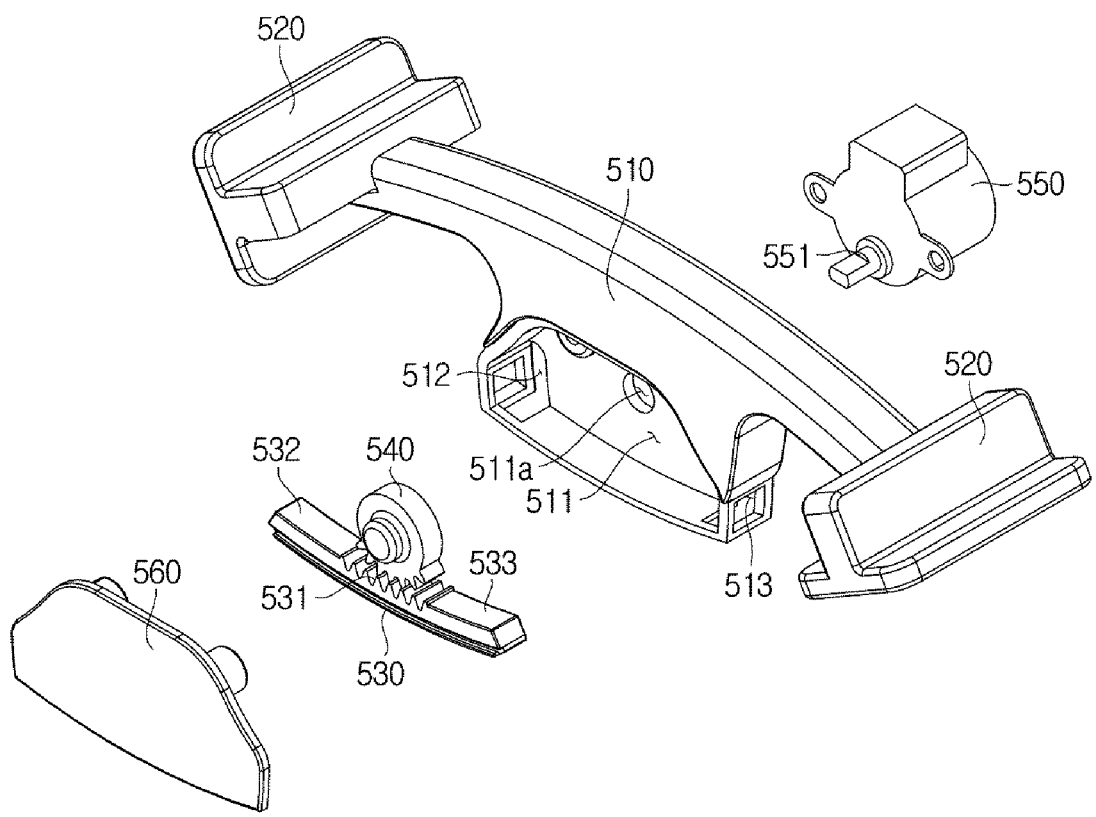
FIG. 32 is an exploded perspective view of a sag prevention device of an air conditioner according to another embodiment of the present disclosure.
Figure 33A:
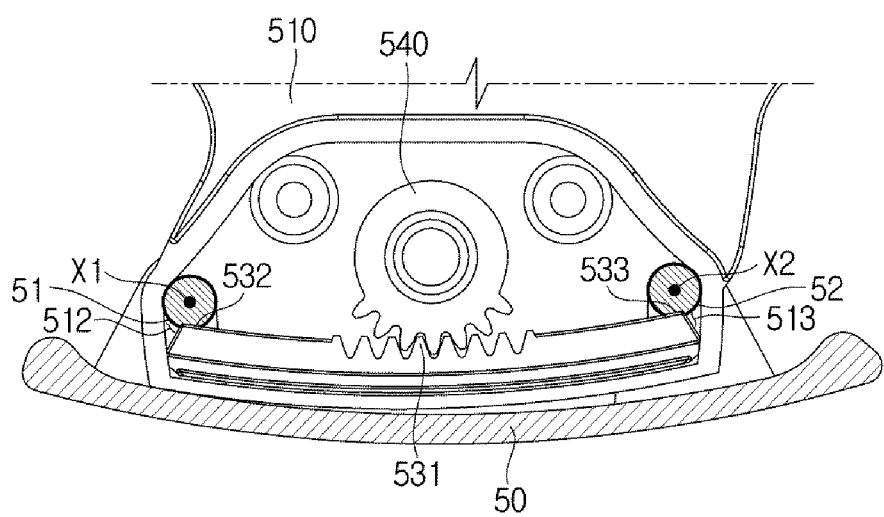
FIGS. 33a and 33b are sectional views of a sag prevention device of an air conditioner in a driving state according to another embodiment of the present disclosure.
Figure 33B:
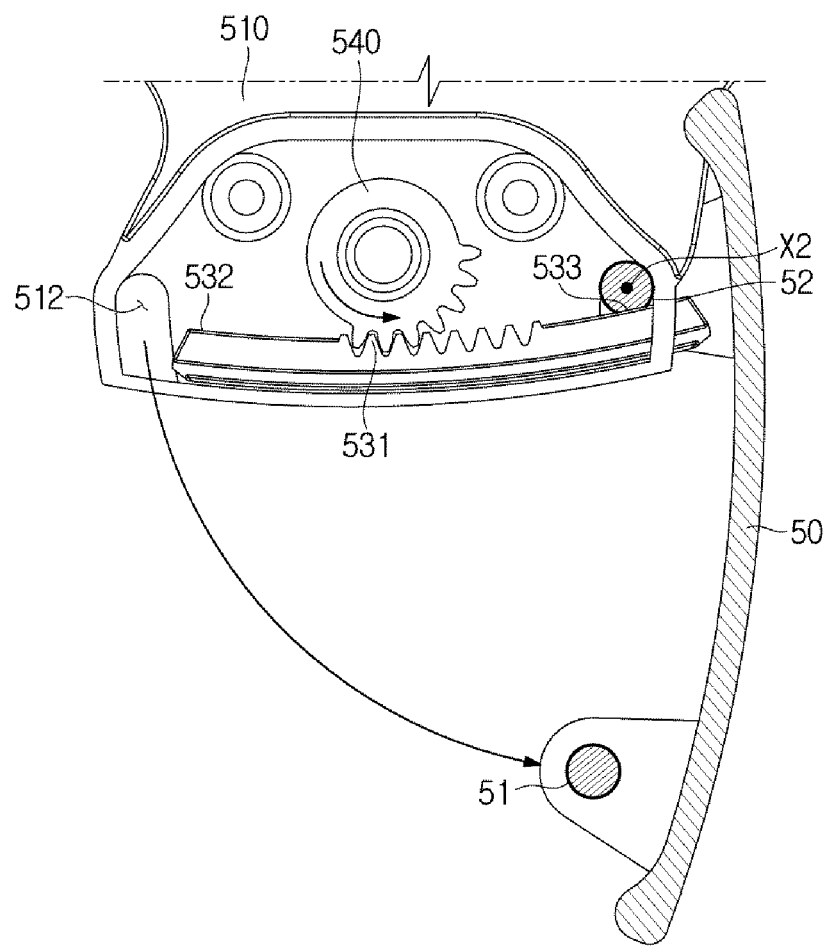

FIG. 31 is a perspective view of a blade and a sag prevention device of an air conditioner according to another embodiment of the present disclosure, FIG. 32 is an exploded perspective view of the sag prevention device of the air conditioner according to another embodiment of the present disclosure, and FIGS. 33a and 33b are cross-sectional views of a driven state of the sag prevention device of the air conditioner according to another embodiment of the present disclosure.

The sag prevention device 500 may be spaced a predetermined distance apart from the blade-driving device 100 and may prevent the blade 50 from sagging in the downward direction due to the weight of the blade 50. In detail, the blade-driving device 100 may be placed at both ends or one end of the blade 50, as described above. Thus, the central part of the blade 50 may sag in the downward direction due to the weight of the blade 50.

Thus, when there is no element for additionally supporting the blade 50, in particular, the central part of the blade 50 sags in the downward direction due to the weight of the blade 50 so that bending may occur in the blade 50.

To prevent this phenomenon, as illustrated in FIG. 31, the air conditioner according to another embodiment of the present disclosure may include the sag prevention device 500 placed at the center side of the blade 50. The sag prevention device 500 may be applied to both the blade 50 according to an embodiment of the present disclosure and the discharge blade 50' according to another embodiment of the present disclosure.

The sag prevention device 500 may be placed at the central part of the blade 50. The blade 50 may include a first rotation part 51 and a second rotation part 52, which are supported by the sag prevention device 500.

The first rotation part 51 may be placed in the same line as an extension direction of the first rotation axis X1. Thus, when the blade 50 is rotated around the first rotation axis X1, the first rotation part 51 may be a rotation axis of the blade 50 together with the first rotation axis X1.

The second rotation part 52 may be placed in the same line as an extension direction of the second rotation axis X2. Thus, when the blade 50 is rotated around the second rotation axis X2, the second rotation part 52 may be a rotation axis of the blade 50 together with the second rotation axis X2.

As illustrated in FIGS. 32 to 33b, the sag prevention device 500 may include a main body 510, a connection part 520 that connects the main body 510 to a housing, a support member 530 configured to support the first rotation part 51 and the second rotation part 52, a support member driving motor 550 configured to drive the support member 530, a pinion 540 that transfers a driving force of the support member driving motor 550 to the support member 530, and a cover 560 that covers one side of the main body 510.

The main body 510 may include an accommodation space 511 in which the support member 530 and the pinion 540 are accommodated, a first accommodation groove 512, which is connected to one side of the accommodation space 511 and in which the first rotation part 51 may be accommodated, and a second accommodation groove 513, which is connected to the other side of the accommodation space 511 and in which the second rotation part 52 may be accommodated.

A through hole 511a through which a shaft 551 of the support member driving motor 550 passes, may be formed in the accommodation space 511, and the shaft 551 of the support member driving motor 550 inserted into the accommodation space 511 through the through hole 511a may be connected to the pinion 540.

The support member 530 may include a rack part 531 that engages with the pinion 540, a first contact part 532 configured to selectively support the first rotation part 51 while being in contact with the first rotation part 51, and a second contact part 533 configured to selectively support the second rotation part 52 while being in contact with the second rotation part 52.

As illustrated in FIG. 33a, when the blade 50 is in the closed state, the support member 530 may be placed at the center side of the main body 510. When the support member 530 is placed at the center side of the main body 510, the first contact part 532 and the second contact part 533 of the support member 530 may close downward openings of the first accommodation groove 512 and the second accommodation groove 513, respectively.

Thus, when the first rotation part 51 and the second rotation part 52 of the blade 50 are in a close state in which they are accommodated in the first accommodation groove 512 and the second accommodation groove 513, respectively, the support member 530 may block the downward opening of the first accommodation groove 512 and the downward opening of the second accommodation groove 513 so that the first rotation part 51 or the second rotation part 52 may be prevented from sagging in the downward direction.

Subsequently, as illustrated in FIG. 33b, when the blade 50 is rotated around the second rotation axis X2 in the downward direction, a controller (not shown) of the sag prevention device 500 may rotate the support member driving motor 550 in one direction.

Thus, the pinion 540 may be moved counterclockwise based on FIG. 33b, and the support member 530 that engages with the pinion 540 may be moved to the right due to the rack part 531.

When the support member 530 is moved to the right, the first contact part 532 may be linked to the support member 530 and moved to the right. Thus, the downward opening of the first accommodation groove 512 may be opened so that the first rotation part 51 may be moved in the downward direction.

Thus, the support member 530 does not confine rotation of the blade 50, and when the blade 50 is in the closed state, the support member 530 may support the first rotation part 51 so that the first rotation part 51 may be prevented from sagging in the downward direction.

While the blade 50 is rotated around the second rotation axis X2, the second rotation part 52 is pivoted on the spot and thus may rotate within the second accommodation groove 513. Thus, the second contact part 533 of the support member 530 may support the second rotation part 52 not to sag in the downward direction while the blade 50 is rotated.

This is because, as the support member 530 is moved to the right, as described above, the second contact part 533 of the support member 530 may be continuously maintained in a state in which the downward opening of the second accommodation groove 513 is blocked.

When the blade 50 is rotated around the first rotation axis X1 as a rotation axis, the sag prevention device 500 supports the first rotation part 51 in a symmetric structure with respect to the above-described features. Thus, a redundant description thereof will be omitted.

As is apparent from the above description, in an air conditioner according to one or more embodiments of the present disclosure, a blade-driving device rotates a blade in an upward/downward direction so that discharged air can be effectively guided in the upward/downward direction.

Also, the blade-driving device includes one or two driving motors for rotating the blade to efficiently rotate the blade, and the volume of the blade-driving device is minimized so that slimming of the air conditioner can be implemented and an internal space of the air conditioner can be efficiently used.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner comprising:
a housing comprising a discharge port;
a heat exchanger included in the housing to heat-exchange air introduced into the housing;
a blower fan configured to guide and discharge the air heat-exchanged by the heat exchanger through discharge port;
a blade configured to open or close the discharge port and to adjust a direction of the air discharged from the discharge port and comprising a first rotation axis at one end thereof and a second rotation axis at another end thereof; and
a blade-driving device including a driving motor and configured to drive the blade by a rotational force of the driving motor, the blade-driving device further comprising:
a first link having one end connected to the first rotation axis; and
a second link having one end connected to the second rotation axis,
wherein when the driving motor rotates the blade about the first rotation axis in one direction, the first link remains in a closed position and the blade-driving device moves the second link to have the second rotation axis to rotate around the first rotation axis to open or close the discharge port and to adjust the direction of the air discharged from the discharge port, and when the driving motor rotates the blade about the second rotation axis in another direction, the second link remains in the closed position and the blade-driving device moves the first link to have the first rotation axis to rotate around the second rotation axis to open or close the discharge port and to adjust the direction of the air discharged from the discharge port.

2. The air conditioner according to claim 1,
wherein the blade-driving device further comprises:
a rotation member connected to the first link and the second link, respectively and configured to move the first link when the driving motor rotates the blade about the second rotation axis or move the second link when the driving motor rotates the blade about the first rotation axis; and
a guide member connected to the first link and the second link, respectively and configured to support the first link to remain in the closed position while guiding a movement of the second link when the driving motor rotates the blade about the first rotation axis or to support the second link to remain in the closed position while guiding a movement of the first link when the driving motor rotates the blade about the second rotation axis.

3. The air conditioner according to claim 2,
wherein the first link comprises a first coupling protrusion at another end of the first link and coupled to the rotation member, and the second link comprises a second coupling protrusion at another end of the second link and coupled to the rotation member, and the rotation member comprises:
- a first rotation rail comprising a penetration region that extends in a rotation direction of the rotation member so that the first coupling protrusion is inserted into the penetration region and the first coupling protrusion penetrates into the penetration region when the rotation member is rotated in one direction; and
- a second rotation rail comprising a rotation region that extends in a direction of a rotation axis of the rotation member so that the second coupling protrusion is inserted into the rotation region and the rotation region is rotated together with the second coupling protrusion when the rotation member is rotated in the one direction.

4. The air conditioner according to claim 3, wherein the first link comprises a first support protrusion selectively supported by the guide member, and the guide member comprises a guide rail into which each of the first coupling protrusion and the second coupling protrusion is inserted and guides movement of the second coupling protrusion when the rotation member is rotated in the one direction, and a support part configured to support the first support protrusion when the rotation member is rotated in the one direction.

5. The air conditioner according to claim 4, wherein the guide rail guides a movement of the second coupling protrusion so that the second coupling protrusion is moved from one end of the guide rail to another end of the guide rail when the rotation member is rotated in the one direction.

6. The air conditioner according to claim 5, wherein the first link further comprises a first rotation protrusion placed at one end of the first link and rotatably coupled to one side of the blade on the first rotation axis, and the second link further comprises a second rotation protrusion placed at the one end of the second link and rotatably coupled to the other side of the blade on the second rotation axis, and the second link is moved to a direction of the other end of the guide rail from the one end of the guide rail in engagement with the movement of the second coupling protrusion, and the second rotation protrusion pressurizes the other side of the blade so that the blade is pivoted around the first rotation axis.

7. The air conditioner according to claim 1, wherein the first link comprises a first coupling protrusion at the other end of the first link and coupled to the rotation member, and the second link comprises a second coupling protrusion at the other end of the second link and coupled to the rotation member, and wherein the rotation member comprises:
- a first rotation rail including a first penetration region into which the first coupling protrusion is inserted and which passes through the first coupling protrusion when the rotation member is rotated in one direction, and a first rotation region which extends from the first penetration region and is rotated together with the first coupling protrusion when the rotation member is rotated in an opposite direction; and
- a second rotation rail including a second rotation region into which the second coupling protrusion is inserted and which is rotated together with the second coupling protrusion when the rotation member is rotated in the one direction, and a second penetration region which extends from the second rotation region and passes through the second coupling protrusion when the rotation member is rotated in the opposite direction.

8. The air conditioner according to claim 1, wherein the blade comprises a first rotation shaft and a first blade gear part, which are placed on the first rotation axis, and a second rotation shaft and a second blade gear part, which are placed on the second rotation axis, and the blade-driving device further comprises:
- a first rotation member coupled to the first blade gear part and configured to rotate the first blade gear part;
- a second rotation member coupled to the second blade gear part and configured to rotate the second blade gear part; and
- a first locking member configured to support the first rotation shaft when the second rotation axis is moved.

9. The air conditioner according to claim 8, wherein the driving motor comprises a first driving motor configured to rotate the first rotation member and a second driving motor configured to rotate the second rotation member, and the blade-driving device further comprises a second locking member configured to support the second rotation shaft, and the first rotation member comprises a first gear part that engages with the first blade gear part and a first pressurizing protrusion configured to pressurize the first locking member and to rotate the first locking member, and the second rotation member comprises a second gear part that engages with the second blade gear part and a second pressurizing protrusion configured to pressurize the second locking member and to rotate the second locking member, and the second locking member is rotated by the pressurizing protrusion and is rotated from a support position at which the second rotation shaft supports, to a deviation position at which the second rotation shaft deviates from the second locking member.

10. The air conditioner according to claim 9, wherein rotation of the second rotation member is stopped when the second locking member is rotated to the deviation position, and the first rotation member rotates the first blade gear part when the second locking member is rotated to the deviation position.

11. The air conditioner according to claim 8, wherein the blade-driving device moves the first rotation axis around the second rotation axis when the driving motor is rotated in the opposite direction, and further comprises a second locking member configured to support the second rotation shaft.

12. The air conditioner according to claim 1, further comprising a sag prevention device spaced a predetermined distance apart from the blade-driving device and configured to prevent the blade from sagging, wherein the blade further comprises a first rotation part corresponding to the first rotation axis and a second rotation part corresponding to the second rotation axis, and the sag prevention device comprises a first support member configured to support the first rotation part, a second support member configured to support the second rotation part, and an elastic member configured to elastically pressurize the first support member and the second support member so that one of the first rotation part and the second rotation part does not sag.

13. The air conditioner according to claim 12,
wherein the elastic member comprises a first elastic member configured to elastically pressurize the first support member and a second elastic member configured to elastically pressurize the second support member, and the first elastic member pressurizes the first support member in an opposite direction to a direction in which the blade is pivoted around the second rotation axis when the blade is in a closed state, and pressurizes the first support member in a direction in which the blade is pivoted around the second rotation axis when the blade is pivoted around the second rotation axis and is in an opened state.

14. The air conditioner according to claim 13,
wherein the sag prevention device further comprises a main body in which the elastic member, the first support member and the second support member are accommodated, and the first elastic member comprises one end coupled to the first support member and the other end coupled to the main body, and when the first support member is pivoted around the second rotation axis in engagement with pivoting of the blade, the first elastic member is pivoted around the other end in engagement with the first support member.

15. An air conditioner comprising:
a housing comprising a discharge port;
a heat exchanger included in the housing to heat-exchange air introduced into the housing;
a blower fan configured to guide and discharge the air heat-exchanged by the heat exchanger through discharge port;
a blade configured to open or close the discharge port and to adjust a direction of the air discharged from the discharge port; and
a blade-driving device including a driving motor and configured to drive the blade by a rotational force of the driving motor,
wherein the blade-driving device further comprises:
a first link connected to one end of the blade;
a second link connected to another end of the blade; and
a rotation member rotated by the rotational force of the driving motor so as to move one of the first link and the second link while the other one of the first link and the second link remains in a closed position to open or close the discharge port and to adjust the direction of the air discharged from the discharge port.

16. The air conditioner according to claim 15,
wherein, when the driving motor rotates the rotation member in one direction, the rotation member is rotated in the one direction so as to move the first link, and when the driving motor rotates the rotation member in an opposite direction, the rotation member is rotated in the opposite direction so as to move the second link, and the blade-driving device further comprises a guide member configured to move the first link to an outside of the discharge port when the driving motor rotates the rotation member in the one direction.

17. The air conditioner according to claim 15,
further comprising a sag prevention device spaced a predetermined distance apart from the blade-driving device and configured to prevent the blade from sagging,
wherein the blade further comprises a first rotation part corresponding to the first rotation axis and a second rotation part corresponding to the second rotation axis, and
the sag prevention device comprises a first support member configured to support the first rotation part, a second support member configured to support the second rotation part, a first elastic member configured to elastically pressurize the first support member, and a second elastic member configured to elastically pressurize the second support member, and
when the blade is in a closed state, the first elastic member pressurizes the first support member in an extension direction of the first rotation axis, and the second elastic member pressurizes the second support member in an extension direction of the second rotation axis, and
when the blade is pivoted around the first rotation axis, the first elastic member pressurizes the first support member while the blade is pivoted.

18. The air conditioner according to claim 15,
further comprising a sag prevention device spaced a predetermined distance apart from the blade-driving device and configured to prevent the blade from sagging,
wherein the blade further comprises a first rotation part placed to correspond to the first rotation axis and a second rotation part placed to correspond to the second rotation axis, and
the sag prevention device comprises:
a first support member configured to support the first rotation part and pivoted around the second rotation part when the blade is rotated around the second rotation axis;
a second support member configured to support the second rotation part and pivoted around the first rotation part when the blade is rotated around the first rotation axis;
a first elastic member configured to elastically pressurize the first support member in a rotation direction of the blade so that sagging of the first rotation part is prevented when the blade is rotated around the first rotation axis; and
a second elastic member configured to elastically pressurize the second support member in a rotation direction of the blade so that sagging of the second rotation part is prevented when the blade is rotated around the second rotation axis.

19. An air conditioner comprising:
a housing comprising a discharge port;
a heat exchanger included in the housing and to heat-exchange air introduced into the housing;
a blower fan configured to guide and discharge the air heat-exchanged by the heat exchanger through discharge port;
a blade configured to open or close the discharge port and to adjust a direction of the air discharged from the discharge port; and
a blade-driving device including a single driving motor and configured to drive the blade by a rotational force of the motor,
wherein the blade-driving device further a first link having one end connected to the blade and a second link having one end connected to the blade, respectively, and when the driving motor is rotated in one direction, the blade-driving device rotates one end of the blade using the another end of the blade as a rotation axis so that the first link remains in a closed position while the blade-driving device moves the second link to open or close the discharge port and to adjust the direction of the air discharged from the discharge port, and when the driving motor is rotated in an opposite direction, the blade-driving device rotates the another end of the blade using the one end of the blade as a rotation axis so that the second link remains in a closed position while the blade-driving device moves the first link to open or close the discharge port and to adjust the direction of the air discharged from the discharge port.

* * * * *

UNITED STATES PATENT AND TRADEMARK OFFICE
CERTIFICATE OF CORRECTION

PATENT NO. : 10,619,648 B2
APPLICATION NO. : 15/887530
DATED : April 14, 2020
INVENTOR(S) : Hyun Uk Park et al.

Page 1 of 1

It is certified that error appears in the above-identified patent and that said Letters Patent is hereby corrected as shown below:

In the Claims

Column 38, Line 65 (approx.), In Claim 19, after "blade-driving device further" insert
-- comprising --.

Signed and Sealed this
Sixteenth Day of June, 2020

Andrei Iancu
*Director of the United States Patent and Trademark Office*